(12) United States Patent
Keys et al.

(10) Patent No.: US 12,330,744 B2
(45) Date of Patent: Jun. 17, 2025

(54) DECOUPLING OF A SHOE FROM A BICYCLE PEDAL

(71) Applicants: Jeramie J Keys, Roswell, GA (US);
Jerry L Keys, Gray, TN (US)

(72) Inventors: Jeramie J Keys, Roswell, GA (US);
Jerry L Keys, Gray, TN (US)

( * ) Notice: Subject to any disclaimer, the term of this patent is extended or adjusted under 35 U.S.C. 154(b) by 0 days.

(21) Appl. No.: 18/575,858

(22) PCT Filed: Jun. 7, 2023

(86) PCT No.: PCT/US2023/024758
§ 371 (c)(1),
(2) Date: Dec. 31, 2023

(87) PCT Pub. No.: WO2023/244486
PCT Pub. Date: Dec. 21, 2023

(65) Prior Publication Data
US 2024/0262455 A1  Aug. 8, 2024

Related U.S. Application Data

(60) Provisional application No. 63/470,924, filed on Jun. 4, 2023, provisional application No. 63/351,413, filed on Jun. 12, 2022.

(51) Int. Cl.
*B62M 3/08* (2006.01)
*A43B 5/14* (2006.01)
*B62J 45/415* (2020.01)
*B62J 45/421* (2020.01)

(52) U.S. Cl.
CPC .............. *B62M 3/086* (2013.01); *A43B 5/14* (2013.01); *B62J 45/4151* (2020.02); *B62J 45/421* (2020.02)

(58) Field of Classification Search
None
See application file for complete search history.

(56) References Cited

U.S. PATENT DOCUMENTS

| | | |
|---|---|---|
| 6,089,122 A | 7/2000 | Nagano |
| 10,745,080 B1 | 8/2020 | Chen |
| 12,059,058 B2 | 8/2024 | Nishijima |
| 2012/0103131 A1 | 5/2012 | Bryne |

(Continued)

OTHER PUBLICATIONS

PCT/US2023/024758 International Search Report and Written Opinion, Oct. 18, 2023.

*Primary Examiner* — Vicky A Johnson
(74) *Attorney, Agent, or Firm* — Withers & Keys, LLC

(57) ABSTRACT

Modules provide the ability of a cleat that couples a shoe to a bicycle pedal to be decoupled via natural lifting motion of the foot upon the occurrence of a specific circumstance such as a tilt of the bicycle indicative of an imminent crash. This allows the rider to use their foot that is no longer coupled to the pedal to potentially eliminate or lessen the crash and/or dismount the bicycle without needing to first perform a cleat release maneuver such as rotating the rear of the foot outward. Shoes may be configured with the module to allow the cleat to decouple from the shoe via the natural lifting motion of the foot in the specific circumstance. Pedals may be configured with the module to allow the cleat to decouple from the pedal via the natural lifting motion of the foot in the specific circumstance.

23 Claims, 32 Drawing Sheets

(56) References Cited

U.S. PATENT DOCUMENTS

2014/0060245 A1   3/2014   Morelli
2017/0106940 A1*  4/2017   Paick .................... B62M 6/50
2021/0403123 A1   12/2021  Lavine
2022/0081062 A1*  3/2022   Ganz .................... A43B 13/10
2023/0120200 A1   4/2023   Nishijima

* cited by examiner

DECOUPLING OF A SHOE FROM A BICYCLE PEDAL

RELATED APPLICATIONS

The present application claims priority to U.S. Provisional Application No. 63/351,413, filed Jun. 12, 2022, and titled DECOUPLING OF A SHOE FROM A BICYCLE PEDAL, and the present application also claims priority to U.S. Provisional Application No. 63/470,924, filed Jun. 4, 2023, and titled DECOUPLING OF A SHOE FROM A BICYCLE PEDAL.

TECHNICAL FIELD

Embodiments relate to the decoupling of a shoe from a bicycle pedal where the shoe and the bicycle pedal are coupled together.

BACKGROUND

Cyclists ride bicycles by placing their feet on the bicycle pedals. The cyclist powers the bicycle by using their legs to provide force onto the bicycle pedals to turn a crank that turns the rear tire by way of a drivetrain interconnecting the crank and rear tire that may include gears or pulleys as well as a chain, shaft, or belt. The cyclist also uses the bicycle pedals as a platform for stability of the body position on the bicycle. Thus, cyclists maintaining their feet on the bicycle pedals is of utmost importance when riding the bicycle.

There are multiple ways in which bicycle pedals may be designed to help maintain the shoes of the cyclist on the bicycle pedals. The most basic approach is to provide spikes, studs, or other similar features that create friction with the shoe and in some cases a small degree of penetration into the shoe sole. A more advanced approach provides a structure on the front of the bicycle pedal, often referred to as a toe clip, that the front of the shoe resides within. This assists in holding the shoe on the pedal in a relatively fixed position and provides the ability to lift upward on the pedal by lifting the shoe when the pedal is naturally rising, in combination with pressing downward on the opposite pedal that is naturally dropping, to provide additional force into the crank of the bicycle. However, the cyclists must pull their shoes rearward to remove their feet from the bicycle pedal, which can be difficult to do quickly in some situations.

An even more advanced approach, referred to as a clipless system, provides a structural element such as a jaw on the bicycle pedal and a cleat mounted to the sole of the shoe near the ball of the foot. The structural element such as a jaw captures the cleat on the shoe to hold the shoe in a relatively fixed position on the bicycle pedal. This clipless system also allows cyclists to lift upward on the pedal as the pedal naturally rises to provide additional force into the crank. Rather than pulling the shoe rearward, the clipless system generally requires that cyclists rotate their foot about a pivot point formed by the cleat captured by the jaw or other structural element where such pivoting involves the heel of the foot rotating outward.

While many cyclists consider the clipless system to be a better approach than others, there are potential safety drawbacks associated with cyclists attempting to remove their feet from the bicycle pedals. There is a certain amount of time required to rotate the foot of the cyclist to release the cleat from the structural element of the bicycle pedal that retains the cleat. For beginners, this is especially problematic because the beginners must think about the technique in order to proceed with rotating their foot. Furthermore, if the beginner tries to simply lift their foot in an attempt to remove their foot from the pedal without rotating the heel outward, the sensation of their foot not being able to lift away from the bicycle pedal can induce panic which may result in the beginner attempting to apply more lifting force without rotating the heel outward, which still does not free their foot from the bicycle pedal but further escalates the panic. As a result, the beginners are not able to place their foot on the ground to stabilize their bicycle or to dismount their bicycle, and the beginners crash to the ground as the bicycle falls over. This inability of beginners to remove their foot from the pedal can occur during a crash or even simply when coming to a stop, resulting in the beginner potentially crashing to the ground in either case.

Even cyclists well-trained in the use of the clipless system may experience situations where there is inadequate time to rotate their foot to release the cleat from the structural element of the bicycle element that retains the cleat. For instance, an unexpected slippage of the front tire while the cyclist is attempting to negotiate a turn due to a wet or otherwise slippery surface is a typical scenario that happens so quickly, and often with the bicycle already in a leaned rather than upright position, that experienced cyclists cannot rotate and remove their foot from the pedal before crashing down with the bicycle. As another example, a very sudden and unexpected stop may result in the bicycle falling to one side so unexpectedly that experienced cyclists cannot rotate and remove their foot from the pedal before crashing to the ground.

Thus, even with clipless pedal systems, cyclists are still at risk of not being able to remove their feet from the bicycle pedals in time to avoid crashing down with the bicycle. Therefore, cyclists of all skill levels, especially beginners, would benefit from an improved manner of coupling their feet to and decoupling their feet from the bicycle pedals.

SUMMARY

Embodiments address issues such as these above and others by providing a manner of coupling and decoupling the shoe from the pedal where cyclists may remove their foot from the bicycle pedal by lifting the foot away in a natural motion in situations where decoupling the shoe from the pedal is appropriate while still being able to lift upward on the pedal to apply force to the crank in situations where decoupling the shoe from the pedal is not appropriate. Thus, even in a panic situation where cyclists are likely to attempt to lift their foot rather than rotate their foot relative to the bicycle pedal, the shoe can decouple from the bicycle pedal by the lifting motion. The amount of tilt that occurs at the coupling of the shoe to the pedal resulting from a tilt of the bicycle is used as the determining factor as to whether the situation is appropriate to decouple the shoe from the pedal by the lifting motion. When a tilt at the coupling, such as along a particular axis, exceeds a threshold which may be specific to that axis, then the shoe may be allowed to decouple from the bicycle pedal by the natural lifting motion of the foot.

Embodiments provide a method of allowing a decoupling of a shoe from a pedal of a bicycle, wherein a module having a coupling mechanism is present to couple the shoe to the pedal. The method involves detecting a tilt at the module and comparing the detected tilt to a threshold. While the detected tilt exceeds the threshold, the method further involves unlocking a release mechanism so that the unlocked release mechanism allows decoupling of the shoe from the pedal.

Embodiments provide a shoe that includes a shoe sole and a foot retention structure coupled to the shoe sole to retain a foot of a rider upon the shoe sole. The shoe further includes a module affixed to the shoe sole that includes a coupling mechanism configured to couple to a cleat that is configured to be retained by a bicycle pedal to couple the shoe to the bicycle pedal. The module includes a detection mechanism that detects a tilt at the module and includes a comparison mechanism that compares the detected tilt to a threshold. The module further includes a release mechanism that has a locked state to prevent decoupling of the cleat from the shoe, that has an unlocked state, and that becomes unlocked while the detected tilt exceeds the threshold so that the unlocked release allows decoupling of the cleat from the shoe to allow decoupling of the shoe from the pedal.

Embodiments provide a module for a shoe that includes a coupling mechanism configured to couple to a cleat that is configured to be retained by a catch of a bicycle pedal to couple the shoe to the bicycle pedal. The module further includes a detection mechanism configured to detect a tilt at the shoe, and the module further includes a comparison mechanism configured to compare the detected tilt to a threshold. The module also includes a release mechanism that has a locked state to prevent decoupling of the cleat from the shoe, that has an unlocked state, and that becomes unlocked while the detected tilt exceeds the threshold so that the unlocked release mechanism allows decoupling of the cleat from the shoe to allow decoupling of the shoe from the pedal.

Embodiments provide pedal for a bicycle that includes a base configured to be coupled to a crank of the bicycle, a catch configured to couple to a cleat of a shoe, and a module affixed to the base, the module comprising a coupling mechanism configured to couple the catch to the base. The module further includes a detection mechanism that detects a tilt at the base, and the module further includes a comparison mechanism that compares the detected tilt to a threshold. The module also further includes a release mechanism that has a locked state to prevent decoupling of the catch from the base, that has an unlocked state, and that becomes unlocked while the detected tilt exceeds the threshold so that the unlocked release mechanism allows decoupling of the catch from the base to allow decoupling of the shoe from the pedal.

DETAILED DESCRIPTION

Embodiments provide configurations of couplings between a shoe and a bicycle pedal that allow for decoupling of the shoe from the pedal using a natural lifting motion of the foot when in a situation where decoupling is appropriate. These embodiments further allow the coupling of the shoe to the pedal to remain during natural lifting motion of the foot to provide upward force at the pedal and into the crank in situations where decoupling is not appropriate. Thus, a rider of a bicycle may have a better chance of putting their foot to the ground or otherwise dismounting the bicycle in a crash or other panic scenario when the shoe has been coupled to the pedal while still being able to apply additional force into the crank using an upward motion of the foot during normal riding.

Figure 1:
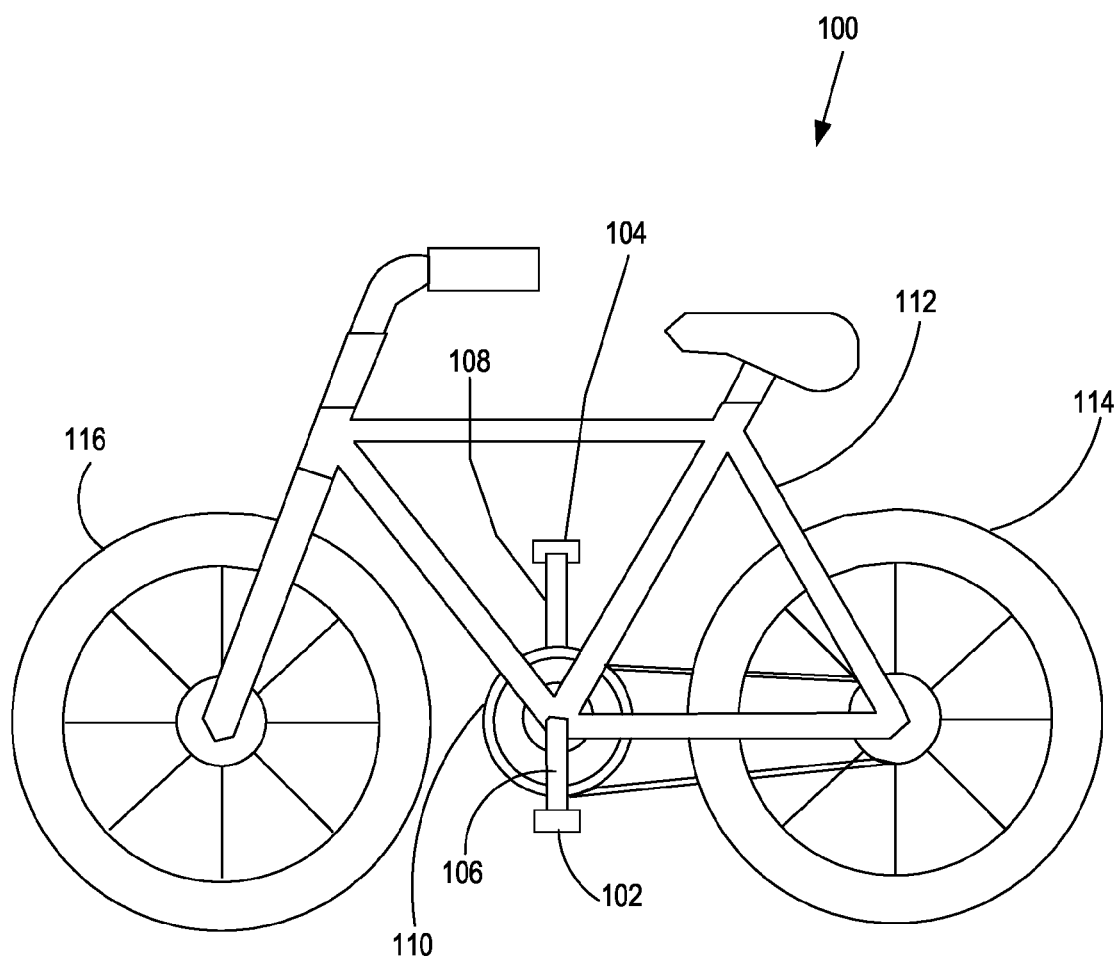
FIG. 1 shows a bicycle having a pedal that is configured to couple to a shoe.

FIG. 1 shows an example of a bicycle 100 that includes the typical components including a frame 112, a front wheel 116 and rear wheel 114 that are coupled to the frame. The bicycle 100 also includes the typical drivetrain including crank arms 106, 108 coupled to a gear or pulley wheel 110 that is in turn coupled to the gearing of the rear wheel 114 via belt or chain. A left pedal 102 is coupled directly to the left crank arm 106 while a right pedal 104 is coupled to the right crank arm 108.

The pedals 102, 104 may be of one of the many varieties of the clipless systems. In one example of the clipless system, a jaw or similar structure is included in the pedal to capture a cleat of the shoe, such as with the SHIMANO® SPD® and SPD-SL® clipless systems of Shimano, Inc. of Osaka, Japan or the CRANK BROTHERS® EGG-BEATER® clipless systems of Crank Brothers Company of Laguna Beach, CA. In another example of the clipless system, the pedal may include a flanged edge that captures an opposing flanged edge within the cleat, such as with the WAHOO® SPEEDPLAY® clipless systems of Wahoo Fitness Company of Atlanta, GA. The pedals 102, 104 may also be of any of the other several varieties of clipless systems.

Figure 2:
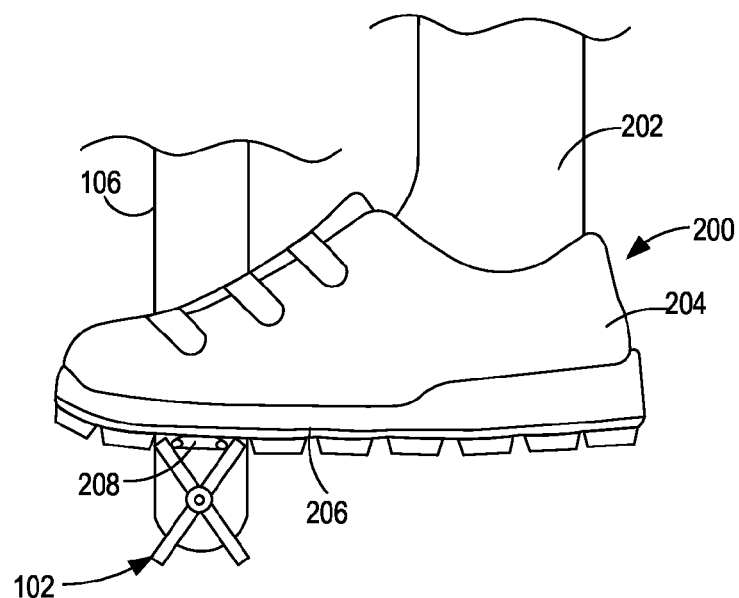
FIG. 2 shows a shoe that is coupled to the pedal.

FIG. 2 shows a view of the left crank arm 106 of the bicycle 100 and a left clipless pedal 102 where the left clipless pedal is directly coupled to the left crank arm 106. In this particular example, the left clipless pedal 102 is of the CRANK BROTHERS® EGGBEATER® clipless system type. However, as mentioned above, the left clipless pedal 102 may be of any clipless type. The left leg 202 of the rider has a left foot located in a shoe 200. The shoe 200 includes a foot retention structure such as an upper portion 204 where the foot is contained and a shoe sole 206 is attached so that the foot is retained atop the shoe sole 206. The shoe sole 206 may have multiple layers, such as an outer layer forming the bottom surface of the shoe 200 as well as layers between the outer layer and the foot of the rider. A cleat 208 is attached to the shoe 200, and the cleat 208 is captured by the left clipless pedal 102 to couple the shoe 200 to the pedal 102.

Figure 3:
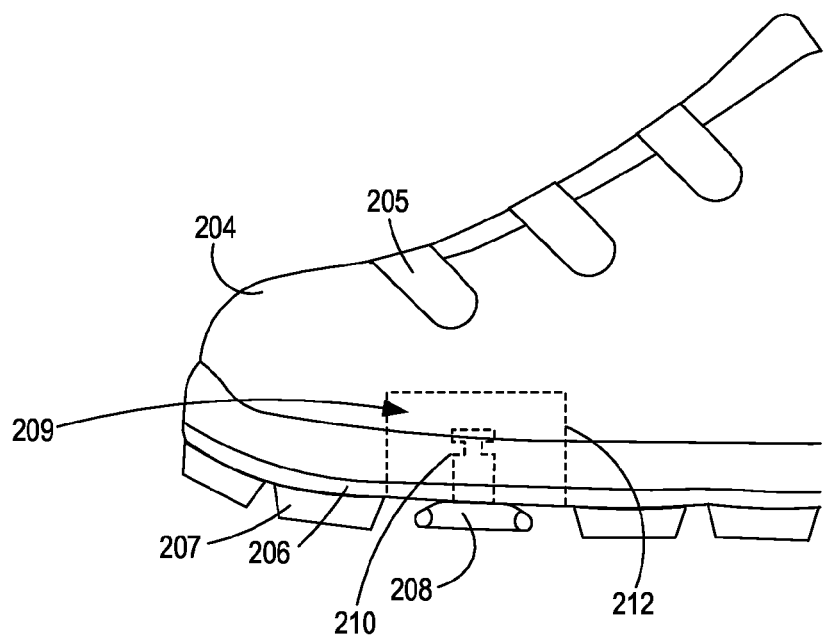
FIG. 3 shows a cleat and pin of a coupling that couples the shoe to the bicycle pedal.

FIG. 3 shows an example where the cleat 208, which may be any type of cleat for any type of clipless system, is installed on the shoe 200. In this example, the shoe 200 includes a module 212 that contains a coupling mechanism 209 that is discussed in greater detail below that receives one or more pins 210 that fasten the cleat 208 to the module 212 and hence to the shoe 200. The shoe 200 of this particular example includes treadblocks 207 formed at the shoe sole 206 and securing straps 205 attached to the upper section 204, but it will be appreciated that the shoe 200 may be of many designs for any type of riding such as road, track, cyclocross, off-road/mountain, and the like.

The module 212 and components therein including the coupling mechanism 209 provides an ability to couple and decouple the pins 210 in order to couple and decouple the cleat 208 to the module 212 and therefore ultimately couple and decouple the shoe 200 from the pedal 102 when the cleat 208 is coupled to both the shoe 200 and the pedal 102. As discussed in much greater detail below, the module 212 also includes a release mechanism that is responsive to an amount of tilt of the coupling of the shoe 200 to the cleat 208, which includes the amount of tilt of the module 212 coupled to the pins 210 and to the cleat 208. When the shoe 200 is coupled to the pedal 102, then this amount of tilt of the coupling of the shoe 200 to the cleat 208 is also the amount of tilt of the pedal 102 and the bicycle 100 as well as the coupling of the shoe 200 to the pedal 102. This amount of tilt may be measured from any reference, such as with respect to a horizontal plane normal to gravity or a vertical plane parallel to gravity and/or from any reference in between.

Regardless of the reference for measurement, the amount of tilt being measured is representative of the amount of tilt of the bicycle 100 for a particular axis of interest. For instance, the amount of tilt being measured for a given axis may represent the amount of side-to-side lean of the bicycle away from an upright position. As another example, the amount of tilt being measured for a given axis may represent the amount of front-to-back/back-to-front rotation of the bicycle away from a level position. The amount of tilt may be measured for multiple axes of interest, such as both the side-to-side lean as well as the front-to-back/back-to-front rotation, and the module 212 may be responsive to the amount of tilt of each axis independently and/or to an amount of tilt determined from a combination of the axes.

The tilt being measured of a given axis thereby provides insight into the potential for a crash and/or need for dismounting from the bicycle 100. Thus, when the amount of tilt being measured exceeds a threshold that signifies the increased likelihood of a crash or need to dismount, the module 212 may enter an unlocked release state whereby the pins 210 are no longer locked in position. The pins 210 remain held in position to maintain the coupling of the cleat 208 to the shoe 200 when the module 212 enters the unlocked release state but a natural lifting force by the foot of the rider pulls the pins 210 free from the module 212 to decouple the cleat 208 from the shoe 200, thereby freeing the shoe 200 and the foot of the rider from the pedal so that the rider may place the freed shoe 200 and foot on the ground to stabilize the bicycle 100 and/or dismount the bicycle 100. The manner in which the amount of tilt results in achieving this unlocked release state as well as how the module 212 retains the pin 210 and cleat 208 when in the unlocked release state are described in much greater detail below.

When this tilt does not exceed a threshold amount, the release mechanism of the module 212 remains in the locked state and the cleat 208 is held by the module 212 in a fixed position akin to a conventional installation where the cleat 208 is merely held in place by being screwed to a plate within the shoe 200. Thus, lifting upward does not cause the pin 210 to be released and therefore does not result in the cleat 208 decoupling from the shoe 200 so that the shoe 200 remains coupled to the pedal 102. However, while the module 212 has the release mechanism in the locked state so that the cleat 208 is fixed to the shoe 200, the cleat 208 can be released from the pedal 102 using a conventional release movement of the shoe 200, such as rotating the heel of the foot outward. This is shown in FIGS. 4 and 5.

Figure 4:
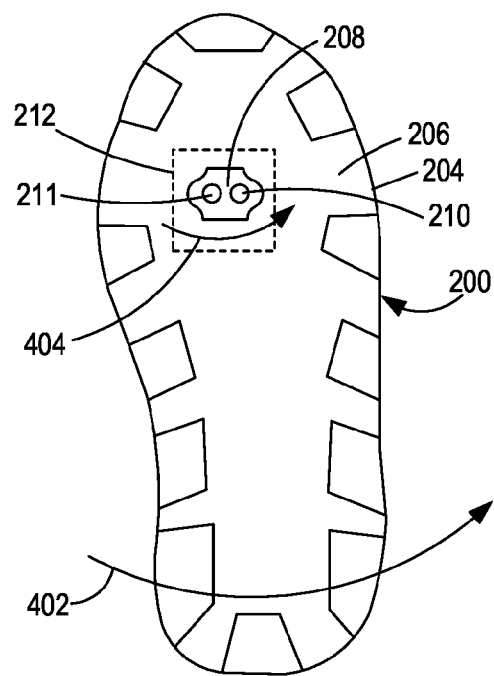
FIG. 4 shows a rotation of the shoe that allows for decoupling of the shoe from the bicycle pedal.
Figure 5:
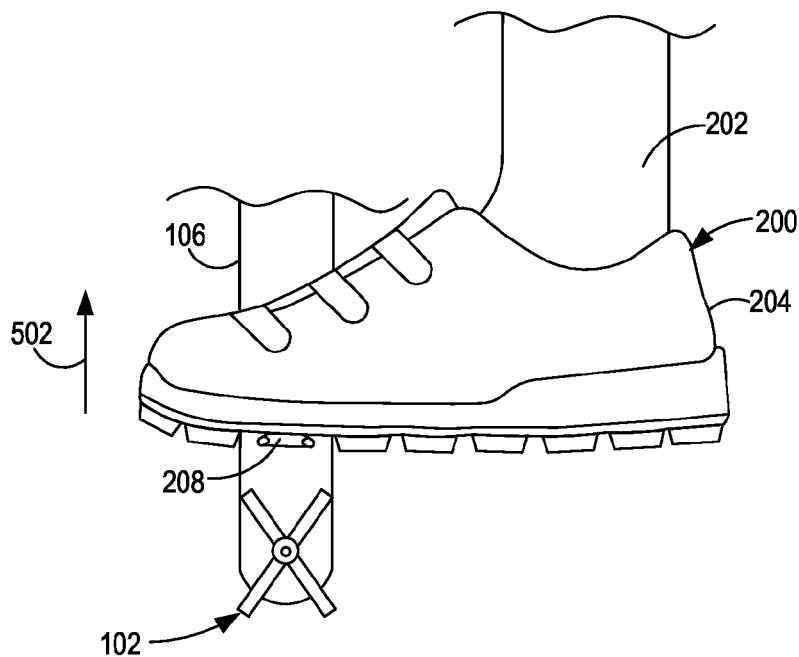
FIG. 5 shows the shoe being lifted away from the bicycle pedal once being released by rotation as shown in FIG. 4 where the cleat remains coupled to the shoe and released from the pedal.

FIG. 4 shows the bottom of the shoe 200 where the cleat 208 can be seen. In this example, the cleat 208 utilizes two pins 210, 211 to create the coupling to the module 212 within the shoe 200. Two pins are common for most off-road/mountain clipless systems. It will be appreciated that a cleat 208 having a different number of pins is also applicable for the present embodiments of the module 212. For instance, many road and cyclocross clipless systems use cleats 208 with three screws and therefore may utilize three pins in relation to a module 212 that accommodates three pins rather than only two.

FIG. 4 further shows that when the cleat 208 is coupled to the pedal 102 of the bicycle 100 while the module 212 maintains the release mechanism in the locked position, an outward rotation 402 of the heal which produces a rotation 404 at the cleat 208 releases the cleat 208 from the pedal 102 in the conventional manner. Thus, as shown in FIG. 5, once the cleat 208 is released from the pedal 102, the lifting force 502 of the foot away from the pedal 102 moves the foot, shoe 200 on the foot, and the cleat 208 coupled to the shoe 200 away from the pedal 102. Thus, the clipless system that includes the module 212 and cleat 208 works in conjunction with the clipless pedal 102 in the conventional manner for releasing the cleat 208 from the pedal 102.

FIGS. 6A-9B show examples of how the module 212 may allow the decoupling of the shoe from the cleat 208 in the unconventional manner based on the amount of tilt that occurs at the coupling of the shoe 200 to the pedal 102 and hence the amount of tilt of the bicycle 100. As stated above, when the amount of tilt of the bicycle 100 as detected at the coupling of the shoe 200 to the pedal 102 exceeds a tilt threshold, the module 212 allows the release mechanism of the module 212 to transition from a locked state to an unlocked release state. The examples of FIGS. 6A-9B show the resulting interaction of the module 212 entering the unlocked release state due to the amount of tilt exceeding the tilt threshold and the rider attempting to lift the foot away from the pedal 102 in a natural manner rather than attempting a conventional release of the cleat 208 from the pedal 102. However, it will be appreciated that regardless of the locked or unlocked release state of the module 212, the rider can still use the conventional manner of releasing the cleat 208 from the pedal 102 by rotating the heel outward should the rider so choose. Thus, in any of the circumstances shown in FIGS. 6A-9B, including prior to the shoe 200 being decoupled from the pedal 102 by the unlocked release mechanism of the module 212, the rider may rotate the heel outward to cause rotation of the cleat 208 relative to the pedal 102 to decouple the cleat 208 from the pedal 108 to thereby decouple the shoe 200 from the pedal 102.

Figure 6A:
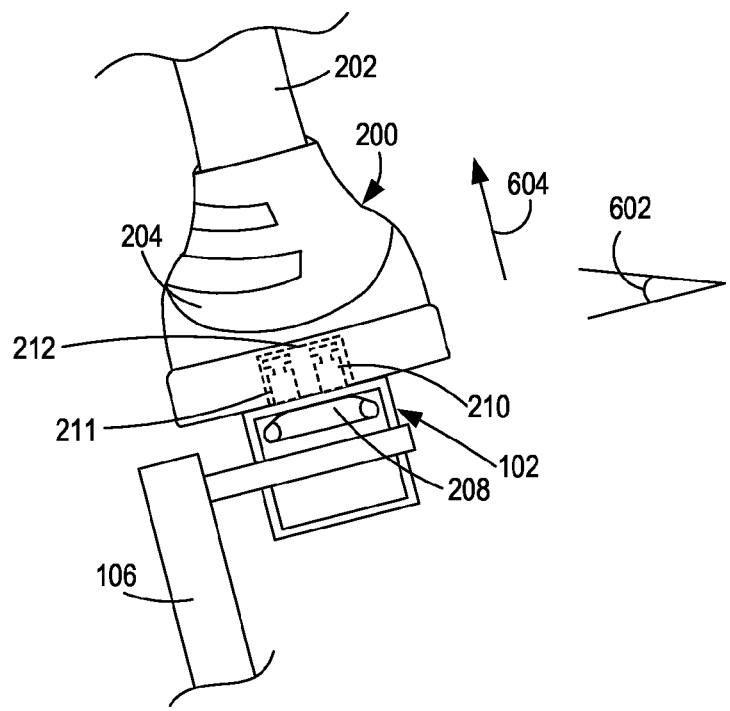
FIG. 6A shows a tilt of the bicycle, pedal, shoe, and coupling toward the right side of the bicycle while the shoe is coupled to the pedal.

In the example shown in FIG. 6A, the view is looking toward the front of the left shoe 200 as the shoe 200 is coupled to the pedal 102 of the bicycle 100 by the cleat 208 being captured by the pedal 102. The bicycle 100 and rider are leaning to the right at an angle 602 relative to a fully upright position. The rider may apply an upward force via the foot of the rider in the shoe 200, as indicated by arrow 604. In an emergency situation where the rider is about to crash or otherwise fall over, the upward force in the direction of arrow 604 may be an attempt to remove the foot and shoe 200 from the pedal 102 so that the foot and shoe 200 may be placed on the ground or to fully dismount the bicycle 100.

Figure 6B:
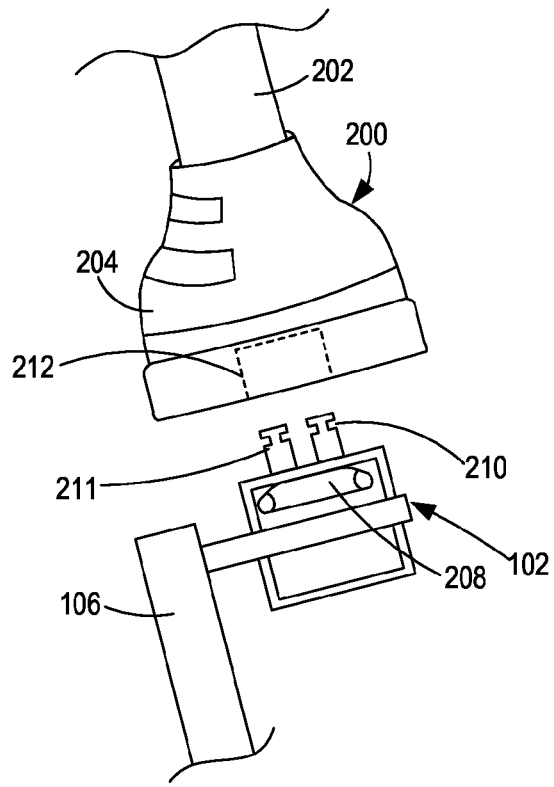
FIG. 6B shows the tilt of the bicycle from FIG. 6A once the shoe has been decoupled from the pedal to allow the shoe to be lifted away from the pedal in the natural direction.

Once the angle 602 exceeds a tilt threshold established by the module 212, the release mechanism of the module 212 becomes unlocked so that the upward lifting force in the direction of arrow 604 is able to pull the shoe free from the pedal 102 as shown in FIG. 6B by releasing the pins 210, 211 from the module 212. Thus, the cleat 208 becomes decoupled from the shoe 200 so that the shoe 200 becomes decoupled from the pedal 102. As shown in FIG. 6B, the pedal 102 continues to retain the cleat 208 and pins 210, 211 in this particular example. As discussed in more detail below, the pins 210, 211 and cleat 208 can be coupled back to the module 212 and shoe 200 even while remaining in the pedal 102 once the rider decides to remount the bicycle 100.

Figure 7A:
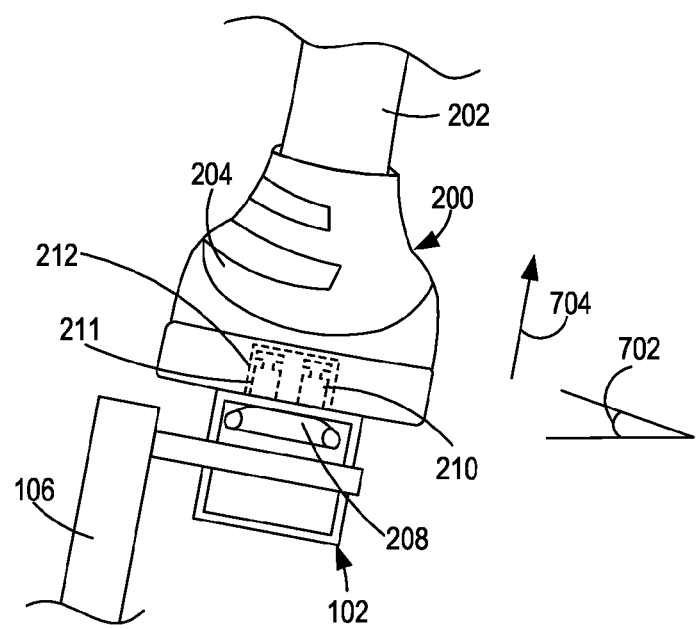
FIG. 7A shows a tilt of the bicycle, pedal, shoe, and coupling toward the left side of the bicycle while the shoe is coupled to the pedal.

In the example shown in FIG. 7A, the view is looking toward the front of the left shoe 200 as the shoe 200 is coupled to the pedal 102 of the bicycle 100 by the cleat 208 being captured by the pedal 102. The bicycle 100 and rider are leaning to the left at an angle 702 relative to a fully upright position. The rider may apply an upward force via the foot of the rider in the shoe 200, as indicated by arrow 704. In an emergency situation where the rider is about to crash or otherwise fall over, the upward force in the direction of arrow 704 may be an attempt to remove the foot and shoe 200 from the pedal 102 so that the foot and shoe 200 may be placed on the ground or to fully dismount the bicycle 100.

Figure 7B:
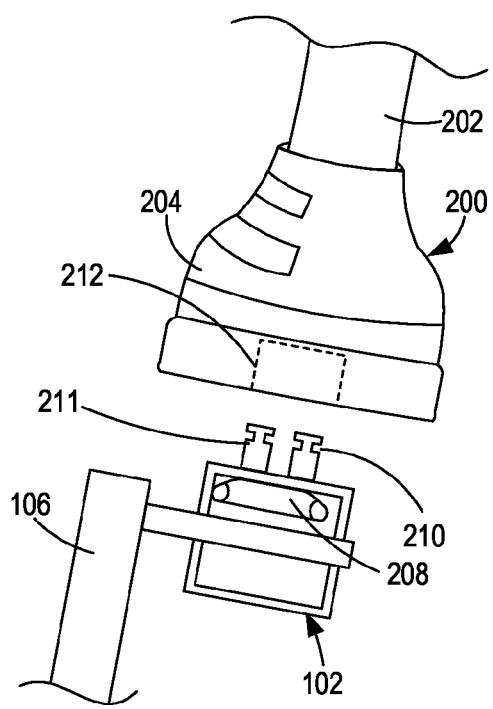
FIG. 7B shows the tilt of the bicycle from FIG. 7A once the shoe has been decoupled from the pedal to allow the shoe to be lifted away from the pedal in the natural direction.

Once the angle 702 exceeds a tilt threshold established by the module 212, the release mechanism of the module 212 becomes unlocked so that the upward lifting force in the direction of arrow 604 is able to pull the shoe free from the pedal 102 as shown in FIG. 7B by releasing the pins 210, 211 from the module 212. Thus, the cleat 208 becomes decoupled from the shoe 200 so that the shoe 200 becomes decoupled from the pedal 102. As shown in FIG. 7B, the pedal 102 continues to retain the cleat 208 and pins 210, 211 in this particular example. As discussed in more detail below, the pins 210, 211 and cleat 208 can be coupled back to the module 212 and shoe 200 even while remaining in the pedal 102 once the rider decides to remount the bicycle 100.

Note that the angle 702 is in the opposite direction from the upright position than the angle 602 of FIGS. 6A and 6B. Thus, the tilt threshold may be specified for both directions so that the release mechanism unlocks when the bicycle 100 leans beyond the tilt threshold of either direction. Furthermore, while FIGS. 6A-7B show the left shoe 200, another module 212 may be included in the right shoe of the rider so that the right shoe can decouple from the right pedal 104 once the tilt threshold of the module 212 of the right shoe is exceeded in either direction in the same manner that the left shoe 200 decouples from the pedal 102.

Figure 8A:
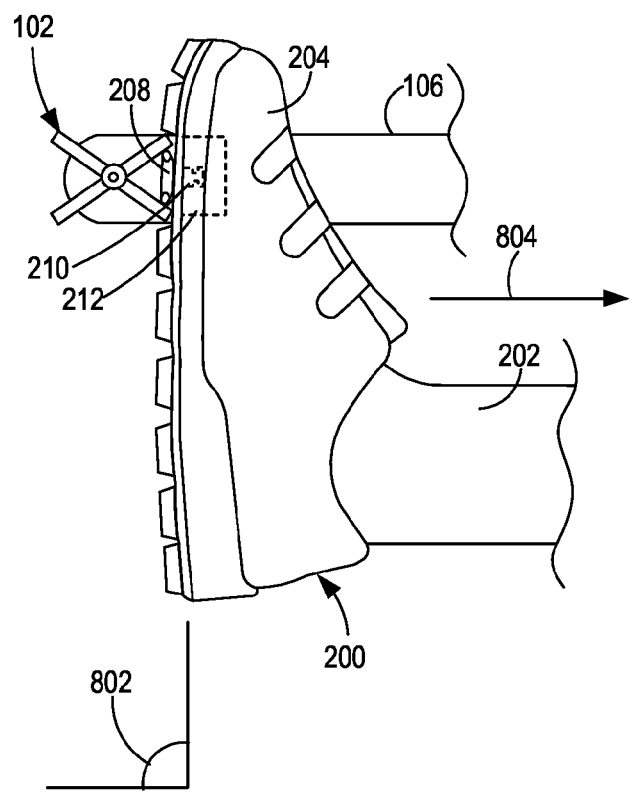
FIG. 8A shows a tilt of the bicycle, pedal, shoe, and coupling toward the rear of the bicycle while the shoe is coupled to the pedal.

In the example shown in FIG. 8A, the view is looking toward the left side of the left shoe 200 as the shoe 200 is coupled to the pedal 102 of the bicycle 100 by the cleat 208 being captured by the pedal 102. The bicycle 100 and rider are rotated backwards, such as in the position known as a wheelie or a manual, at an angle 802 relative to a fully level position. The rider may apply a rearward force, which is akin to the upward force of FIGS. 6A-7B, via the foot of the rider in the shoe 200, as indicated by arrow 804. In an emergency situation where the rider is about to crash or otherwise fall over backwards, the rearward force in the direction of arrow 804 may be an attempt to remove the foot and shoe 200 from the pedal 102 so that the foot and shoe 200 may be placed on the ground or to fully dismount the bicycle 100.

Figure 8B:
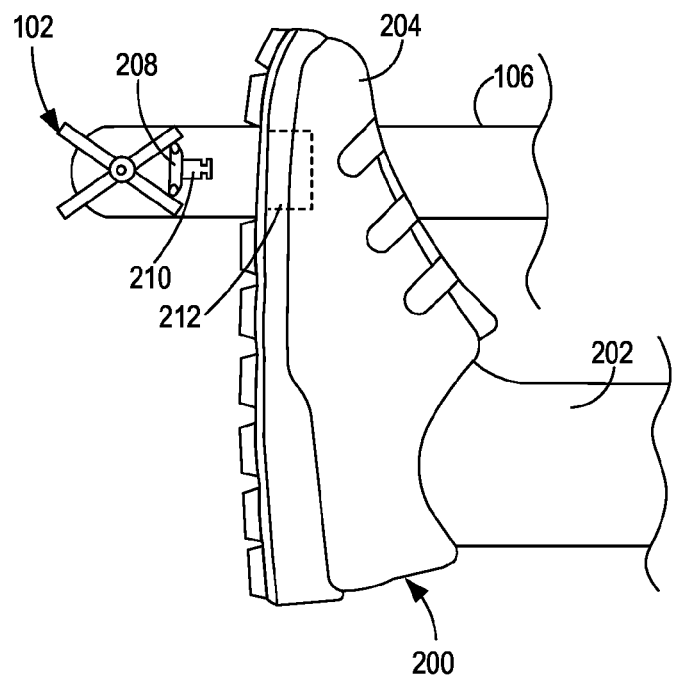
FIG. 8B shows the tilt of the bicycle from FIG. 8A once the shoe has been decoupled from the pedal to allow the shoe to be lifted away from the pedal in the natural direction.

Once the angle 802 exceeds a tilt threshold established by the module 212, the release mechanism of the module 212 becomes unlocked so that the rearward lifting force in the direction of arrow 804 is able to pull the shoe free from the pedal 102 as shown in FIG. 8B by releasing the pins 210, 211 (211 not shown) from the module 212. Thus, the cleat 208 becomes decoupled from the shoe 200 so that the shoe 200 becomes decoupled from the pedal 102. As shown in FIG. 8B, the pedal 102 continues to retain the cleat 208 and pins 210, 211 in this particular example. As discussed in more detail below, the pins 210, 211 and cleat 208 can be coupled back to the module 212 and shoe 200 even while remaining in the pedal 102 once the rider decides to remount the bicycle 100.

Figure 9A:
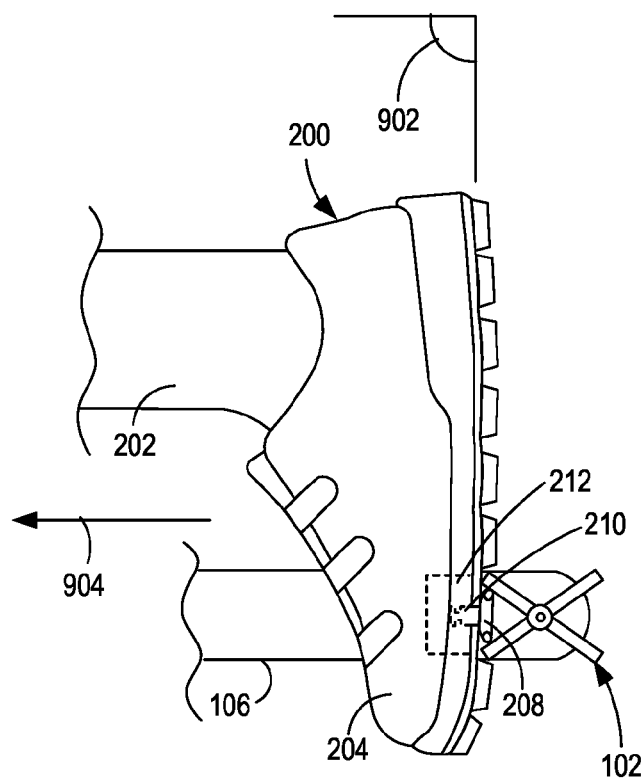
FIG. 9A shows a tilt of the bicycle, pedal, shoe, and coupling toward the front of the bicycle while the shoe is coupled to the pedal.

In the example shown in FIG. 9A, the view is looking toward the front of the left shoe 200 as the shoe 200 is coupled to the pedal 102 of the bicycle 100 by the cleat 208 being captured by the pedal 102. The bicycle 100 and rider are rotated forward at an angle 902 relative to a fully level position. The rider may apply a forward force via the foot of the rider in the shoe 200, as indicated by arrow 904. In an emergency situation where the rider is about to crash or otherwise fall over in the forward direction, the forward force in the direction of arrow 904 may be an attempt to remove the foot and shoe 200 from the pedal 102 so that the foot and shoe 200 may be placed on the ground or to fully dismount the bicycle 100.

Figure 9B:
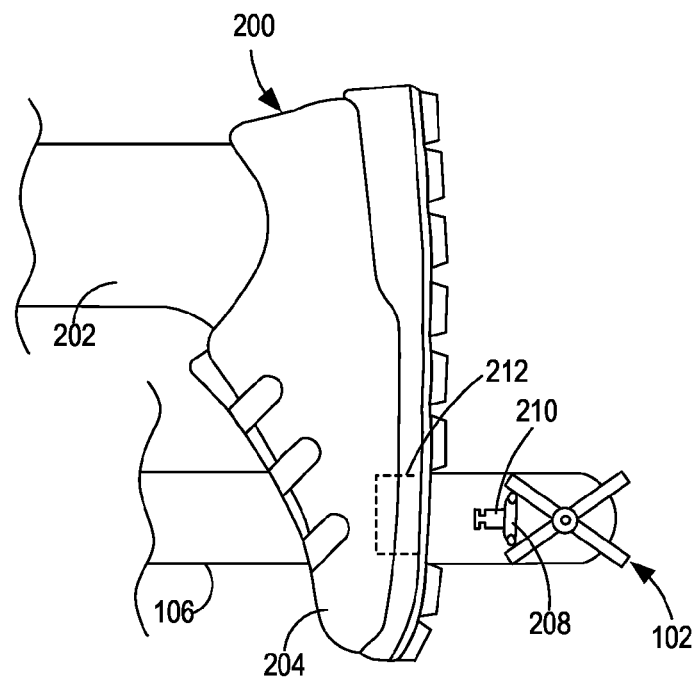
FIG. 9B shows the tilt of the bicycle from FIG. 9A once the shoe has been decoupled from the pedal to allow the shoe to be lifted away from the pedal in the natural direction.

Once the angle 902 exceeds a tilt threshold established by the module 212, the release mechanism of the module 212 becomes unlocked so that the forward lifting force in the direction of arrow 904 is able to pull the shoe free from the pedal 102 as shown in FIG. 9B by releasing the pins 210, 211 (211 not shown) from the module 212. Thus, the cleat 208 becomes decoupled from the shoe 200 so that the shoe 200 becomes decoupled from the pedal 102. As shown in FIG.

9B, the pedal 102 continues to retain the cleat 208 and pins 210, 211 in this particular example. As discussed in more detail below, the pins 210, 211 and cleat 208 can be coupled back to the module 212 and shoe 200 even while remaining in the pedal 102 once the rider decides to remount the bicycle 100.

Note that the angle 902 is in the opposite direction from the level position than the angle 802 of FIGS. 8A and 8B. Thus, the tilt threshold may be specified for both directions so that the release mechanism unlocks when the bicycle 100 rotates beyond the tilt threshold of either direction. Furthermore, while FIGS. 8A-9B show the left shoe 200, another module 212 may be included in the right shoe of the rider so that the right shoe can decouple from the right pedal 104 once the tilt threshold of the module 212 of the right shoe is exceeded in either direction in the same manner that the left shoe 200 decouples from the pedal 102. Furthermore, the module 212 in the left and right shoes 200 may unlock the release mechanism of the module 212 for any or all of the lean angle and rotation directions discussed above with respect to FIGS. 6A-9B.

Figure 10:
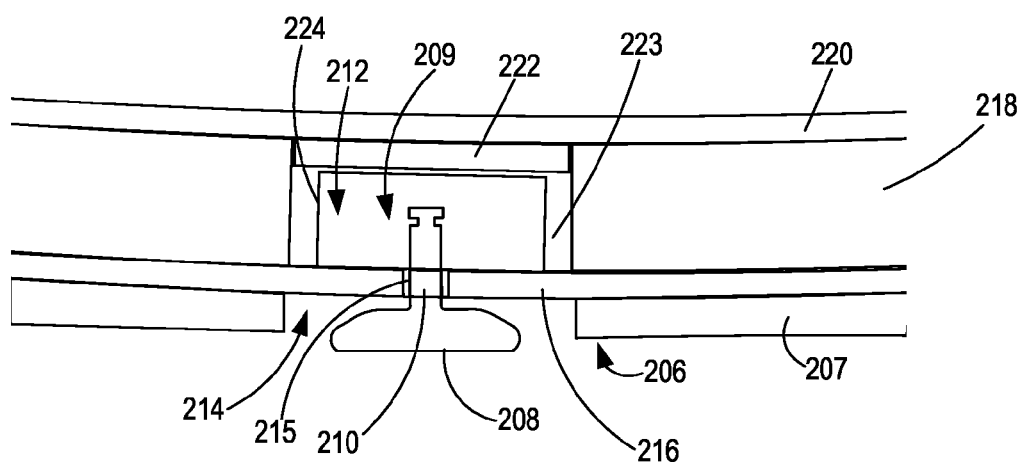
FIG. 10 shows a cross-sectional view of a portion of a shoe sole that includes a module that includes a coupling to a cleat that allows for decoupling of the cleat.

FIG. 10 shows a cross-sectional lateral view of the shoe 200 with the cut taken longitudinally through the shoe 200 at the center of the pin 210 with the coupling mechanism 209 in association with the pin 210 holding the cleat 208 to the module 212 and shoe 200. While this cut is through the module 212, no internal components of the module 212 are shown for purposes of clarity, although the portion of the pin 210 inserted into the module 212 is shown, as the purpose of FIG. 10 is to demonstrate the layers of the shoe 200 that may be present to surround and support the module 212. Internal components of the module 212 and their operation are discussed in more detail with respect to subsequent figures.

This cut taken in FIG. 10 is also through the center of pin 210, and thus through the cleat 208. It will be appreciated that the pins 210, 211, as well as any additional pin(s) present to hold the cleat 208, may be formed integrally with the cleat 208 as it appears in FIG. 10. Alternatively, the pins 210, 211 may be separate components from the cleat 208. Conventional cleats 208 have holes for screws and therefore separate pins 210, 211 may be used with any cleats 208, including conventional ones, that have such holes.

As shown in FIG. 10, the shoe 200 of this example includes several layers. The shoe sole 206 in this example provides multiple layers that may be present to provide the bottom surface of the shoe 200, including treadblocks 207 and/or other outermost surfaces may be integral or attached to an outsole layer 216. These treadblocks 207 and/or other outermost surfaces may be a material that provides additional traction, such as rubber. The outsole layer 216 may be a more rigid material such as a hard plastic that extends end-to-end of the shoe 200 and provides a stable platform for pedaling. Alternatively, the outsole layer 216 may include a rigid portion where the cleat 208 is installed and be less rigid in other areas over the length of the shoe 200. Regardless, the outsole layer 216 provides a stable foundation for the location of the module 212. The module 212 may include a housing that is attached to the outsole layer 216 such as by screws, adhesives, and the like that are not shown in this figure.

In this example, the outsole 216 and the treadblocks 207 are configured so that the cleat 208 may be installed in an area 214 between the treadblocks 207 and in contact or near contact with the outsole 216. Additionally, the outsole 216 includes a hole 215 for each pin 210, 211 to be used to install the cleat 208. Where the module 212 is affixed to the outsole 216 in a static position, the hole 215 may be a circular hole aligned with pin holes in the housing of the module 212. However, where the module 212 is affixed to the outsole 216 in a manner that allows the module 212 to have an adjustable position, such as by having slots for mounting screws of the module 212, each hole 215 in the outsole 216 for a given pin 210, 211 may also be a slot, or a line of multiple holes in the series allowing the cleat 208 to be coupled to the module 212 for any position of the module on the outsole 216. The movable module 212 and cleat 208 may allow a rider to place the cleat 208 in a desired position.

The shoe 200 may include additional layers, such as a conventional layer of cushioning 218 that may form a compartment 223 where the module 212 resides. The compartment 223 may be sized to allow the module 212 to be movable as discussed above. In some examples, the cushioning 218 may surround but not cover the module 212 to allow the module 212 to be installed or removed from the shoe 212. In such a case, a separate removable cushion 222 constructed of conventional cushioning may cover the module 212. An insole 220 may then reside above the cushioning 218 and the separate cushion 222 where the foot of the rider rests on the insole 220. The cushioning 218 and separate cushion 222 together with the insole 220 thereby provide comfort to the foot of the rider.

An example of the release mechanism 256 forming a part of the module 212 and the multiple states of operation of the release mechanism 256 are shown and demonstrated in FIGS. 11-14. The release mechanism 256 of this example includes a releaser sub-module 246, a fixation arm 238, a biasing member 240, and an interference member 232 including one or more fixation arm extensions such as a first fixation arm extension 234 and a second fixation arm extension 236.

An example of a coupling mechanism 209 is also shown and demonstrated in FIGS. 11-14. The coupling mechanism 209 includes a block 226 that creates a passageway for pins 210, 211 while guiding the tips 244, 242 of the fixation arm extensions 234, 236 to the pins 210, 211. As shown, there may be a fixation arm 234, 236 for each pin 210, 211 to couple the cleat 208 to the shoe 200.

These mechanisms 209, 256 may be enclosed by a housing 224 of the module 212, such as a metal enclosure. The housing 224 resides in the compartment 223 and may be affixed to the outsole layer 216. The outsole layer 216 in some examples may include an additional layer 217 upon which the housing 224 is affixed, such as a rigid metal that also includes the hole 215 shown in FIG. 10 to allow the pin 210 to pass through. The housing 224 may be affixed to the layer 216 and/or 217 by way of fasteners such as screws, by adhesives, by a weld, and the like. Otherwise, the housing 224 may reside in the compartment 223 atop the outsole layer(s) 216, 217 with the presence of the foot of the rider atop the insole 220 and cushion 222 to maintain the module 212 within the compartment 223 when the module 212 is not coupled to the pins 210, 211 and cleat 208.

Figure 13:
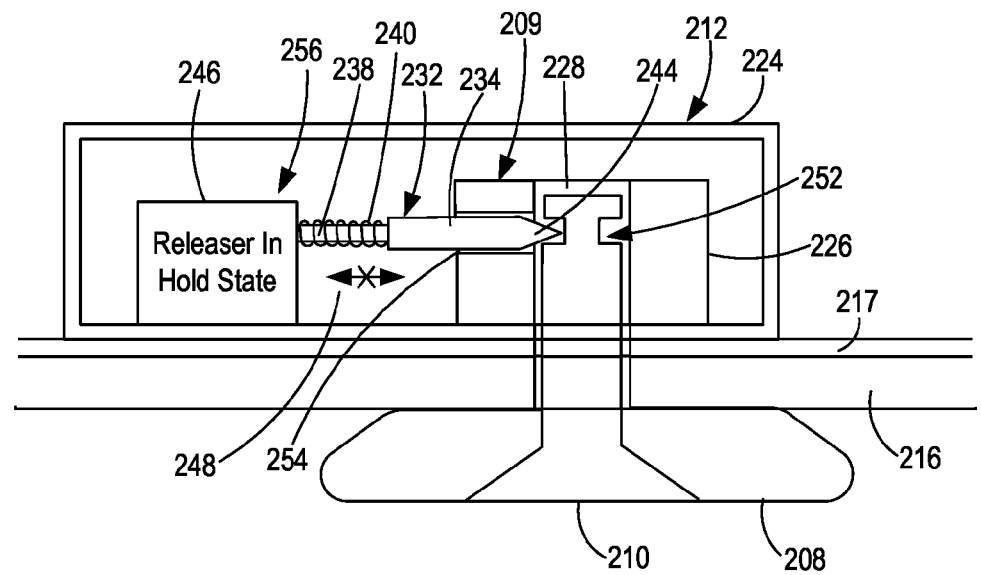
FIG. 13 shows a cross-sectional view of a portion of a shoe sole that includes the module of FIG. 11 while the release mechanism of the coupling is in the locked state that provides the hold state relative to the cleat.
Figure 14:
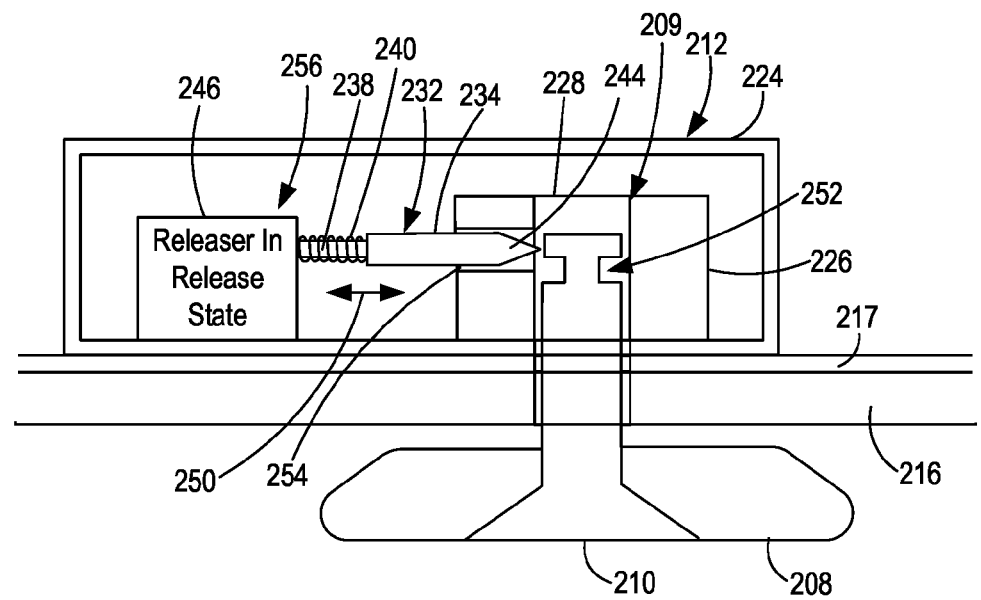
FIG. 14 shows a cross-sectional view of a portion of a shoe sole that includes the module of FIG. 11 while the release mechanism of the coupling is in the unlocked state that provides the release state relative to the cleat.

The block 226 includes cylindrical holes 228, 230 where the pins 210, 211 are located when inserted. These holes 228, 230 may continue through the floor of the housing 224 nearest the cleat 208 as shown in FIGS. 13 and 14. The block 226 also includes holes 254 that allows the arm extensions 234, 236 to be inserted into the block 226.

It can be seen that the fixation arm extensions 234, 236 have tips 244, 242 that engage the pins 210, 211 to create an interference fit while the releaser sub-module 246 is in a hold state. The engagement occurs by the pins 210, 211 having a feature such as a reduced radius portion 252 where the tips 244, 242 reside to create the interference. The hold state may occur in either a locked state or an unlocked state of the release mechanism 256 as provided by the releaser sub-module 246. In this hold state, the arm extensions 234, 236 are held in position by the biasing member 240 maintaining the tips 244, 242 in engagement with the feature 252 of the pins 210, 211 so that the pins 210, 211 cannot escape from the block 226 due to insubstantial force from gravity, regardless of whether the release mechanism is locked or unlocked. The tips 244, 242 may include a shape, such as a double chamfer as shown in FIGS. 13 and 14 so that force on the pins 210, 211 either during insertion of removal of the pins 210, 211 can cause movement of the arm extensions 234, 236 away from the pins 210, 211 to allow the pins 210, 211 to be fully inserted or fully removed when the release mechanism 256 is in the unlocked state.

When the release mechanism 256 is locked by the releaser sub-module 246, meaning the fixation arm 238 and interference member 232 cannot move away from the pins 210, 211 as indicated by the anti-movement symbol 248, the arm extensions 234, 236 are therefore prevented from moving away from the pins 210, 211 even when a substantial force is being applied to the pins 210, 211, such as when the rider is lifting upward from the pedal 102. This locked state thereby prevents the pins 210, 211 from escaping the cylinder block 226 and as a result, interference with the cleat 208 is maintained so that the cleat 208 remains coupled to the shoe 200 in a fixed position.

Figure 11:
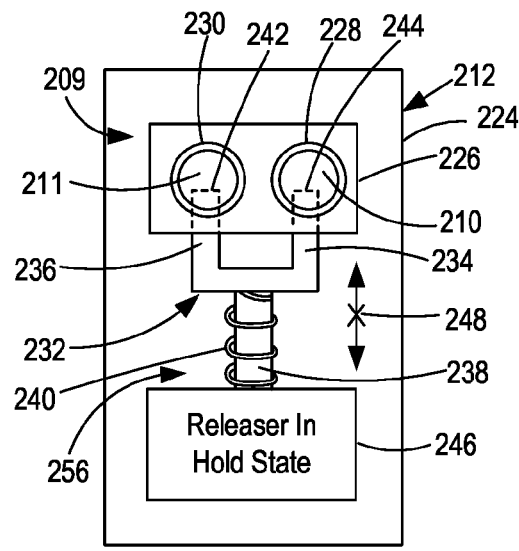
FIG. 11 shows an example of the module that includes the coupling while a release mechanism of the coupling is in a locked state that provides a hold state relative to the cleat.
Figure 12:
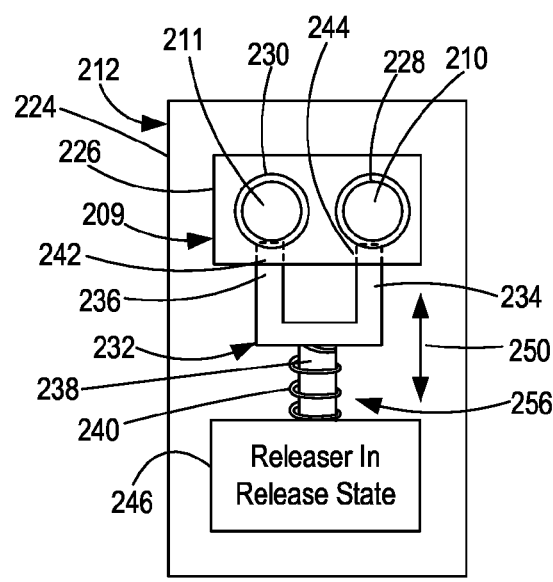
FIG. 12 shows an example of the module of FIG. 11 while the release mechanism is in an unlocked state that provides a release state relative to the cleat.

When the release mechanism 256 is in an unlocked state by the releaser sub-module 246, then the hold state of the releaser sub-module 246 as shown in FIGS. 11 and 13 does not prevent a substantial force upon the pins 210, 211 from moving the pins 210, 211, as indicated by the movement symbol 250 of FIGS. 12 and 14. When the rider pulls the foot and shoe 200 away from the pedal 102 in the natural lifting motion, the force on the pins 210, 211 is directed to the tips 244, 242 of the arm extensions 234, 236 which causes the arm extensions 234, 236 and fixation arm 238 to move away from the pins 210, 211 and compress the biasing member 240, considering the biasing member 240 provides only a small fraction of the amount of force that the rider is capable of applying to the fixation arm 238. This movement 250 removes the tips 244, 242 from engagement with the pins 210, 211 as shown so that nothing holds the pins 210, 211 within the block 226. Thus, the pins 210, 211 come free from the block 226 which thereby decouples the cleat 208 from the shoe 200 so that the shoe is decoupled from the pedal 102. As shown in FIG. 14, the pin 210 has begun to drop within the hole 228 by being able to push the tip 244 and fixation arm extension 234 away from the pin 210 so that the pin 210 and cleat 208 can fully separate and therefore be fully decoupled from the shoe 200 to which the module 212 is affixed.

Once the pins 210, 211 have traveled below the respective arm extensions 234, 236, the biasing member 240 then immediately returns the respective arm extensions 234, 236 to the normal position, i.e., the position shown in FIGS. 11 and 13 that would lock the pins 210, 211 in place within the respective holes 228, 230 had the pins 210, 211 still been present in the fully inserted position within the respective holes 228, 230. Because the removal of the pins 210, 211 from the respective holes 228, 230 happens very quickly, the release mechanism 256 remains unlocked during that instant at which the biasing member 240 is forcing the arm extensions 234, 236 back toward the normal position so that the arm extensions 234, 236 are allowed to return to that normal position.

The pins 210, 211 with cleat 208 may be reinstalled at the shoe 200 by simply inserting the pins 210, 211 into the respective holes 228, 230 and forcing the pins 210, 211 to press against the tips 244, 242 and thereby move the respective arm extensions 234, 236 to allow the pins 210, 211 to become fully inserted into the respective holes 228, 230 while the release mechanism 256 is in the unlocked state. For such reinstallation of the pins 210, 211 and the cleat 208, the shoe 200 may be sufficiently tilted by the rider to cause the release mechanism 256 to enter the unlocked state, which then becomes locked again once the shoe 200 is no longer tilted by the rider after the pins 210, 211 and cleat 208 have been reinstalled. As an alternative, a bypass feature may be present for some embodiments, which is discussed in more detail below with reference to FIGS. 25, 26, 33, 34, and 38.

Various materials may be used for the components of the module 212. For instance, the housing 224 may be constructed of a rigid material such as various metals, particularly those that are less prone to corrosion like aluminum or stainless steel grade 303. Likewise, the block 226, pins 210, 211, fixation arm 238 and interference member 232 including fixation arm extensions 234, 236 may also be constructed of tough rigid materials able to withstand shear forces produced by a rider such as various metals that are also less prone to corrosion like stainless steel grade 303.

The releaser sub-module 246 may be implemented in a variety of ways. For instance, the releaser sub-module 246 may be implanted as an entirely mechanical releaser sub-module 1500 such as that shown in FIGS. 15-18. In this example, the releaser sub-module 1500 includes an enclosure 1502 that defines an open channel 1504 on the interior that contains a detection mechanism that detects tilting at the module 212 by using a ball 1510 located within a detent 1506 where the ball 1510 can move as a result of the tilt at the module 212. The enclosure 1502 is shown in cross-section in FIGS. 15 and 16 and is shown with transparency in FIGS. 17 and 18 for purposes of clarity. The channel 1504 includes the detent 1506 which defines an edge on each side where the edges of the detent 1506 act as a comparison mechanism that compares tilt as detected by movement of the ball 1510 to a threshold where height of the edge of the detent 1506 establishes the threshold as a physical amount of tilt. When the ball 1510 moves out of the detent 1506, the tilt of the module 212 has exceeded the tilt threshold established by the detect 1506.

Figure 15:
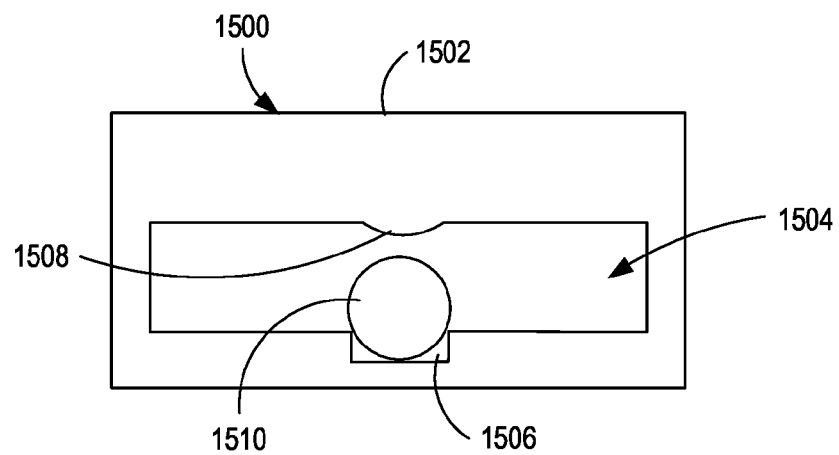
FIG. 15 shows a cross-sectional view of a first example of a locking mechanism of the release mechanism that includes an object creating interference to provide the locked state for maintaining the coupling to the cleat.
Figure 17:
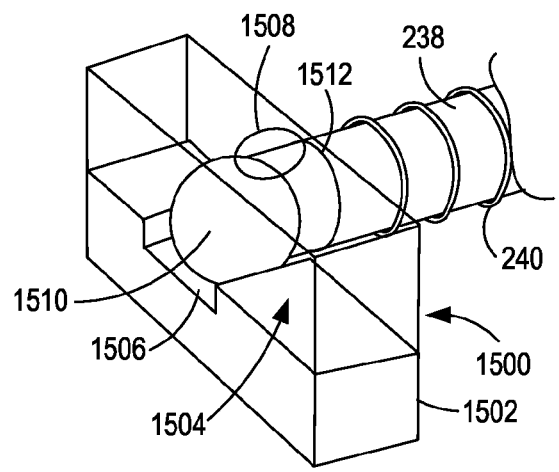
FIG. 17 shows a perspective transparent view of the first example of a locking mechanism of the release mechanism that includes the object creating interference.

When the ball 1510 is in the detent 1506, the ball 1510 creates interference with the fixation arm 238 by acting as an obstruction, considering the fixation arm 238 enters the channel 1504 through a port 1512 in the enclosure 1502. The obstructed fixation arm 238 along with the fixation extension arms 234, 236 form the release mechanism in this example. During a time when the rider is applying upward force to pull up on the pedal 102 of the bicycle 100 while the bicycle 100 is not sufficiently tilted, the ball 1510 has not experienced adequate tilt to escape the detent 1506 and remains an obstruction to the fixation arm 238 so that the cleat 208 does not release from the shoe 200 and so that the shoe 200 remains coupled to the pedal 102. The pins 210, 211 cannot release due to the obstruction created by the ball 1510. This is shown in FIGS. 15 and 17.

Figure 16:
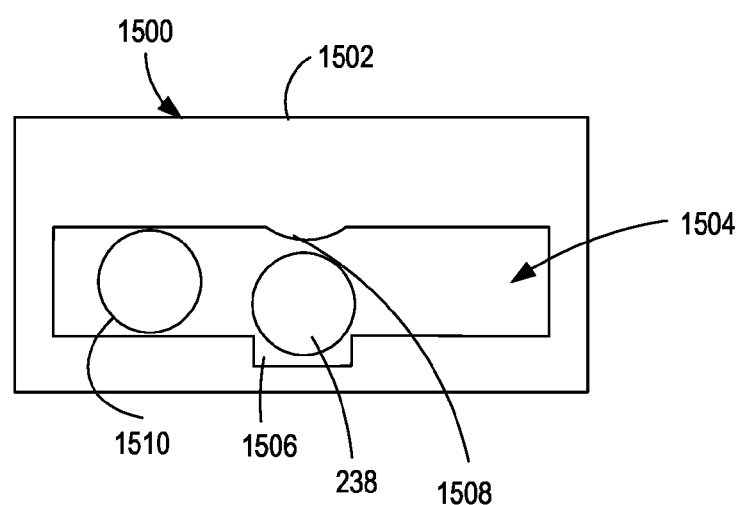
FIG. 16 shows a cross-sectional view of the first example of a locking mechanism of the release mechanism that includes the object that has moved due to a tilting to no longer create interference to provide the unlocked state for allowing decoupling of the cleat.
Figure 18:
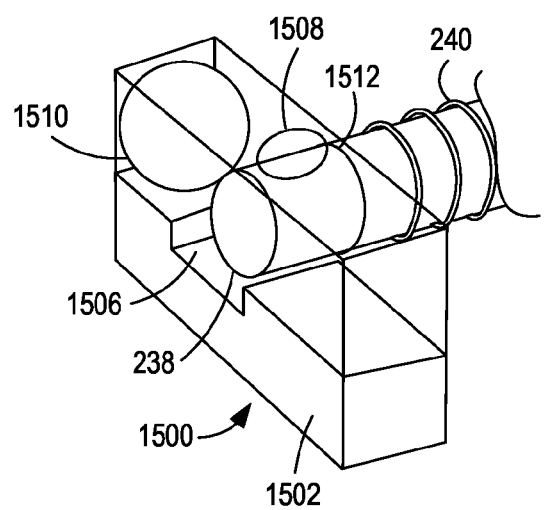
FIG. 18 shows a perspective transparent view of the first example of a locking mechanism of the release mechanism that includes the object that has moved due to a tilting to no longer create interference.

However, once the bicycle 100 has tilted sufficiently and the ball 1510 has rolled out of the detent 1506, the ball 1510 no longer acts as an obstruction to the fixation arm 238. Thus, if the rider pulls upward on the shoe 200 with enough force to overcome the bias of the biasing member 240, then the fixation arm 238 is forced further into the channel 1504 as shown in FIGS. 16 and 18, thereby releasing the pins 210, 211 and allowing the cleat 208 to be decoupled from the shoe 200 so that the shoe 200 can escape from the pedal 102.

Other features may be present to assist in the detection of tilt that exceeds the threshold in order to release the pins 210, 211. For instance, the channel 1504 may have a slight upward pitch extending away from the detent 1506 in both directions to encourage the ball 1510 to roll back into the detent 1506 should the ball 1510 escape from the detent 1506 due to a sufficient amount of tilt of the channel 1504 to one side or the other. When it is desirable for the releaser mechanism 256 to become unlocked due to a left or right tilt of the bicycle, then the channel 1504 runs left-to-right in the shoe 200 so that the ball 1510 may roll to the left or right due to the tilt of the bicycle 100 and pedal 102 to which the shoe 200 is coupled via the cleat 208.

Because there must be clearance about the ball 1510 to allow the ball 1510 to move, the ball is subject to bouncing within the channel 1504 while in the detent due to vibrations and motions of the bicycle and shoe 200. The reduce the likelihood of the ball 1510 bouncing out of the detent 1506 without the bicycle being tilted to the degree that is intended to release the ball 1510 from the detent, the channel 1504 may also include a reflector 1508 to aid in minimizing the amount of bounce and re-direct the ball 1510 to the detent 1506. However, the reflector 1508 does not restrict the ball 1510 from rolling out of the detent 1506 due to the sufficient tilt. Additionally, the channel 1510 may contain a low viscosity fluid that attenuates erratic movement of the ball 1510 yet does not restrict the ball from rolling out of the detent 1506 due to the sufficient tilt. In that case, the port 1512 may include a seal about the fixation arm 238 to limit the ability of the fluid to escape the channel 1504.

The enclosure 1504 and ball 1510 may be constructed of a rigid material such as one of various metals, like stainless steel grade 303. In this example, it is beneficial to limit the amount of friction created between the fixation arm 238 and the ball 1510 so that if the rider is applying upward pressure that then causes the fixation arm 238 to apply pressure to the ball 1510, this pressure does not lock the ball 1510 in the detent. Therefore, both objects may be constructed of a rigid metal able to be coated in a low friction substance such as polytetrafluoroethylene. Additionally or alternatively, the rider could train to avoid pulling up on the pedal during a tilting motion of the bicycle until a point after which the tile has become sufficient for the ball 1510 to escape the detent.

It will be appreciated that the amount of tilt necessary for the ball 1510 to escape the detent 1506 can be dictated by the depth of the detent 1506 relative to the diameter of the ball 1510. For a given depth of the detent 1506, the larger the diameter of the ball 1510, the lesser the amount of tilt needed for the ball 1510 to escape the detent 1506. As different riders may prefer differ amounts of tilt for releasing the shoe 200 from the pedal, riders may be given different options for the amount of tilt that results in a release of the shoe 200, where each option has a different relationship of detent depth to ball diameter.

Figure 19:
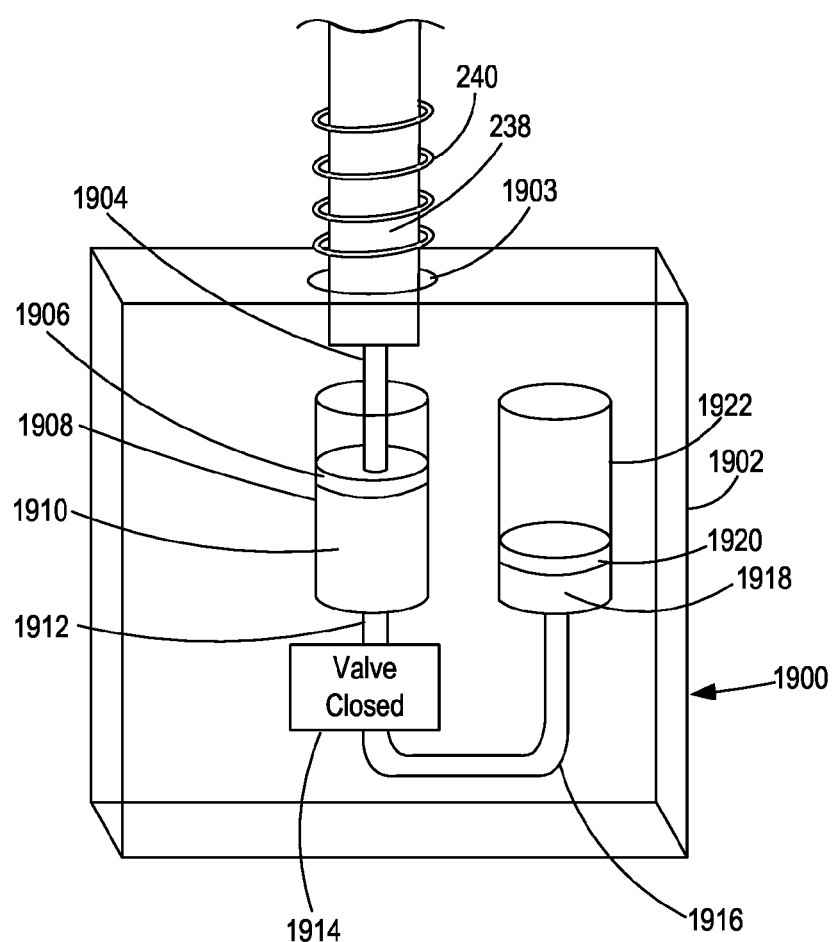
FIG. 19 shows a second example of a locking mechanism of the release mechanism that includes a hydraulic configuration with a valve closed to provide the locked state for maintaining the coupling to the cleat.
Figure 20:
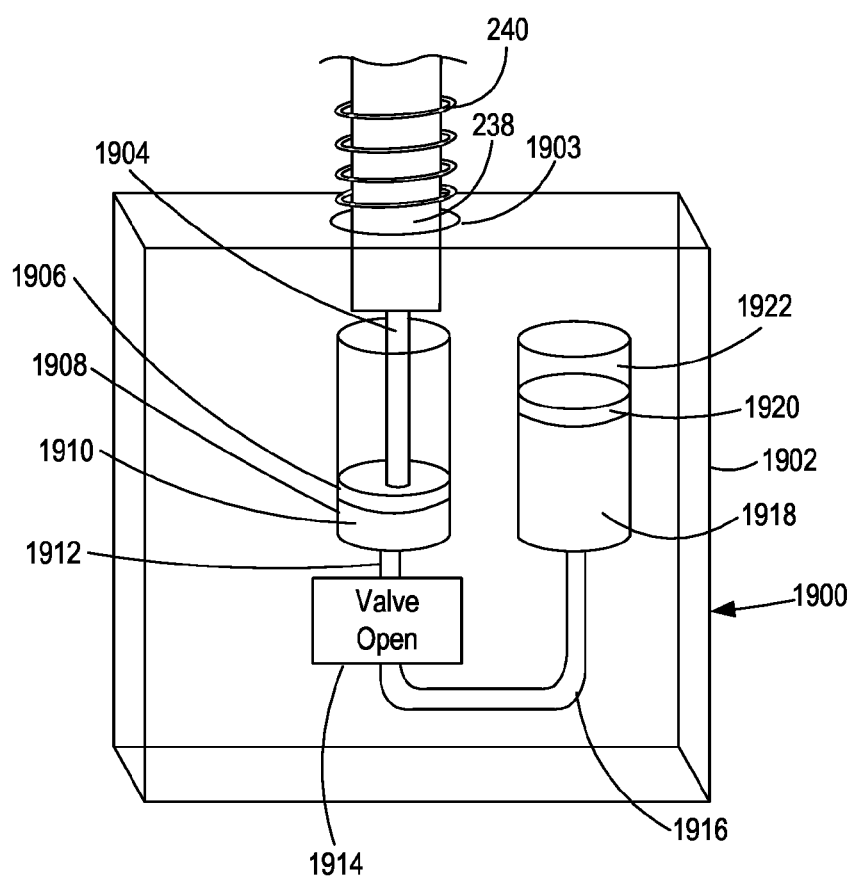
FIG. 20 shows the second example of a locking mechanism of the release mechanism that includes the hydraulic configuration with the valve opened due to a tilting to provide the unlocked state for allowing decoupling of the cleat.

A different example of a releaser sub-module 246 is shown in FIGS. 19 and 20 that utilizes a hydraulic system. This releaser sub-module 1900 includes an enclosure 1902 housing a pair of fluid reservoirs 1908 and 1922. The fluid reservoirs 1908 and 1922 each have a piston 1906, 1920 that moves within the respective reservoir 1908, 1922 in a sealed fashion. The piston 1906 is coupled to the fixation arm 238 which enters the enclosure 1902 through a port 1903, such as by a plunger 1904 which may be separately coupled to the piston 1906 and fixation arm 238 or may be integral to one or both of the piston 1906 and fixation arm 238. The piston 1906 itself may be integral to the fixation arm 238. The piston 1920 may be a floating piston such that the position of the piston 1920 is controlled by movement of a non-compressible fluid 1918 within the reservoir 1922 rather than a plunger. Likewise, non-compressible fluid 1910 is present in the reservoir 1908.

The two reservoirs 1908, 1922 are related by virtue of a fluid passage 1912, such as a tube, extending from the reservoir to a first side of a valve 1914 within the enclosure 1902 and a fluid passage 1916, such as another tube, extending from the reservoir 1922 to a second side of the valve 1914. When the valve 1914 is closed as in FIG. 19, the fluid is held in a static state where there is no fluid flow between the reservoirs 1908 and 1922 and this prevents the fixation arm 238 from being able to move the piston 1906. Through one of various techniques discussed below, the valve is held in the closed position while the bicycle is not sufficiently tilted. Thus, the fixation arm 238 is held in position by the closed valve 1914 which thereby holds the pins 210, 211 in position to prevent the cleat 208 from decoupling from the shoe 200 when the rider is pulling upward on the shoe 200.

However, when the valve 1914 is held open through one of various techniques discussed below because the bicycle is sufficiently tilted, fluid may flow in either direction between the reservoirs 1908, 1922 so that the fixation arm 238 can move the piston 1906. Thus, the pulling upward on the shoe 200 with enough force to overcome the bias from the biasing member 240 causes the fixation arm 238 to move the piston 1906 to force fluid from the reservoir 1908 through the valve 1914 and into the reservoir 1922 by moving the floating piston 1920, as shown in FIG. 20. In the instant after the pins 210, 211 are released and the shoe 200 has decoupled from the pedal 102 due to the movement of the fixation arm 238, the shoe 200 is still tilted and the valve 1914 is still open. So, in that instant, the biasing member 240 then pushes the fixation arm 238 the opposite direction to the normal position which moves the piston 1906 to draw fluid from the reservoir 1922 through the open valve 1914 and back into the reservoir 1908. Once the shoe 200 is no longer sufficiently tilted, the valve 1914 closes.

Figure 21:
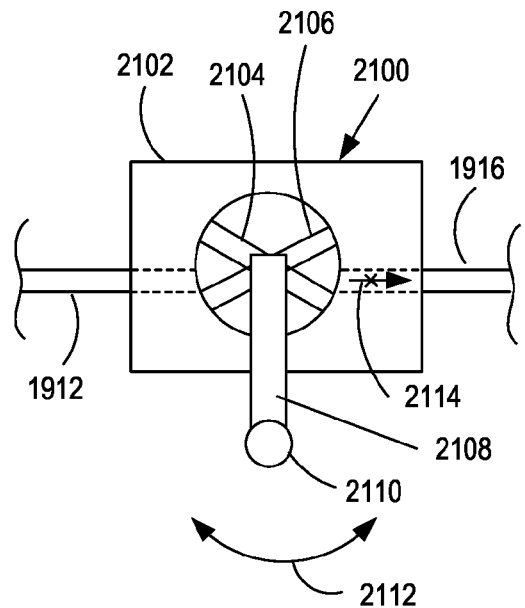
FIG. 21 shows a first example of a valve control based on tilt where the valve is closed by a weighted arm due to a lack of tilt at the coupling of the pedal to the shoe.
Figure 22:
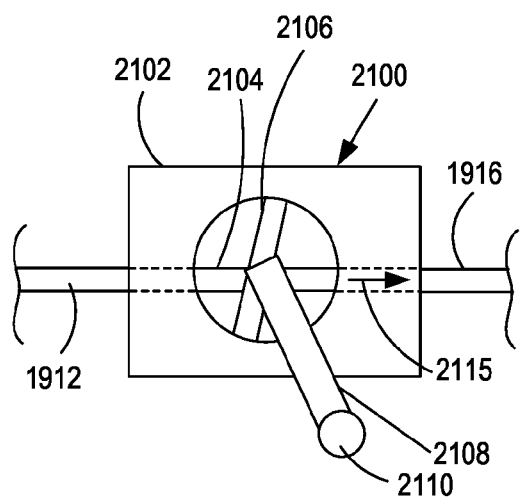
FIG. 22 shows the first example of a valve control based on tilt where the valve is opened by a weighted arm due to adequate tilt at the coupling of the pedal to the shoe.

FIGS. 21 and 22 show one example of how to control the valve 1914 based on tilt of the shoe 200 that may result from tilt of the bicycle. The valve 1914 may be a rotational style valve 2100 that includes a fluid body 1902 housing two internal paths 2104 and 2106 that are divergent and rotate together within the body in either direction of rotation. The rotation is controlled by an arm 2108 with a weight 2112 that is free to move in either direction of rotation, where this weight arm establishes a detection mechanism to detect tilt by virtue of movement of the weighted arm 2108. When in a non-tilted position, the weight 2110 and arm 2108 are positioned so that neither path 2104, 2106 aligns with the input and output of the valve 2100 so that static fluid 2114 occurs with no flow possible as in FIG. 21. However, tilting results in motion 2112 of the weight 2110 and arm 2108 in either direction of rotation and when the tilt is sufficient, either path 2104 or path 2106 aligns with the input and output of the valve 210 so that flowing fluid 2115 occurs as in FIG. 22.

The paths 2104, 2106 and their alignment relative to the valve input and output establish a comparison mechanism where a threshold is established by the angle of the paths 2104, 2106. The threshold, which is the amount of tilt necessary to open the valve 2100, can be established by dictating the angle of the paths 2104, 2106 relative to the input/output of the valve 2100 when the tilt is zero. The greater the angle of the paths 2104, 2106 relative to the input/output of the valve 2100, the greater the tilt is required to open the valve. As different riders may prefer differ amounts of tilt for releasing the shoe 200 from the pedal 102, riders may be given different options for the amount of tilt that results in a release of the shoe 200, where each option has a different angle of the paths 2104, 2106 relative to the input/output of the valve 2100.

Figure 23:
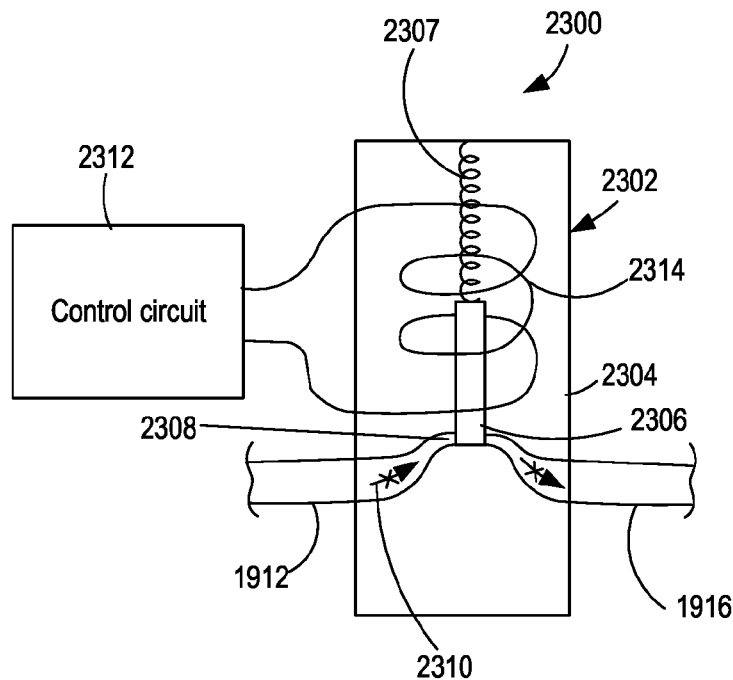
FIG. 23 shows a second example of a valve control based on tilt where the valve is closed by a control circuit due to a lack of tilt at the coupling of the pedal to the shoe.
Figure 24:
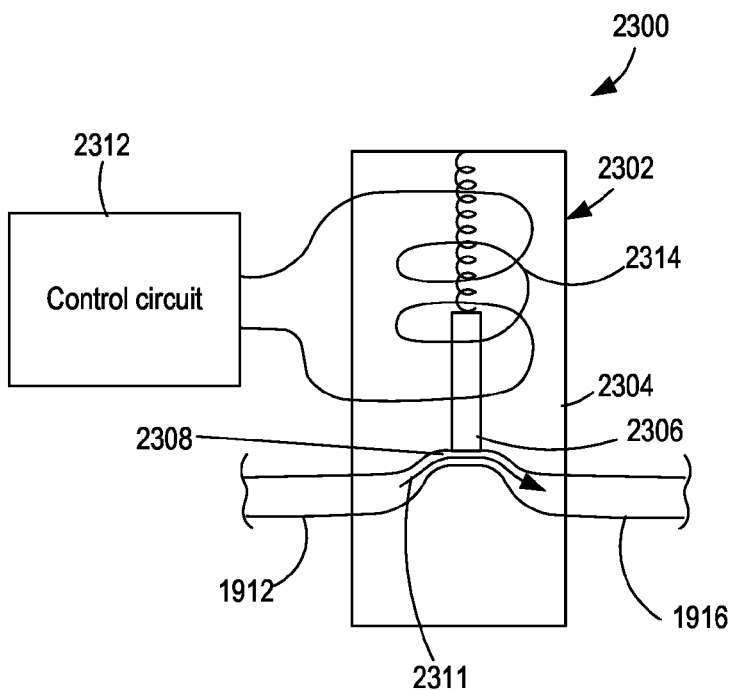
FIG. 24 shows the second example of a valve control based on tilt where the valve is opened by a control circuit due to adequate tilt at the coupling of the pedal to the shoe.

FIGS. 23 and 24 show another example of how to control the valve 1914 based on tilt of the shoe 200 that may result from tilt of the bicycle. The valve 1914 may be an electrically controlled valve such as a solenoid valve system 2300 that includes a solenoid valve 2302 and a control circuit 2312. The solenoid valve may be of various forms. In the particular example shown, the solenoid valve 2302 includes a housing 2304 that encloses a plunger 2306 attaching to a biasing member 2307 such as a spring. The plunger 2306 intersects with a fluid flow pathway 2308 providing a fluid input and output of the valve 2302. The biasing member 2307 may be configured to hold the plunger 2306 in a resting position, such as a position blocking the fluid flow pathway 2308 or a position not blocking the fluid flow pathway 2308. As discussed below, electrical energy is needed to move the plunger 2306 out of the resting position and because the cleat 208 will need to be coupled to the shoe 200 for a much greater amount of time than the instant when the cleat becomes decoupled and releases, it is most efficient to have the biasing member 2307 configured to hold the plunger 2306 in a resting position that causes a blocked fluid flow 2310 as shown in FIG. 23 to maintain the coupling of the cleat 208 to the shoe.

An electrically conductive coil 2314 is present to move the plunger via a magnetic field by creating a force that overcomes the force of the biasing member 2307 when the electrically conductive coil 2314 is energized. The control circuit 2312 controls the flow of electrical current through the coil 2314 in order to energize the coil 2314 when appropriate. Thus, the control circuit 2312 may be responsive to a tilt of the shoe 200 such as when the bicycle having the pedal 102 to which the shoe 200 is coupled tilts. When the tilt is sufficient, the control circuit 2312 energizes the coil 2314 causing unblocked fluid flow 2311 as shown in FIG. 24 that allows for the release of the pins 210, 211 when the upward force of the rider on the shoe 200 overcomes the force of the biasing member 240. The cleat 208 is then released from the shoe 200, and upon the shoe 200 no longer being sufficient tiled the control circuit 2312 no longer energizes the coil 2314 and the biasing member 2314 returns the plunger to the position resulting in blocked fluid flow 2310 as in FIG. 23.

The control circuit 2312 may be of various forms with various components. One example of such a control circuit 2500 is illustrated in block diagram format in FIG. 25. This control circuit 2500 includes a power source such as a battery 2510 that provides power to the other components.

A control component capable of implementing logic to execute commands such as a microcontroller 2502 is also included. It will be appreciated that this control component may be implemented in many ways, such as including a general-purpose programmable processor, an application specific processor, hard-wired digital logic, and the like. One example of such a microcontroller 2502 is the ATmega series of microcontrollers by Microchip Technology, Inc. of Chandler, AZ, for instance the ATmega328 line. The microcontroller 2502 receives input signals, applies logic, and produces output signals in order to provide the functionality to operate the solenoid valve 2302.

A detection mechanism is provided in the form of a tilt sensor 2504 that is coupled to the microcontroller 2502 and provides a signal to the microcontroller 2502 that is representative of one or more axes of tilt. For instance, the tilt sensor 2504 may be an accelerometer with as many axes as of measurement as desired that provides a signal that includes numeric representation of tilt. An example of such as accelerometer is the ADXL335 series of devices by Analog Devices of Wilmington, MA. As another example, the tilt sensor 2504 may be an inertial measuring unit which includes at least both an accelerometer and a gyroscope with as many axes of measurement as desired that may also provide a signal that includes a numeric representation of tilt. An example of such an inertial measuring unit is the MPU6050™ series of devices by the TDK InvenSense Company of San Jose, CA. The tilt sensor 2504 may be oriented so that a single axis of measure is needed to determine a particular tilt of interest, such as the left/right tilt of the shoe 200 or the front/back tilt of the shoe 200, or may be oriented so that some combination of axes of measure are used to determine the particular tilt of interest. The microcontroller 2502 is then configured accordingly to determine the tilt based on whichever axes of measure of the tilt sensor 2504 are relevant to the tilt of interest.

For instance, if the orientation of the tilt sensor 2504 relative to the shoe is such that an x-axis measurement of the tilt sensor 2504 corresponds to the left/right tilt axis of the shoe, then the microcontroller 2502 is configured to monitor that x-axis signal and determines the left/right tilt from that x-axis signal. As another example, if the orientation of the tilt sensor 2504 relative to the shoe 200 is such that a known combination of an x-axis measurement and a y-axis measurement of the tilt sensor 2504 corresponds to the left/right tilt axis of the shoe, then the microcontroller 2502 is configured to monitor both the x-axis signal and the y-axis signal and determines the left/right tilt from the magnitude created by the known contribution of the x-axis and y-axis signals to the left/right tilt axis of the shoe 200. This may also be applied where all 3 axes of measurement of the tilt sensor 2504 contribute to the measurement of the desired tilt axis of the shoe 200. Furthermore, the front/back tilt of the shoe 200, when such measurement is desired for releasing the cleat 208, is handled in the same manner based on the known contribution of the axes of the tilt sensor 2504 to that tilt axis of the shoe.

The microcontroller 2502 outputs a signal based on analysis of the signal received from the tilt sensor 2504 in order to control an electronic switch 2506. This switch 2506 may be implemented in various ways, such as a transistor or relay. The switch 2506 is then connected to the solenoid valve 2508, and specifically to the coil of the solenoid valve 2508. Thus, when the microcontroller 2502 receives a signal from the tilt sensor 2504 that the microcontroller 2502 determines is sufficient tilt of the shoe 200 in whatever tilt axis of the shoe is of interest, the microcontroller 2502 then outputs a signal to cause the switch 2506 to pass current from the battery 2510 to the coil of the valve 2508 and thereby open the valve 2508 to allow fluid to flow. This in turn allows the pins 210, 211 to be released upon the upward force being applied by the rider that causes the cleat 208 to decouple from the shoe 200.

An additional option for the control circuit 2500 is a bypass switch 2512 that opens the valve without regard to the tilt at the coupling of the shoe 200 to the pedal 102. This bypass switch 2512 may be a manual switch such as a manual button that can be controlled by the rider directly by being exposed to the rider at the shoe 200. The bypass switch 2512 may be located anywhere of convenience at the shoe 200 and wired back to the remainder of the control circuit 2500. This bypass switch, when closed by the rider, allows current to flow from the battery to the coil of the solenoid valve 2508 to allow fluid to flow when allows the pins 210, 211 to either be released when present residing in the module or to be inserted when not already residing in the module. Thus, the bypass switch 2512 may be useful to a rider who has been in a situation where the cleat 208 has come decoupled from the shoe 200 and wishes to couple the cleat 208 back to the shoe 200 without tilting the shoe 200 and consequently the bicycle and pedal 102. This may be particularly useful where the cleat 208 and associated pins 210, 211 are held by the pedal 102 and the rider wishes to place the shoe 200 atop the pedal 102 and have the pins 210, 211 be fully re-inserted to re-couple the cleat 208 to the shoe 200. The rider presses the button of the bypass switch 2512 when placing the shoe 200 back onto the pedal 208 to accomplish the re-coupling without any need to tile the bicycle and shoe 200.

Figure 26:
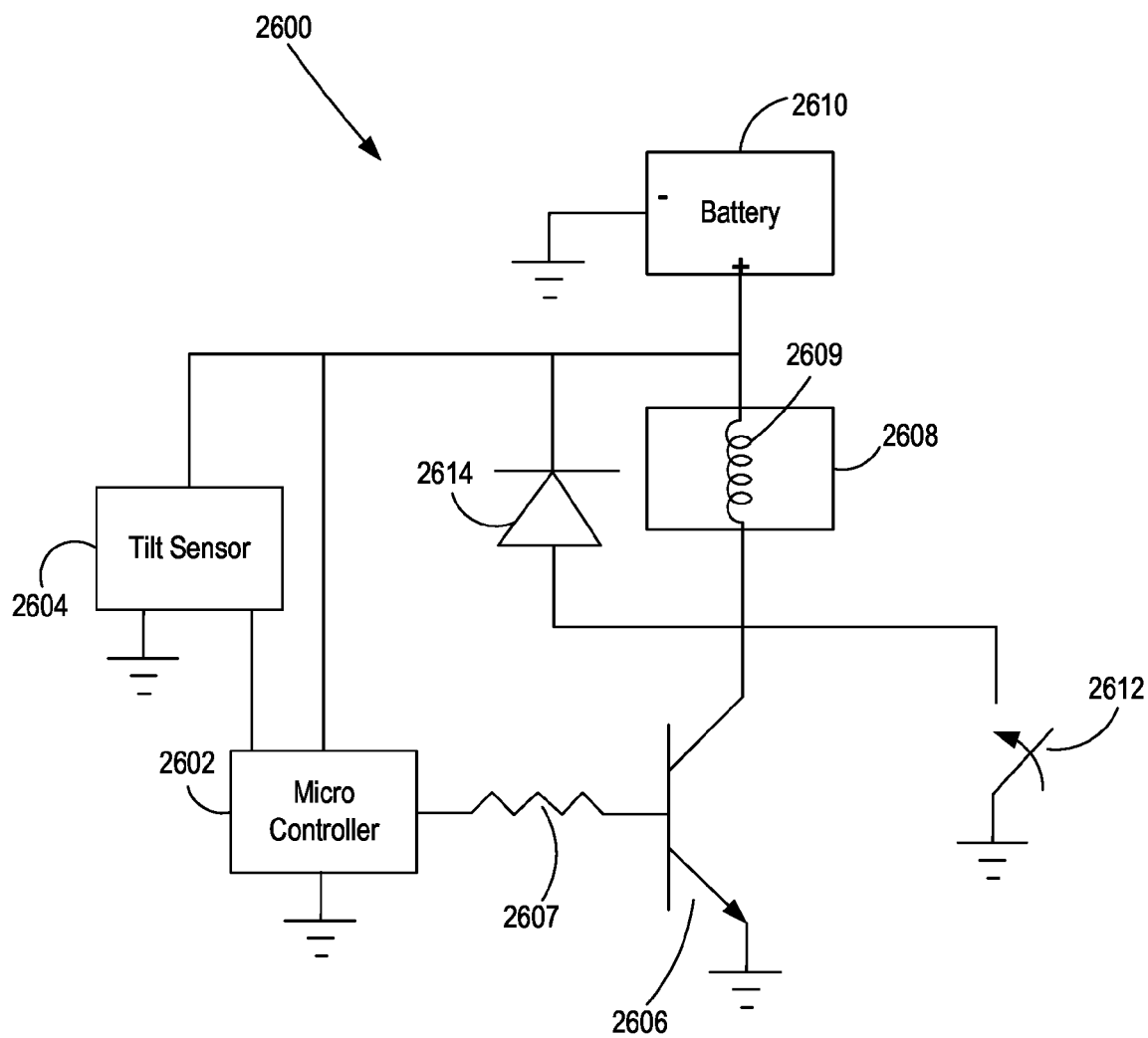
FIG. 26 is a circuit diagram of a first example of the control circuit for a valve as in the second example of a valve control based on tilt.

FIG. 26 shows an example of a schematic 2600 of the control circuit 2312. Here a power source such as a battery 2610 is present to provide power to a tilt sensor 2604, a microcontroller 2602, and the coil 2609 of the solenoid valve 2608. The battery 2610 is also connected to a flyback diode 2614 but as the flyback diode 2614 is reverse biased in relation to the battery 2610, the battery 2610 provides no current or power through the flyback diode 2614.

The microcontroller 2602 is connected to the tilt sensor 2604 and to a transistor 2606. In this specific example, the transistor is bipolar and a biasing resistor 2607 is present between the microcontroller 2602 and the base of the transistor 2606 to properly bias the transistor 2606 into a conducting mode. It will be appreciated that the circuit may instead use other configurations with different types of transistors or electrically controlled switches than the bipolar transistor 2606, such as a field effect transistors or relay. While the microcontroller 2602 determines from the signal from the tilt sensor 2604 that the tilt is not sufficient, the microcontroller 2602 outputs no voltage and thus no current to the transistor 2606 and the transistor remails in the non-conducting state. Therefore, no current flows from the battery 2610 through the coil 2609 and transistor 2606 and the solenoid valve 2608 remains closed, thereby holding the pins 210, 211 in place to maintain the coupling of the cleat 208 to the shoe 200.

However, upon the microcontroller 2602 determining that the signal from the tilt sensor 2604 indicates that tilt is sufficient, the microcontroller 2602 applies a voltage to output current through the biasing resistor 2607 and to the transistor 2606 to cause the transistor 2606 to begin conducting. At this point, current flows from the battery 2610 through the coil 2609 and through the transistor 2606 so that the solenoid valve 2608 opens which allows the pins 210, 211 to be released to thereby decouple the cleat from the shoe 200 if upward force is being applied by the rider to overcome the bias of the biasing member 240.

It should be noted that the flyback diode 2614 is present to protect the transistor 2606 once the tilt is no longer sufficient and the microcontroller 2602 stops outputting a voltage to drive current through the biasing resistor 2607 and into the base of the transistor 2606. As the coil 2609 will resist the change in current, the flyback diode 2614 provides a path for dissipation of the energy stored by the coil 2609 to prevent the build-up of a large voltage at the coil 2609 that can damage the transistor 2606.

The additional option of a bypass switch 2612 is also shown for this example. The bypass switch 2612 is connected in parallel with the transistor 2606. Thus, when the transistor 2606 is non-conducting because the tilt is not sufficient, the rider can manually activate the bypass switch 2612 to allow current to flow from the battery 2610 through the coil 2609 and through the bypass switch 2612 to open the valve and allow the pins 210, 211 to be released. Once the bypass switch is re-opened, the flyback diode 2614 again protects the transistor 2606 as well as the bypass switch 2612 from any voltage build-up at the coil 2609.

Figure 27:
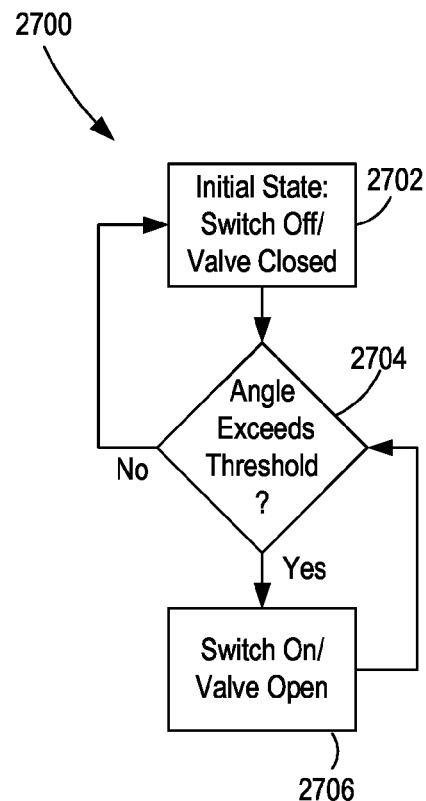
FIG. 27 shows an example of logic performed by a controller of the first circuit diagram of the example of the control circuit for a valve as in the second example of a valve control based on tilt.

FIG. 27 shows the logic 2700 employed by the microcontroller of the control circuit for the solenoid valve. In this example, the switch is off and the valve is therefore closed at a state 2702. Therefore, at state 2702, the pins 210, 211 are secured and the cleat 208 remains coupled to the shoe 200. The microcontroller receives a current sample of the amount of tilt as measured by the tilt sensor. Upon receiving this amount of tilt, the microcontroller utilizes logic that establishes a comparison mechanism by comparing the amount of tilt to a tilt threshold value stored in memory to detect whether the amount of tilt exceeds the threshold at a decision 2704. If the amount of tilt does not exceed the threshold, then the microcontroller does not generate an output to the electronic switch and awaits the next sample at the state 2702. However, if the amount of tilt does exceed the threshold, then the microcontroller generates an output to the electronic switch which opens the valve at state 2706.

The logic 2700 may be employed for a single tilt axis of interest or for multiple tilt axes of interest. For instance, the microcontroller may be configured to only consider the left/right axis of tilt of the shoe 200 by finding the amount of tilt for that left/right tilt axis from the signal from the tilt sensor and compare to a left/right tilt axis threshold at decision 2704. In another example, the micro controller may be configured to consider both the left/right axis of tilt of the shoe 200 as well as the front/back axis of tilt of the shoe 200 by finding the amount of tilt for the left/right tilt axis and also find the amount of tilt for the front/back tilt axis from the signal from the tilt sensor and compare the amount of left/right tilt to a left/right tilt axis threshold and compare the amount of front/back tilt to a front/back tilt axis threshold at decision 2704. Then, if the left/right tilt axis threshold is exceeded or the front/back tilt axis threshold is exceeded, then the microcontroller generates an output to the electronic switch which opens the valve at state 2706.

It will be appreciated that the amount of tilt needed to release the cleat from the shoe 208 may be a rider preference and may even vary for the left shoe versus the right shoe of a rider Therefore, a given shoe 200 or module 212 may be chosen on the basis of what the tilt axis threshold of a given tilt axis is for allowing decoupling of the cleat 208. Alternatively, the module 212 may provide adjustability of the threshold for a given tilt axis either through a manual mechanism or via programmability.

Figure 28:
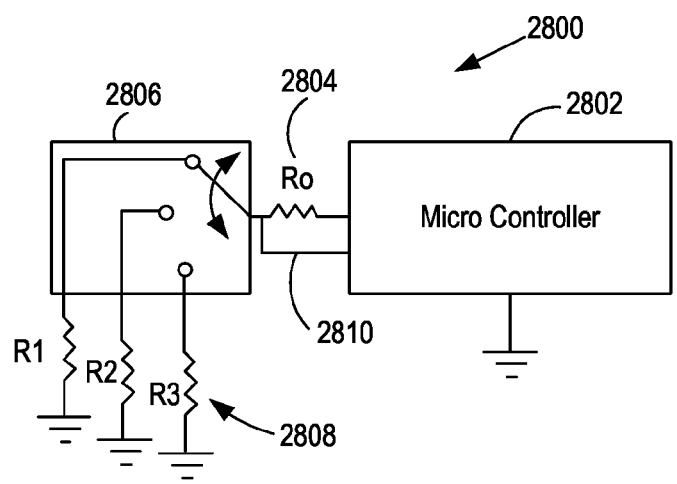
FIG. 28 shows an example of circuitry for specifying a tilt threshold for the logic of the controller to employ to control the valve as in the second example of a valve control based on tilt.

FIG. 28 shows an example 2800 of using a mechanical mechanism to alter the threshold for a given tilt axis. The mechanical mechanism of this example is a mechanical switch 2806 that is exposed for manipulation by the rider. The switch 2806 selects one of multiple resistive pathways 2808, each of the pathways 2808 providing a different electrical resistance. The microcontroller 2802, which corresponds to the microcontroller discussed above, outputs a voltage through a resistor 2804 and the switch 2806 why sampling a resulting voltage on input 2810. The voltage on input 2810 varies based on the position of the switch 2806, as the resistor 2804 and the resistive path provided by the switch 2806 create a voltage divider. Thus, the microcontroller 2802 determines switch position based on the voltage on the input 2810, and this voltage on the input 2810 is assigned a threshold value for a tilt axis. Therefore, the threshold being applied at the decision 2704 of FIG. 27 is set by the position of the switch 2804.

Figure 29:
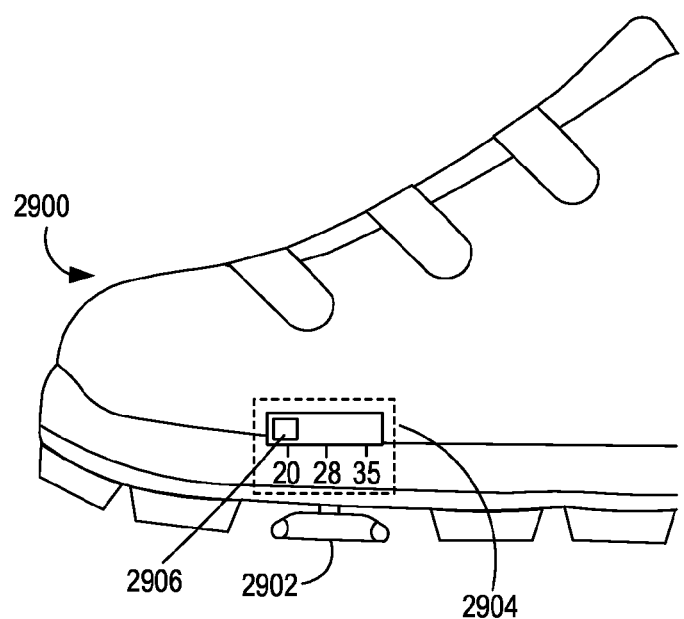
FIG. 29 shows an example of a physical switch that may be rider manipulated at the shoe in conjunction with the circuitry of FIG. 28 to specify the tilt threshold for the logic of the controller to employ to control the valve as in the second example of a valve control based on tilt.

FIG. 29 shows a shoe 2900 having a module 2904 and associated cleat 2902. This shoe example includes a slider switch 2906, which corresponds to the switch 2806 of FIG. 28. The rider can slide the switch to a particular position that corresponds to a particular tilt angle threshold for releasing the cleat 2902 from the shoe 2900. In this example, the tilt can be set to 20 degrees, 28 degrees, or 35 degrees. For instance, a rider learning to use clipless pedals 102 may initially set the release to 20 degrees so that less tilt is required to release the cleat 2902. As the rider progresses in ability and confidence, the rider may then choose to increase the tilt to 28 degrees, and then eventually select 35 degrees. It will be appreciated that these tilt threshold angles are only examples and any number of different angles are applicable. Considering each shoe is independently adjustable, this allows the rider to choose a best tilt threshold setting for each shoe, as the rider may be more capable of existing the clipless pedal 102 with one foot versus the other due to training, physical impairment, and the like.

In addition to using the slider switch 2906 to specify the tilt threshold, the slider switch 2906 may also act as a push button when in any of the tilt threshold positions. Therefore, the switch 2906 may serve dual purposes, where the tilt threshold is specified by sliding the switch 2906 while also acting as the valve bypass switch discussed above when pressed by the rider.

Figure 30:
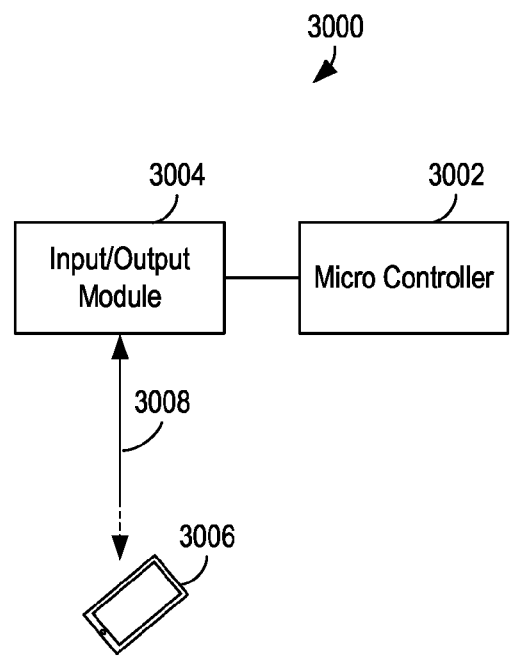
FIG. 30 shows a block diagram of components used to exchange information, including the tilt threshold, with a user device and the controller.
Figure 31:
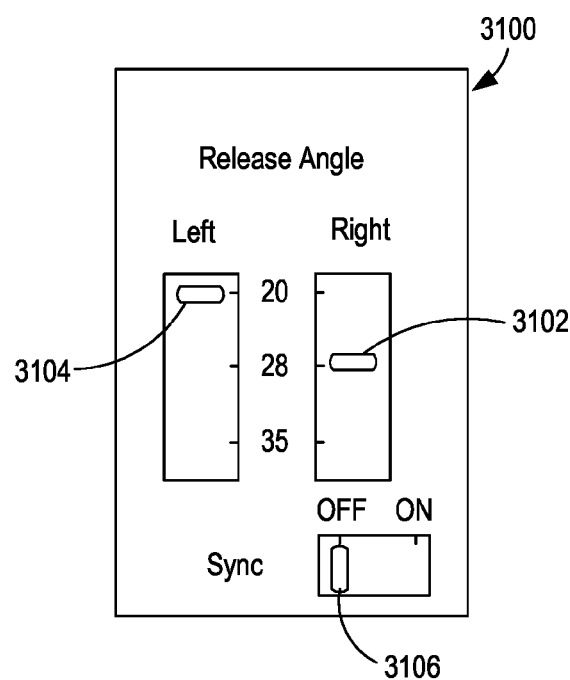
FIG. 31 shows an example of a display on a user device to provide a graphical user interface that a rider may manipulate to specify information such as the tilt threshold for the logic of the controller to employ to control the valve as in the second example of a valve control based on tilt.

FIGS. 30 and 31 show a configuration that uses a programmatic control of the tilt threshold being applied at the decision 2704 of FIG. 27. As shown in FIG. 30, a system 3000 includes a microcontroller 3002, which corresponds the microcontroller previously discussed, that includes an input/output module 3004 capable of communication with an external device 3006 such as a smartphone over a communication link 3008. The input/output module 3004 may provide wireless or wired communications with the external device 3000 over the link 3008. For instance, the input/output module 3004 may expose a universal serial bus (USB) port on the shoe 200 that allows a data cable to connect from the module 3004 to the external device 3006 where the data cable provides the link 3008. Alternatively, the input/output module may include a wireless transceiver, such as a BLUETOOTH® protocol transceiver and/or an ANT+® protocol transceiver to provide a wireless protocol as the link 3008 to the external device 3006.

The external device 3006 may then implement programming that allows the external device to receive rider input to specify a tilt threshold and then program that tilt threshold value into the microcontroller 3002. For instance, the external device 3006 may provide a user interface 3100 like that shown in FIG. 31. The external device may be a dedicated device with the sole purpose of communicating with the input/output module 3004 and microcontroller 3002. Alternatively, the external device may be a multi-purpose device, such as a smartphone. In that case, an application program may be available for downloading to the smartphone that provides the functionality and interface 3100.

Figure 25:
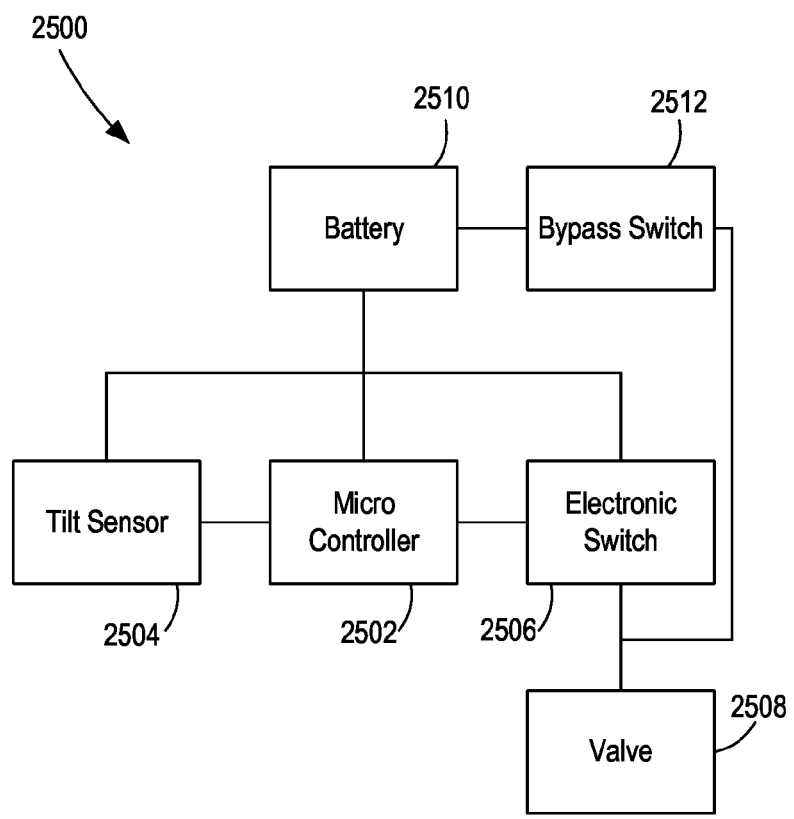
FIG. 25 is a block diagram of an example of the control circuit for a valve as in the second example of a valve control based on tilt.

As an additional alternative to the control circuit 2500 of FIG. 25 and 2600 of FIG. 26, where the microcontroller has an input/output module, like the input/output module 3004 of FIG. 30, the tilt sensor may be omitted from being contained in the module 212 and may reside elsewhere with a separate power supply so that the tilt sensor does not contribute to drain of the battery within the module 212. For instance, bicycles that already have a multi-axis accelerometer or inertial measurement unit capable of producing a signal representative of tilt of the bicycle may utilize that feature to provide the tilt signal to the microcontroller of the module 212 via the wireless link 3008. E-bikes often contain control modules that include an accelerometer or inertial measurement unit and the control modules typically utilize wireless communications such as ANT+® protocol such that the control module of the bicycle may communicate with the microcontroller of the module 212 of each shoe to convey the tilt information used to open the valve and release the pins 210, 211.

Furthermore, some aspects of the microcontroller of the module 212 may be off-loaded as well to an external device. For instance, the entire logic of FIG. 27 may be implemented by a microcontroller or other processing element of an external device with access to the tilt signal. The external device may then send an instruction to the microcontroller of the module 212 to produce the output signal that opens the solenoid valve when the decision 2704 finds that the tilt threshold of an axis of interest has been exceeded.

As shown in FIG. 31, the user interface 3100 of this example includes slides 3102, 3104 to allow adjustment of the tilt threshold of each shoe. In such a case, the external device 3006 maintains communications with the input/output module 3004 of each shoe so that the adjustment of the slider 3102 causes communication with the right shoe while adjustment of the slider 3104 causes communication with the left shoe. In this example, each slider 3102, 3104 has three positions, for a tilt angle threshold of 20 degrees, 28 degrees, or 35 degrees. It will be appreciated that these tilt threshold angles are only examples and any number of different angles are applicable and it will also be appreciated that the sliders may provide for a continuously variable angle between an upper and lower limit rather than specific angle options.

As previously stated, considering each shoe is independently adjustable via a slider 3102, 3104 dedicated to each shoe, this allows the rider to choose a best tilt threshold setting for each shoe, as the rider may be more capable of exiting the clipless pedal 102 with one foot versus the other due to insufficient training, physical impairment, and the like. However, in this example, a synchronization switch 3106 is also provided as a matter of convenience which synchronizes the sliders 3102, 3104 to a same setting so that moving either slider 3102, 3104 adjusts both shoes to the same tilt threshold. It will be appreciated that where the microcontroller of the module 212 is checking both the left/right tilt axis and the front/back tilt axis, the user interface 3100 may provide a left/right display of the sliders 3102, 3104 as well as a separate front/back display of the sliders 3102, 3104 so that the rider may specify a left shoe and right shoe left/right tilt threshold and also specify a left shoe and right shoe front/back tilt axis threshold.

Figure 32:
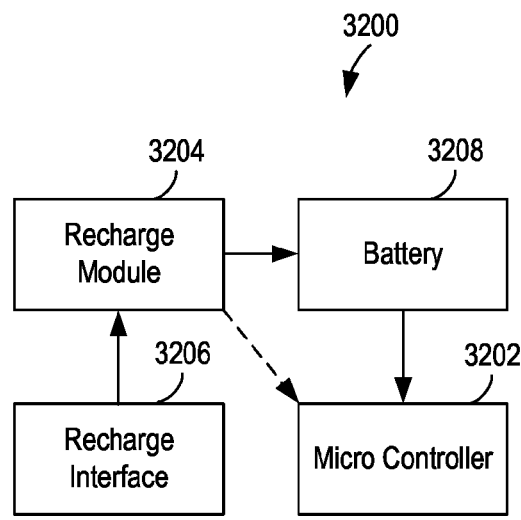
FIG. 32 shows a block diagram of components to provide recharging of a battery that powers the control circuit.

As previously discussed above, the control circuit includes a power source such as a battery. While the module 212 may be configured so that the battery is user accessible and replaceable, an alternative provides a rechargeable battery. In such a case, a configuration 3200 as shown in FIG. 32 may include a recharge module 3204 that acts as a charge controller for the battery 3208 either autonomously or through communication with the microcontroller 3202. The recharge module 3204 may be coupled to a recharge interface 3206, such as an exposed USB port at the shoe that receives power through a USB connection to a battery charger. Alternatively, the recharge interface may be a wireless interface utilizing a charging coil via a wireless charging protocol such as the Qi protocol. In such a case, the charging coil may be embedded in a portion of the shoe, such as the outsole to allow the shoe to be positioned on a wireless charging pad or puck to recharge the battery 3208.

From the description above, it can be seen that a tilt-based decoupling of a cleat in a clipless pedal allows a rider to remove the foot and shoe from the pedal when sufficient tilt of the bicycle has occurred, such as tilt that may result from an imminent crash. This gives the rider the opportunity to use either foot or both feet that are no longer coupled to the pedals of the bicycle to potentially help avoid the crash and/or potentially lessen the severity of the crash.

Figure 33:
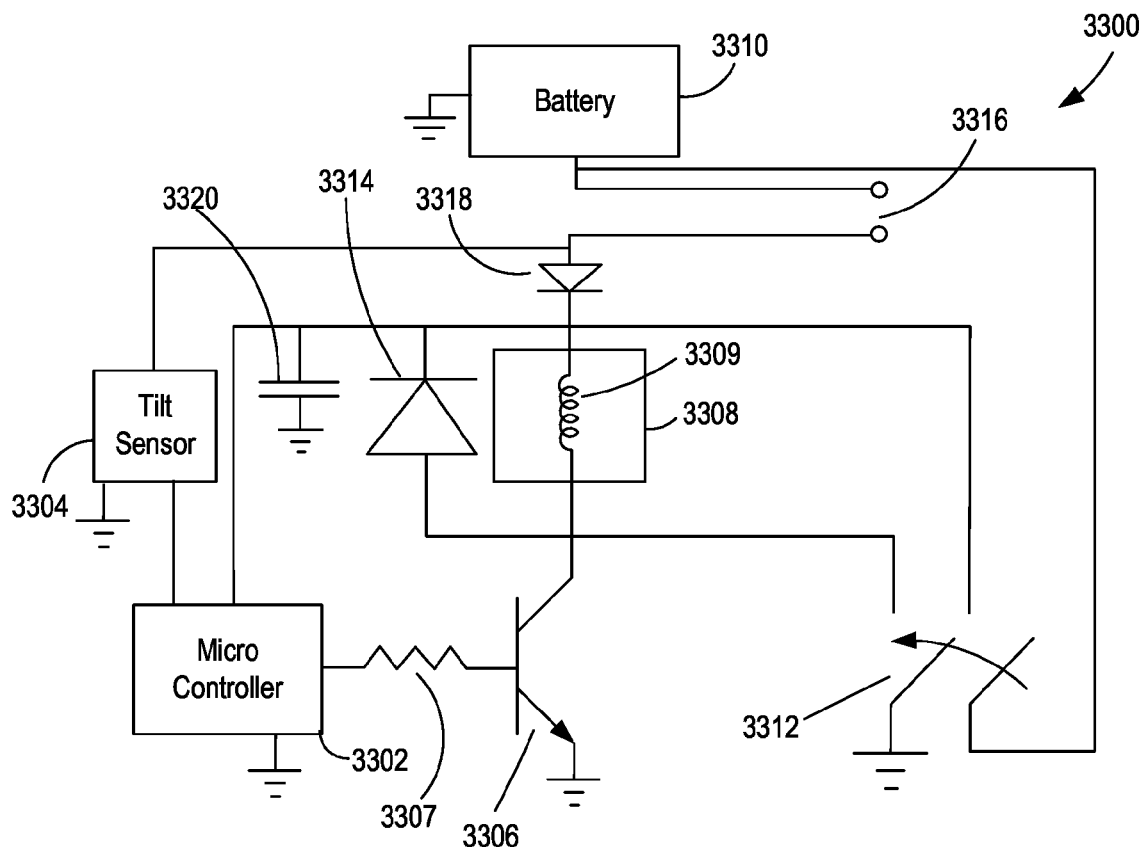
FIG. 33 shows a circuit diagram of a second example of the control circuit for a valve that may be used in the second example of a valve control based on tilt where the battery is electrically coupled to the control circuitry by coupling of the pedal to the shoe.

FIG. 33 shows another example of a schematic 3300 of the control circuit 2312, where the components perform together as described above in relation to the control circuit of FIG. 26 but with the added feature of being turned on and off based on the shoe being coupled or decoupled from the shoe to conserve battery power without requiring a user to manually power on or off the module 212. As with FIG. 26, it will be appreciated that the circuit of FIG. 33 may instead use other configurations with different types of transistors or electrically controlled switches than the bipolar transistor 3306, such as a field effect transistors or relay. Here a power source such as a battery 3310 is present to provide power to a tilt sensor 3304, a microcontroller 3302, and the coil 3309 of the solenoid valve 3308 but only upon completion of the circuit by the closure of an open terminal pair 3316 which is discussed in further detail below. Additionally, the battery 3310 is connected to a flyback diode 3314 upon completion of the circuit at the open terminal pair 3316, but as the flyback diode 3314 is reverse biased in relation to the battery 3310, the battery 3310 provides no current or power through the flyback diode 3314.

Figure 35:
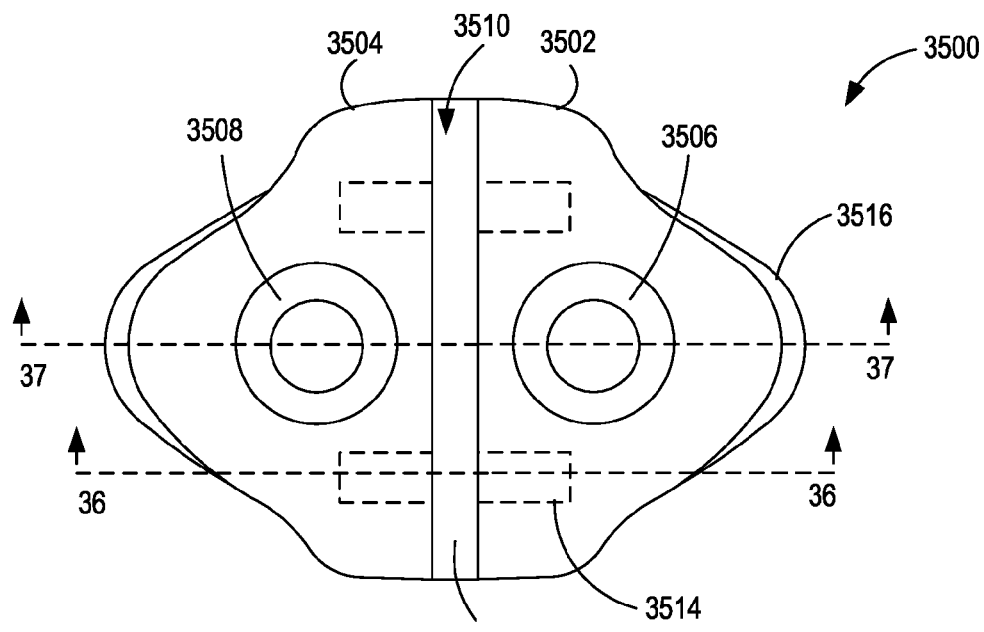
FIG. 35 shows an example of a cleat that provides isolated conductive regions that are electrically coupled together by coupling the pedal to the cleat and that may be used together with the circuitry of FIG. 33 or FIG. 34.
Figure 36:
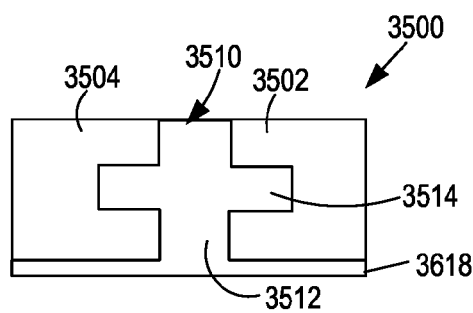
FIG. 36 shows a first cross-section of the cleat taken along the line 36-36 of FIG. 35.
Figure 37:
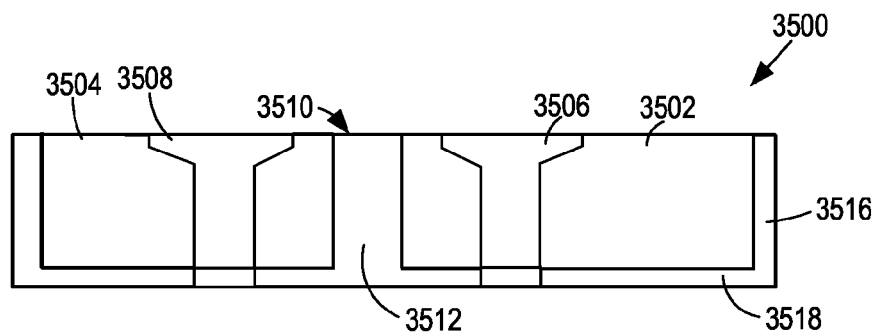
FIG. 37 shows an example of a display on a user device to provide a graphical user interface that a rider may manipulate to specify information such as the tilt threshold for the logic of the controller to employ to control the valve as in the second example of a valve control based on tilt.
Figure 38:
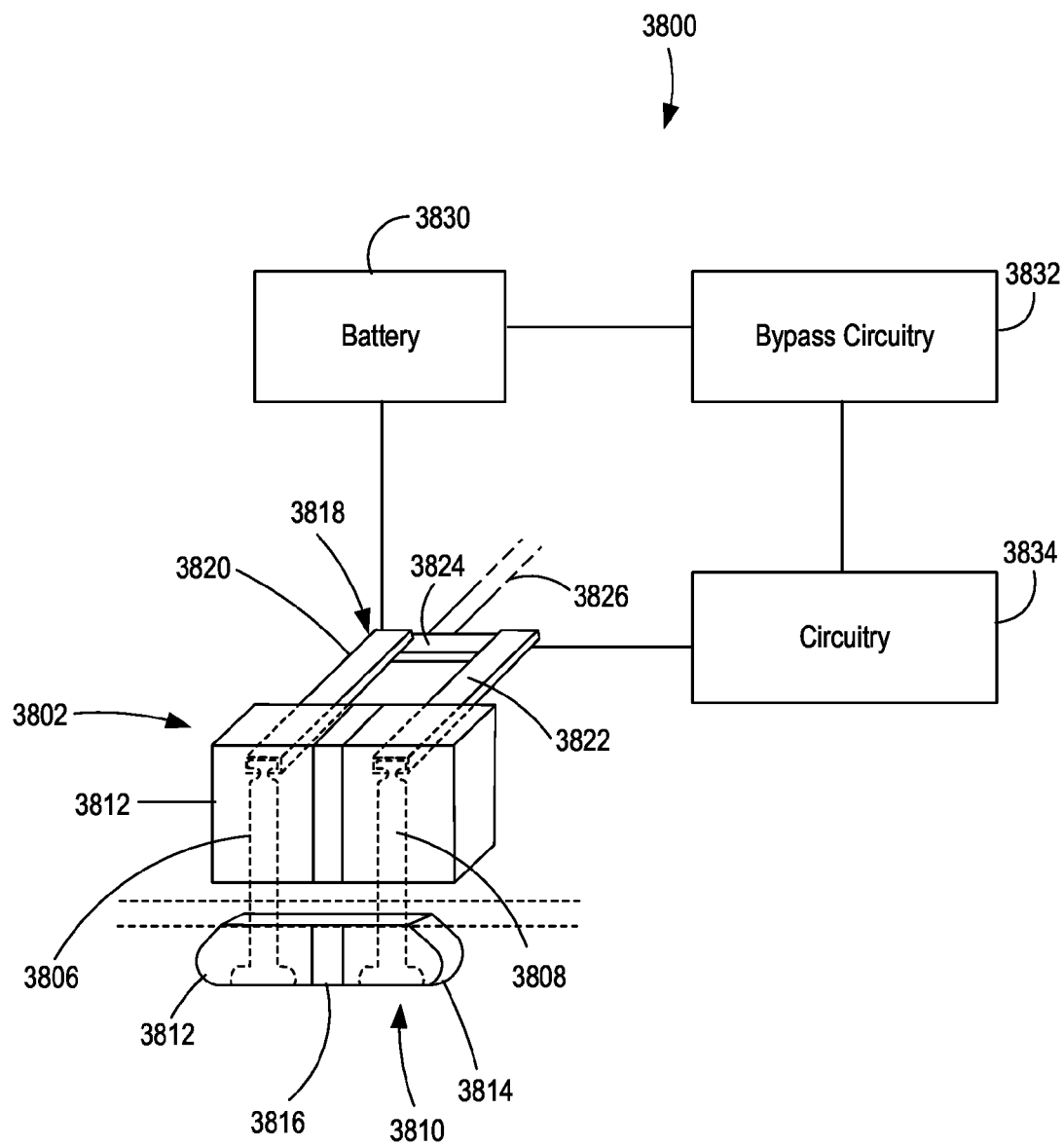
FIG. 38 shows an example of the release mechanism configured to couple the battery to the control circuitry by coupling the pedal to the cleat.

The open terminal pair 3316 becomes closed to complete the circuit from the battery 3310 by having the two terminals of the open terminal pair 3316 be electrically connected to the fixation arm extensions that are electrically isolated from one another as shown in FIG. 38 which is discussed in detail further below. In this case, the cleat has two electrically isolated but conductive portions, as shown in FIGS. 35-37 and discussed in more detail below. The cleat is attached to the shoe of the rider via the pins as discussed above, where one pin contacts one conductive portion and the other pin contacts the other conductive portion. Thus, the cleat being installed on the shoe does not complete the circuit at the open terminal 3316. However, upon the cleat being installed onto the pedal of the bicycle, the portions of the cleat become electrically connected together by the metal of the pedal contacting both portions of the cleat thereby electrically connecting the two portions together. The terminal pair 3316 is thereby closed to complete the circuit and provide power from the battery 3310.

To ensure that the circuit of the schematic 3300 can function appropriately to release the cleat from the shoe, a capacitor 3320 may be included to receive charge from the battery 3310 upon the cleat contacting the pedal to complete the circuit as previously described. Thus, the as the pins 210, 211 are coming free from the module 212, to avoid the microcontroller 3302 from losing power and not passing adequate current through resistor 3307 which would turn off the transistor 3306 and potentially cause the valve 3308 to malfunction, the capacitor may briefly provide power to the microcontroller 3302. Likewise, the capacitor may also briefly provide power to the coil 3309, although the coil 3309 will also continue to briefly conduct via the dissipation loop created by the flyback diode 3314 once the transistor 3306 turns off upon the microcontroller 3302 either turning off the transistor 3306 or losing power.

The circuit of schematic 3300 may also attempt to prolong the discharge of the capacitor 3320 by isolating the tilt sensor 3304, and thus avoiding power draw by the tilt sensor 3304, for instances where the microcontroller 3302 maintains the output current through the biasing resistor 3307 for a brief period after losing signal from the tilt sensor 3304 and/or where the tilt sensor 3304 has a persistence via on-board reactance upon losing power. In this case, a diode 3318 may be included where the battery 3310 forward biases the diode 3318 when the terminal pair 3316 is closed so as to allow current to flow from the battery 3310 to the other components and where the capacitor 3320 reverse biases the diode 3318 upon the terminal pair 3316 becoming open so that the diode 3318 blocks current from flowing from the capacitor 3320 to the tilt sensor 3304.

The additional option of a bypass switch 3312 is also shown for this example. Rather than being a single pole single throw switch like that of FIG. 26, this example includes a double pole single throw bypass switch 3312. As an alternative, two separate single pole single throw switches may be used but both must be operated individually. The discussion will proceed with regard to a double pole single throw bypass switch 3312. The bypass switch 3312 has one set of poles connected in parallel with the transistor 3306 and another set of poles connected in parallel with the open terminal 3316. Thus, when the transistor 3306 is non-conducting because the tilt is not sufficient even though the cleat is attached to the shoe and installed in the pedal to complete the circuit at the terminals 3316, the rider can manually activate the bypass switch 3312 to allow current to flow from the battery 3310 through the coil 3309 and through the bypass switch 3312 to open the valve and allow the pins holding the cleat to the shoe to be released. Once the bypass switch 3312 is re-opened, the flyback diode 3314 again protects the transistor 3306 as well as the bypass switch 3312 from any voltage build-up at the coil 3309.

Additionally, when the cleat is not installed in the pedal but needs to be removed or where the cleat needs to be re-inserted such as after an emergency release of the cleat from the shoe, the bypass switch 3312 may be pressed to allow current from the battery 3310 to bypass the open terminal pair 3316 via one set of poles of the bypass switch 3312 and to bypass the transistor 3306 via the other set of poles of the bypass switch 3312, thereby providing current from the battery 3310 through one set of poles of the bypass switch 3312 to the coil 3309 and from the coil back to ground through the other set of poles of the bypass switch 3312. This allows the pins 210, 211 to be reinserted by unlocking the releaser sub-module 246, and therefore unlocking the release mechanism 256 of the module 212 that is receiving the pins 210, 211, and upon release of the bypass switch 3312, the releaser sub-module 246, and therefore the release mechanism, becomes locked to lock the cleat 208 in place on the shoe 200.

Figure 34:
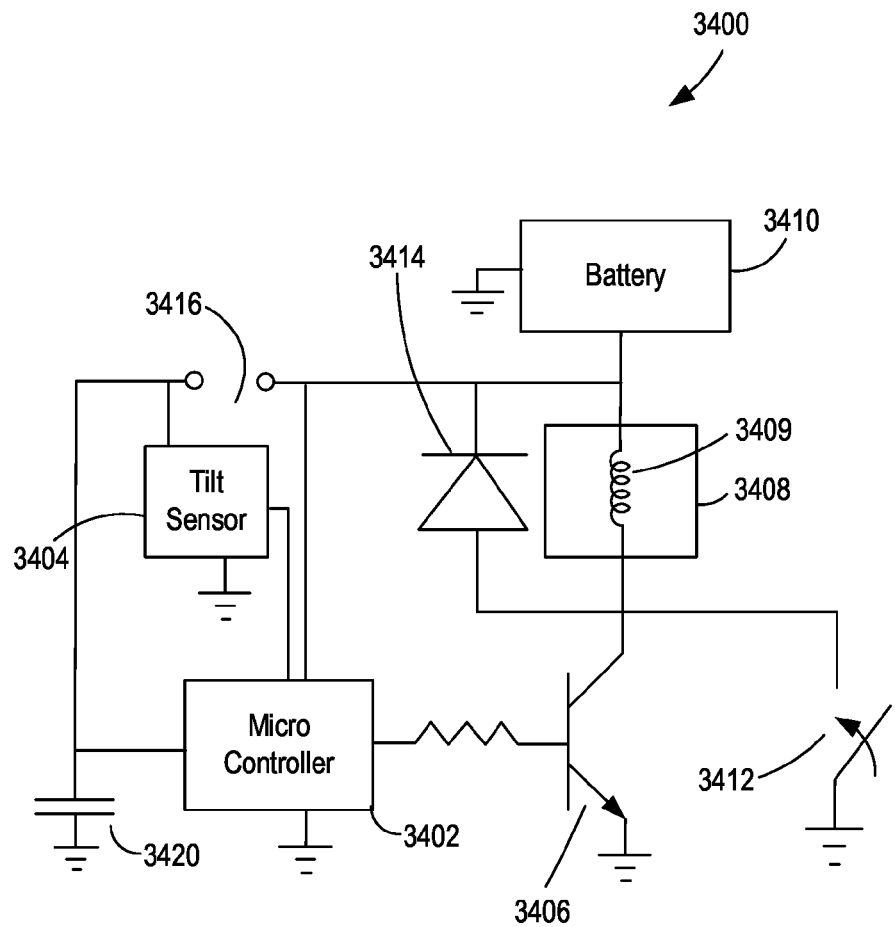
FIG. 34 shows a circuit diagram of a third example of the control circuit for a valve that may be used in the second example of a valve control based on tilt where the battery is electrically coupled to a portion of the control circuitry by coupling of the pedal to the shoe.

FIG. 34 shows another example of a schematic 3400 of the control circuit 2312, where the components perform together as described above in relation to the control circuit of FIG. 26 but again with the added feature of being turned on and off based on the shoe being coupled or decoupled from the shoe to conserve battery power without requiring a user to manually power on or off the module 212. As with FIG. 26, it will be appreciated that the circuit of FIG. 34 may instead use other configurations with different types of transistors or electrically controlled switches than the bipolar transistor 3406, such as a field effect transistors or relay. Here a power source such as a battery 3410 is present to provide power to a tilt sensor 3404, a microcontroller 3402, and the coil 3409 of the solenoid valve 3408 but power is provided to the tilt sensor 3404 and a power control input of the microcontroller 3402 only upon completion of the circuit by the closure of an open terminal pair 3416 which is discussed in further detail below. Additionally, the battery 3410 is connected to a flyback diode 3414 upon completion of the circuit at the open terminal pair 3416, but as the flyback diode 3414 is reverse biased in relation to the battery 3410, the battery 3410 provides no current or power through the flyback diode 3414.

The open terminal pair 3416 becomes closed to complete the circuit from the battery 3410 by having the two terminals of the open terminal pair 3416 be electrically connected to the fixation arm extensions that are electrically isolated from one another as shown in FIG. 38 which is discussed in detail further below. In this case, the cleat has two electrically isolated but conductive portions, as shown in FIGS. 35-37 and discussed in more detail below. The cleat is attached to the shoe of the rider via the pins as discussed above, where one pin contacts one conductive portion and the other pin contacts the other conductive portion. Thus, the cleat being installed on the shoe does not complete the circuit at the open terminal 3416. However, upon the cleat being installed onto the pedal of the bicycle, the portions of the cleat become electrically connected together by the metal of the pedal contacting both portions of the cleat thereby electrically connecting the two portions together. The terminal pair 3416 is thereby closed to complete the circuit and provide power from the battery 3410.

To ensure that the circuit of the schematic 3400 can function appropriately to release the cleat from the shoe, a capacitor 3420 may be included to receive charge from the battery 3410 upon the cleat contacting the pedal to complete the circuit as previously described. Thus, the as the pins 210, 211 are coming free from the module 212, to avoid the microcontroller 3402 from losing power on the power control input and not passing adequate current through resistor which would turn off the transistor 3406 and potentially cause the valve 3308 to malfunction, the capacitor may briefly provide power to the power control input of the microcontroller 3402 to maintain the microcontroller 3402 in a powered on state. Likewise, the capacitor 3420 may also briefly provide power to the tilt sensor 3404.

The additional option of a bypass switch 3412 is also shown for this example, where the bypass switch may be a single pole single throw switch like that of FIG. 26 since there is no need to bypass the open terminal pair 3416 and instead only bypass the transistor 3406. Thus, when the transistor 3406 is non-conducting because the tilt is not sufficient even though the cleat is attached to the shoe and installed in the pedal to complete the circuit at the terminals 3316, the rider can manually activate the bypass switch 3412 to allow current to flow from the battery 3410 through the coil 3409 and through the bypass switch 3412 to open the valve and allow the pins holding the cleat to the shoe to be released. Once the bypass switch 3412 is re-opened, the flyback diode 3414 again protects the transistor 3406 as well as the bypass switch 3412 from any voltage build-up at the coil 3409.

Additionally, when the cleat is not installed in the pedal but needs to be removed or where the cleat needs to be re-inserted such as after an emergency release of the cleat from the shoe, the bypass switch 3412 may be pressed to allow current from the battery 3310 to bypass the transistor 3406, thereby providing current from the battery 3410 the bypass switch 3412 to the coil 3409 and to ground. This allows the pins 210, 211 to be reinserted by unlocking the releaser sub-module 246, and therefore unlocking the release mechanism of the module 212 that is receiving the pins 210, 211. Upon release of the bypass switch 3412, the releaser sub-module 246, and therefore the release mechanism 256, becomes locked to lock the cleat 208 in place within the module 212 on the shoe 200.

FIGS. 35-37 show an example of a cleat 3500 that has two electrically isolated conductive portions 3502, 3504 that allow the cleat 3500 to operate in the circuits of FIGS. 33 and 34 to allow the module 212 to turn on or off based on whether the cleat is mounted in the pedal. The two portions 3402, 3504 are physically held together by a rigid, non-conductive binding material 3510, such as a phenolic resin material. The binding material 3510 may form much of the portion of the cleat 3500 that contacts the shoe, although the portions 3502, 3504 of the cleat 3500 are exposed above and below the side portion 3516 so that the metal of the pedal creates an electrical connection between the portions 3502 and 3504. The binding material 3510 may also form much of the portion of the cleat 3500 that is opposite the shoe, although the countersunk or counterbored portions 3506, 3508 of the metal portions 3502, 3504 are exposed so that there is conductive contact made with the metal pins that engage with the portions 3506 and 3508 while the pins also hold the cleat 3500 in a fixed position to the shoe.

In this particular example, the binding material 3510 includes a central portion 3512 that separates and electrically isolates the portions 3502, 3504. The binding material 3510 includes the outer portions 3516 that may overlap the sides of the portions 3502, 3504 so as to secure the portions 3502, 3504 within the binding material 3510. The outer portions 3516 and the central portion 3512 may be formed together with one continuous backing 3518 of the binding material 3510. To provide further support and security for the metal portions 3502, 3404, the binding material 3510 may include posts, barbs, or other such structures 3514 that extend from the central portion 3512 and into voids in the metal portions 3502, 3504.

FIG. 38 shows an example of how a cleat 3810, such as a cleat constructed according to FIGS. 35-37, can be attached to the module 3802 of the shoe via pins 3806, 3808 to complete the open terminals of the circuits of FIGS. 33 and 34 and thereby power on the control circuit of the module 3802. The two metal portions 3812, 3814 of the cleat 3810 are separated by the non-conductive binding material 3816, which may be the same as the non-conductive binding material 3510 previously discussed, while being in conductive contact with the pins 3806, 3808. The block 3812 has the holes to receive the pins 3806, 3808, and the block is either constructed of a rigid non-conductor such as a phenolic resin material or is separated into two separate conductive portions that are isolated from each other, such as by an air gap or an adjoining non-conductive material such as a phenolic resin material. The block receives the fixation arm extensions 3820, 3822 of the release mechanism 3818 where the fixation arm extensions 3820, 3822 contact the metal pins 3806, 3808. The fixation arm extensions 3820, 3822 are electrically isolated from each other by a rigid non-conductor 3824, such as another phenolic resin material, where the fixation arm 3826 then extends from the rigid non-conductor 3824.

The control circuit of the module 3802 includes a battery 3830 as well as the remaining circuitry 3834 such as the microcontroller, tilt sensor, transistor, coil, and so forth as described above for FIGS. 33 and 34. The control circuit of the module 3802 further includes the bypass circuitry 3832, such as at bypass switch discussed above for FIGS. 33 and 34. As can be seen, one terminal of the open terminal pair as described above for the control circuits connects from the battery 3830 to the fixation arm extension 3820 while the other terminal of the open terminal pair connects from the circuitry 3834 to the fixation arm extension 3822. When the shoe is not coupled to the pedal, there is nothing to connect two metal portions 3812, 3814 of the cleat 3810 so the open terminal of the control circuit of the module 3802 remains open. However, upon the cleat 3810 being installed into the pedal, the metal of the pedal electrically connects metal portion 3812 to metal portion 3814, thereby closing the open terminals so that the battery 3810 becomes electrically connected to the circuitry 3834.

Figure 39:
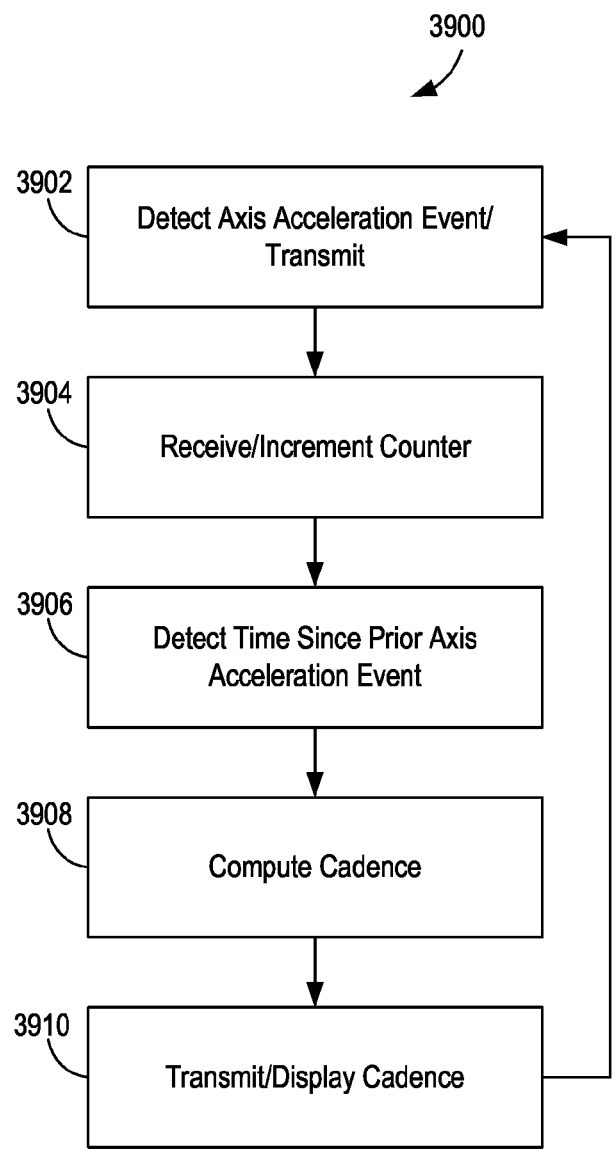
FIG. 39 shows an example of logic that may be performed to provide an indication of pedaling cadence in conjunction with the logic of FIG. 27 that provides valve control.

The control circuit of the module 212 that provides the ability to decouple the shoe from the pedal may provide additional functions as well. For instance, the control circuit or even a separate circuit of the module 212 may determine the cadence of the rider riding the bicycle so that the cadence may be reported, stored, and the like. FIG. 39 shows an example 3900 of operations a microcontroller, such as the microcontroller of the control circuit of the module 212 discussed above or of another circuit of the module 212, may perform to determine the cadence.

The operations begin with the microcontroller monitoring the signal from the tilt sensor to detect an axis acceleration event at an operation 3902. For examples where the cadence determination occurs in an external device, the control circuit including the microcontroller can transmit using a communication module an indication of the axis acceleration event. The axis acceleration event is a detection of a particular change in direction of acceleration for the axis that includes the pedal movement during pedaling. For instance, this axis may be a vertical axis where the particular change of direction of the acceleration relates to the pedal moving upward and then downward within the vertical axis. The reverse change of direction, such as the pedal moving downward and then upward may be ignored as that is only the halfway point of the cadence cycle and therefore not the start of a next cadence cycle, where the cadence cycle is equal to the number of acceleration direction changes of interest over a measured amount of time. Alternatively, that opposite change of direction at the halfway point of the cadence cycle may also be captured where the downstream cadence calculation appropriately considers each event as representing a half of the cadence cycle.

Upon the acceleration event occurring, and being transmitted in certain embodiments, the event is then used to increment a counter at an operation 3904. The event may be received for the embodiments where the event has been transmitted. Additionally, incrementing the counter may occur either at the microcontroller of the control circuit at the shoe or pedal or at another microcontroller that may be separately present for cadence determination, or incrementing the counter may instead occur at a separate device that has received the transmission of the event.

The amount of time that has occurred since the prior axis acceleration event is determined at an operation 3906. Then, the cadence can be computed at an operation 3908 based on that amount of time that it took to complete a cadence cycle. For instance, if it has been one second since the prior event, then that is a cadence of 1 revolution per second or 60 revolutions per minute. In instances where both the change of direction of acceleration at the halfway point of the cadence cycle and the point of completion of the cadence cycle are considered, then the computation may take that double counting during a single cadence cycle into account. For instance, if it has been a half second since the prior event, then it is known that this represents a half cycle and therefore is a cadence of a half revolution per half second which again is 60 revolutions per minute.

While the cadence computation at operation 3908 may occur for every instance of the acceleration direction change that is representative of a full cadence cycle, or alternatively a half cadence cycle as previously discussed, the cadence computation may not update at every computation. Instead, the update to the cadence may occur only after some number of cadence cycles to avoid displaying a cadence that is changing too quickly to be effective. For instance, the cadence update may occur only after two or three complete cadence cycles instead of after every half cadence cycle or ever full cadence cycle. The computation at operation 3908 may thus operate by queueing the amount of time between each acceleration direction change for the desired number of cadence cycles for the update.

For instance, where the cadence update will occur after three complete cadence cycles since the prior update, the cadence computation operation 3908 may queue a first measured time, a second measured time, and a third measured time. The average of those times may then be used as the basis for calculating the cadence. For instance, a first cadence cycle takes 0.8 seconds, a second cadence cycle takes 1.0 seconds, and a third cadence cycle takes 1.2 seconds, so the cadence may be reported as 1 revolution per 1.0 seconds or 60 revolutions per minute.

Once the cadence is computed, it can then be provided to the rider at an operation 3910. Here, the cadence value may be transmitted to a display device where it is then displayed, or the cadence value may simply be displayed in the case where the display device is the device that has performed the cadence computation at the operation 3908.

Figure 40:
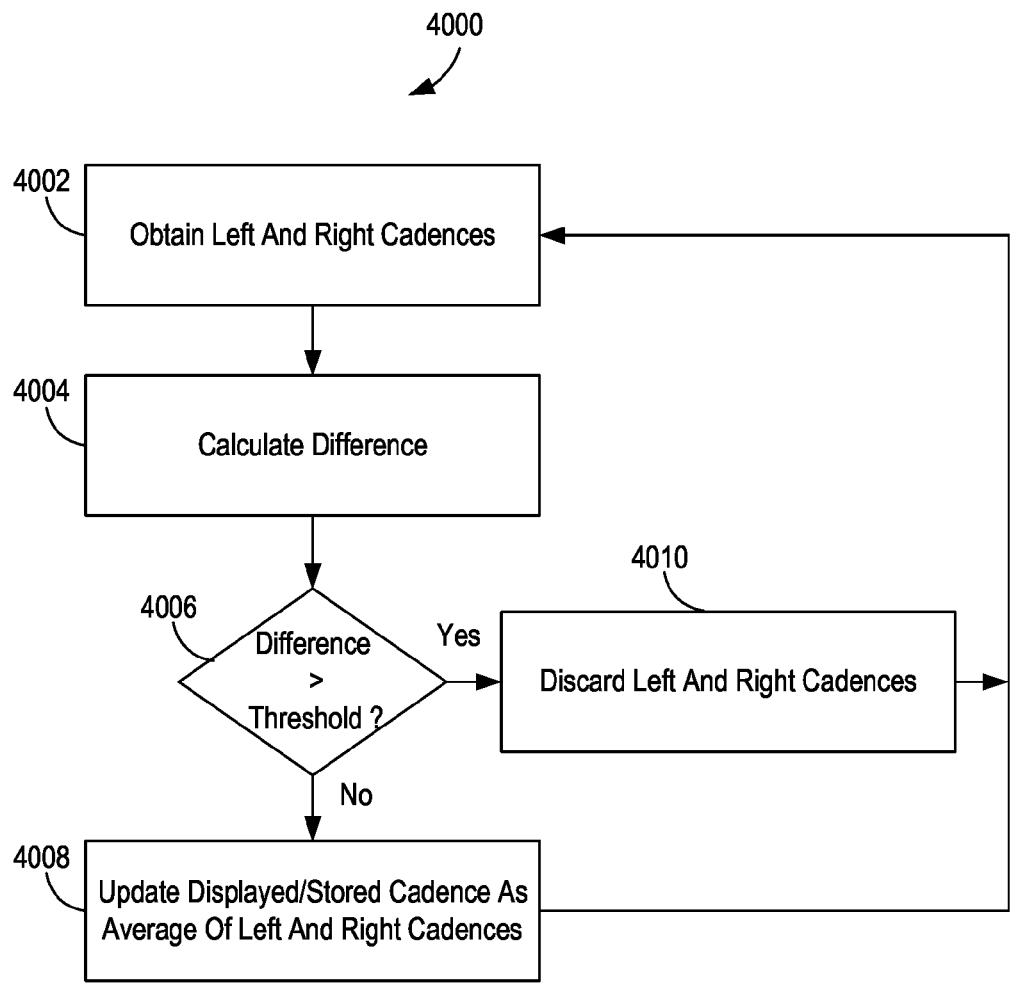
FIG. 40 shows an example of additional logic that may be performed to provide an indication of pedaling cadence in conjunction with the logic of FIG. 27 that provides valve control.

Considering both left and right shoe/pedal combinations of the rider will contain the control circuit to allow for decoupling of the shoe from the pedal and/or may contain a separate microcontroller for cadence determination, a cadence value for left and for right may be determined as discussed above in relation to FIG. 39. In this case, the cadence value of at least one of the shoe pedal combinations is transmitted, either to the microcontroller of the other shoe/pedal combination or to the separate device that may display the cadence. As shown in FIG. 40, the device receiving both of the cadences may then utilize both as a form of error checking so that any anomalies in the capture of the change of direction of acceleration used to determine the cadence can be detected and ignored.

In the example 4000 of FIG. 40, the left and right cadences are obtained at an operation 4002. As mentioned, these cadences may be produced by the operations of FIG. 39 occurring for both the left pedal/shoe combination and the right pedal/shoe combination. A difference between the two calculations may then be determined at an operation 4004. It may then be determined if the difference is greater than a particular threshold at an operation 4006. The value of the threshold may be chosen as desired to balance the need for accuracy versus the need for quick updates to the displayed cadence. For instance, the threshold may be set to one revolution per minute to require a high degree of accuracy. Alternatively, the threshold may be set to five revolutions per minute to provide a high rate of updates.

If the difference is less than the threshold, thus indicating that both of the cadences being compared are likely to be adequately accurate, then the display may be updated by some representation of the cadences at an operation 4008. For instance, the average of the left and right cadences may be provided for display. On the other hand, if the difference between the two cadences is greater than the threshold, thus indicating that at least one of the cadences being compared is not likely to be adequately accurate, then both the left and right cadences are discarded at an operation 4010 so the cadence is not updated until the next update cycle that has adequately accurate left and right values. If the cadence becomes static due to a continuously inaccurate set of cadence values for left and right, then this is a signal to the rider that one or both modules that compute cadence may have a faulty component, such as the microcontroller, tilt sensor, or transmitter.

Figure 41:
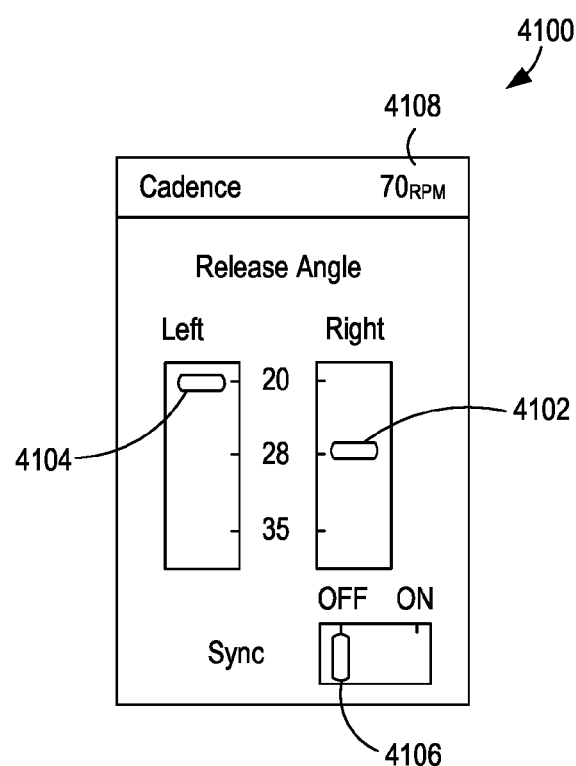
FIG. 41 shows an example of a display on a user device to provide a graphical user interface that a rider may manipulate to specify information such as the tilt threshold for the logic of the controller and also display the pedaling cadence.

FIG. 41 shows another example of a user interface 4100, and this example also includes slides 4102, 4104 to allow adjustment of the tilt threshold of each shoe just like the user interface 3100 described above in relation to FIG. 31. Furthermore, a synchronization switch 4106 may also be provided as a matter of convenience which synchronizes the sliders 4102, 4104 to a same setting so that moving either slider 4102, 4104 adjusts both shoes to the same tilt threshold, like switch 3106 of FIG. 31. It will be appreciated that where the microcontroller of the module 212 is checking both the left/right tilt axis and the front/back tilt axis, the user interface 4100 may provide a left/right display of the sliders 4102, 4104 as well as a separate front/back display of the sliders 4102, 4104 so that the rider may specify a left shoe and right shoe left/right tilt threshold and also specify a left shoe and right shoe front/back tilt axis threshold.

As shown in FIG. 41, this particular user interface 4100 also includes a display of a cadence value 4108, such as the cadence value that has been calculated in FIG. 39 or FIG. 40. Thus, a single user interface 4100 may provide multiple types of information to the rider, consolidated into one user interface display.

Figure 42:
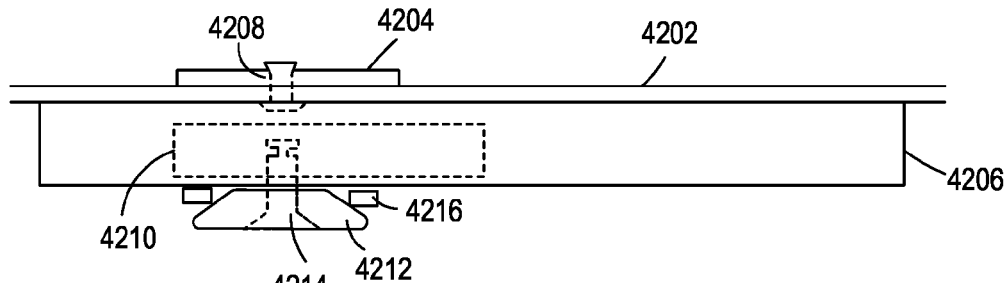
FIG. 42 shows an example of a separate housing attached to a shoe where the separate housing includes a module that includes a coupling to a cleat that allows for decoupling of the cleat from the module.
Figure 43:
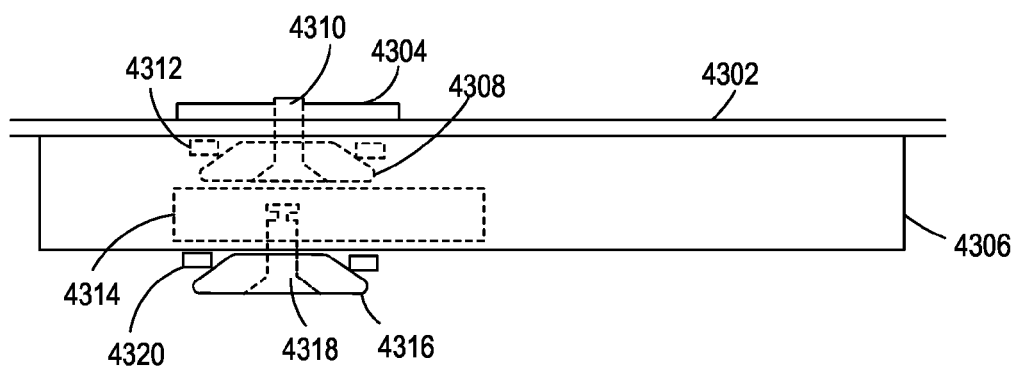
FIG. 43 shows an example of a separate housing attached to a cleat that is attached to a shoe where the separate housing includes a module that includes a coupling to a cleat that allows for decoupling of the cleat from the module.
Figure 44:
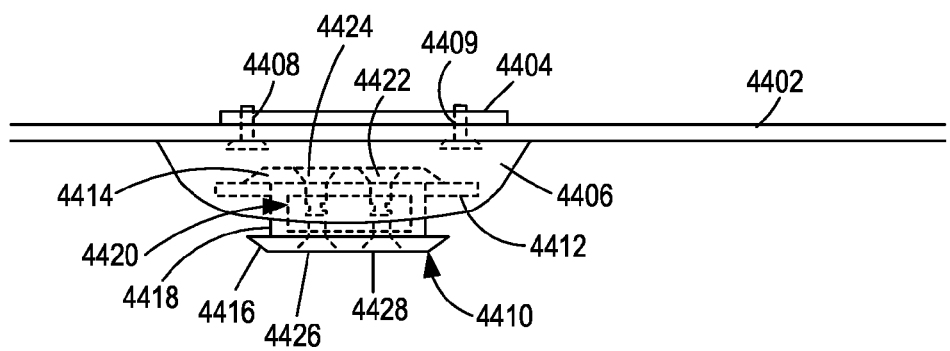
FIG. 44 shows an example of a pedal coupled to a cleat attached to a shoe where the pedal includes a module that includes a coupling to the cleat that allows for decoupling of the cleat from the pedal based on tilt of the coupling of the cleat to the pedal.

FIGS. 42-44 show alternative manners of including the module 212 discussed above to provide decoupling of the shoe from the pedal. In the example shown in FIG. 42, the module 212, referred to as module 4210 in this example, may be mounted as part of an intermediate body 4206 that resides between an outer side of the outsole 4202 of the shoe and the cleat 4212. The body 4206 may be mounted to the outsole 4202 via a mounting plate 4204 and a fastener 4208 such as a screw that fixedly engages the mounting plate 4204. The cleat 4212 is then attached to the module 4210 via pins 4214 in the manner discussed above in the prior embodiments. The pedal 4216 then engages the cleat 4212 in the normal manner, and the rider may remove the shoe and body 4206 from the pedal 4216 in the conventional manner of rotating the foot and shoe relative to the pedal 4216. However, as with the prior module implementations, the cleat 4212 and pins 4214 are also decoupled from the module 4210 to decouple the shoe from the pedal when the tilt of the coupling at the shoe provided by the module 4210 causes the release mechanism of the module 4210 to unlock so that the rider may then pull the shoe and body 4206 away from the cleat 4212 and pins 4214 that remain affixed to the pedal 4216.

In another example as shown in FIG. 43, the module 212, referred to as module 4314 in this example, may be mounted as part of an intermediate body 4306 that resides between the outer side of the outsole 4302 of the shoe and the cleat 4316. The body 4306 may be affixed to the shoe via a quasi-pedal structure 4312, such as an Eggbeater® configuration, an SPD® configuration, or other that is present inside the body 4306 and attaches to an intermediate cleat 4308 that is in turn attached to the shoe in the conventional manner by fasteners such as a screw 4310 that engages a mounting plate 4304 to affix the cleat 4308 to the outsole 4302 of the shoe. A second cleat 4316 is then attached to the module 4314 via pins 4318 in the manner discussed above in the prior embodiments. The pedal 4320 then engages the cleat 4316 in the normal manner, and the rider may remove the shoe and body 4306 from the pedal 4320 in the conventional manner of rotating the foot and shoe relative to the pedal 4320. The quasi-pedal 4312 may utilize a less compliant structure than the pedal 4320 so that the pedal 4320 releases prior to the quasi-pedal 4312 so that the rotation of the foot causes the pedal 4320 to release rather than the quasi-pedal 4312. It will be appreciated that the reverse configuration may instead be used where the quasi-pedal a4312 is more compliant and releases first so that the body 4306 remains attached to the pedal 4320 when the foot is rotated but the body 4306 is released from the intermediate cleat 4308 to decouple the shoe from the pedal 4320. However, as with the prior module implementations, the cleat 4316 and pins 4318 are also decoupled from the module 4306 to decouple the shoe from the pedal 4320 when the tilt of the coupling at the shoe provided by the module 4314 causes the release mechanism of the module 4314 to unlock so that the rider may then pull the shoe and body 4306 away from the cleat 4316 and pins 4318 that remain affixed to the pedal 4320.

In another example as shown in FIG. 44, the module 212 discussed above, referred to as module 4420 in this example, may be included in the pedal 102, 104, referred to as pedal 4410 in this example, instead of in or affixed to the shoe 200. This particular example in FIG. 44 shows a type of pedal 4410 that is much like a Speedplay® pedal, but it will be appreciated that various other pedal designs may also incorporate the module 4420. In this example, the cleat 4406 mounts to the outsole 4402 via fasteners such as screws 4408, 4409 that engage a mounting plate 4404. As with the Speedplay® configuration, the cleat 4406 includes flanges 4412 while the pedal 4410 includes catches 4414, 4416 in the form of plates with flanged edges with one of the two catches 4414, 4416 on the top and the other on the bottom. The catches 4414, 4416 overhang a base 4418 that acts as a central body of the pedal 4410 that is configured to be coupled to the crank arms of the bicycle via a spindle shaft about which the base 4418 can rotate. This overhang of the catches 4414, 4416 provides the flanged edge and is engaged by the flanges 4412 to hold the cleat 4406 to the pedal 4410. Rotation of the foot and shoe in opposition to a spring loading within the cleat 4406 allows the overhang of the catches 4414, 4416 of the pedal 4410 to escape from the flanges 4412 of the cleat 4406.

As can be seen, the catches 4414, 4416 are affixed to the central body 4418 via pins 4422, 4424 on one side and pins 4426, 4428 on the opposite side. These pins 4422, 4424, 4426, and 4428 may be held in place by the module 4420 in the manner previously discussed in the prior examples of the module 212, where the module 4420 utilizes a coupling mechanism like the coupling mechanism 209 discussed above to couple the catches 4414, 4416 to the base 4418, a detection mechanism like the tilt sensor 2504 discussed above to detect tilt at the base 4418, and a comparison mechanism like the microcontroller 2502 and related logic discussed above that compares the detected tilt to a threshold, and a release mechanism like the release mechanism 246 discussed above. These mechanism are within a housing of the module 4420 that is affixed to the base 4418, like the housing 224 discussed above for the module 212. However, the catch 4414 and pins 4422, 4424 of the pedal 4410 are decoupled from the module 4420 to decouple the shoe 200 from the pedal 4410 when the tilt of the base 4418 of the pedal 4410 found by the module 4420 causes the release mechanism of the module 4420 to transition from a locked state to unlocked state to allow decoupling of the shoe 200 from the pedal 4410 so that the rider may then pull the shoe 200, catch 4414, and pins 4422, 4424 of the pedal 4410 away from the remainder of the pedal 4410 that continues to be attached to the crank arm of the bicycle.

The pedal 4410 includes the spindle shaft that allows the pedal 4410 to be mounted to the crank arm of the bicycle while the pedal 4410 can rotate relative to the crank arm. Thus, the module 4420 can be shaped to fit within the body 4418 of the pedal 4410 such as by being separated into two separate sections where one section resides on one side of the spindle shaft while the other section resides on the other side of the spindle shaft.

It will be appreciated that the various options discussed above in relation to the module 212 is applicable when the module 212 is present in the pedal 102, 104. For instance, the module 212 may determine cadence and output the cadence to a display device. As another example, for embodiments where the module 212 located in the pedal 102, 104 includes a microcontroller and related circuitry, the open terminal pair configuration may be used where the catch 4414, 4416 may be two separate isolated conductive pieces connected to the open terminals such that when the flange of the cleat engages the catch 4414, 4416, the conductive material of the flange electrically connects the two pieces of the catch 4414, 4416 to complete the circuit to allow a battery of the module to power the microcontroller.

FIGS. 45-48 show other examples of a configuration of a releaser sub-module 4500 for the release mechanism 256 of the module 212 discussed above to be included either in the shoe or in the pedal. In this example, the releaser sub-module 4500 includes a rigid housing 4502 that includes support block 4522 and support block 4526. The housing 4502 and support blocks 4522, 4526 may be constructed of a metal or similarly rigid material. As shown, these blocks 4522, 4526 may converge into a single unified block, or they may be distinct but both are held in a fixed position relative to one another by the housing 4502. Passageways like the passageway 4524 containing an end 4518 of an obstruction rod 4514 may be formed in the blocks 4522, 4526 to accommodate the passage and movement of the obstruction rod 4514. These passageways may be lined with a low friction material, such as a Nylatron® nylon plastic, such as the MD, GF30, or NSM type, that is self-lubricating. In the position shown, the obstruction rod 4514 serves as the obstruction to a fixation arm 4506 that passes into the housing 4502 through a hole 4504 so that the releaser sub-module 4500 is in a locked state. The fixation 4506 is in the coupling position in FIG. 45 to couple the pins 210, 211 and cleat 208 to the module 212. The release mechanism 256, that includes the sub-module 4500 together with the fixation arm 4506 and interference member 232 discussed above, is therefore also in a locked state by the presence of the obstruction rod 4514 in the position shown in FIG. 45. It will be appreciated that the fixation arm 4506 is the fixation arm 238 described in prior embodiments above, and the fixation arm 4506 is biased in a direction away from the obstruction rod 4514 by a biasing member 4508, which is the biasing member 240 discussed in prior embodiments above. The biasing member 4508 contacts the housing 4502 on one end and the interference member 232 on the other end out of view of FIG. 45.

The fixation arm 4506 of this example differs from prior examples of the fixation arm 238 in that the fixation arm 4506 includes an axle 4512 supporting a wheel 4510. An example of the distal end of the fixation arm 4506 where the axle 4512 and wheel 4510 are located is shown in more detail in FIGS. 47 and 48. Here it can be seen that the distal end of the fixation arm 4506 includes a groove 4706 formed by an upper extending portion 4702 and lower extending portion 4704. The axle 4512 extends between the upper extending portion 4702 and lower extending portion 4704 and spans the groove 4706. The wheel 4510 is then present in the groove 4706 with clearance allowing the wheel 4510 to spin about the axle 4512. The axle 4512 may be constructed of a rigid, durable material such as steel, while the wheel 4510 may be made of a rigid, durable material as well. The wheel 4510 may take the form of a lubricated ball bearing or may be a solid structure. One example of a durable solid structure for the wheel 4510 is Nylatron® nylon plastic, such as the MD, GF30, or NSM type, that is self-lubricating as previously mentioned.

Returning to FIG. 45, the locked state is indicated by symbol 4542 showing that the fixation arm 4506 cannot move due to the presence of the obstruction rod 4514 making contact with the wheel 4510. The obstruction rod 4514 is also being held in a static state where symbol 4544 indicates that no movement of the obstruction rod 4514 is possible. This is because a biasing member 4534, such as a coil spring wrapped around an end 4520 of the obstruction rod 4514 as shown, contacts a wall 4528 of the block 4526 to force a flange 4532 of the obstruction rod 4514 against a wall 4530 of the block 4526. Because the obstruction rod 4514 is blocking the fixation arm 4506, any force applied by the rider of the bicycle in a direction that attempts to pull the cleat that is held in the pedal away from the shoe, the fixation arm 4506 is being forced toward the obstruction rod 4514 but cannot move due to the presence of the obstruction rod 4514 so that the cleat remains securely coupled to the shoe. This allows the rider to pull upward on the pedal if desired, as previously discussed.

Furthermore, as indicated by symbol 4540, the static nature of the obstruction rod 4514 means that the wheel 4510 cannot turn when in contact with the static obstruction rod 4514. While the obstruction rod 4514 contains a notch 4516 that can accept the wheel 4510, the static nature of the obstruction rod 4514 prevents the wheel 4510 from being able to drop into the notch 4516.

A control circuit 4538, which may be any of the control circuits previously discussed above, is included and monitors for an amount of tilt relative to one or more thresholds. Upon detecting that the amount of tilt exceeds a threshold, the control circuit 4538 may then activate an actuator of the obstruction rod 4514. For instance, the actuator of the obstruction rod 4514 may be a solenoid coil 4536 that causes the obstruction rod 4514 to move in the direction toward the block 4526, in opposition to the biasing member 4534.

Figure 46:
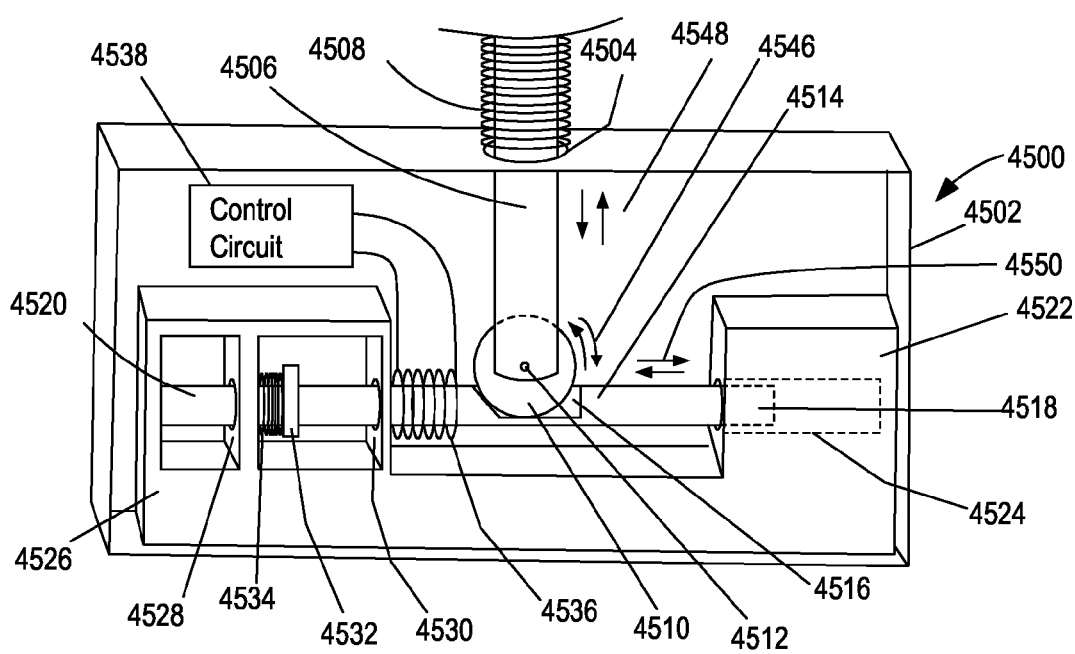
FIG. 46 shows the example of the locking mechanism of FIG. 45 but in an unlocked state where the rider has then applied force to attempt to remove the shoe from the pedal.
Figure 47:
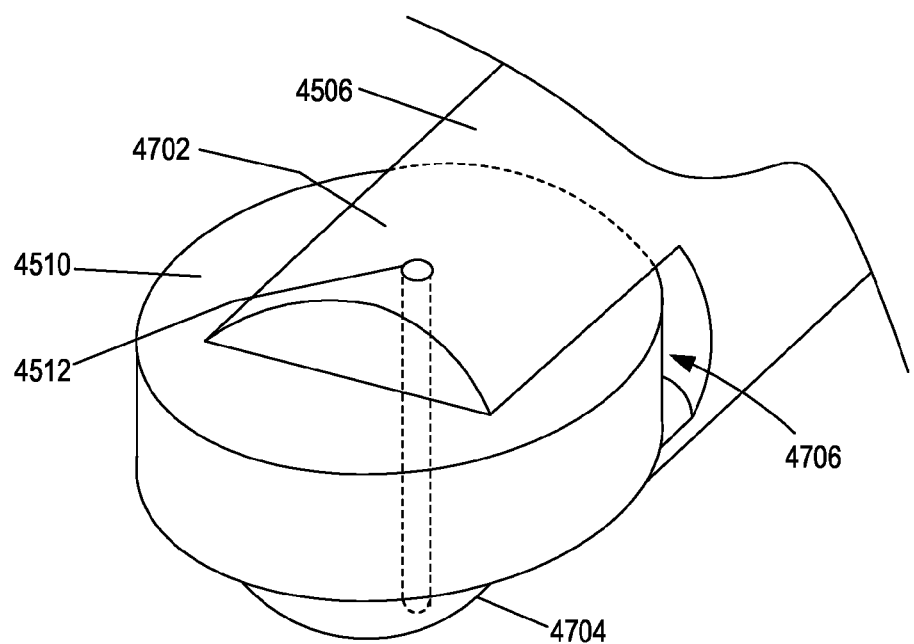
FIG. 47 shows a perspective view of an example of an end of a fixation arm of the release mechanism having a roller that allows the electrically controllable mechanical obstruction of the locking mechanism to move while a rider is applying a force in an attempt to remove the shoe from the pedal.
Figure 48:
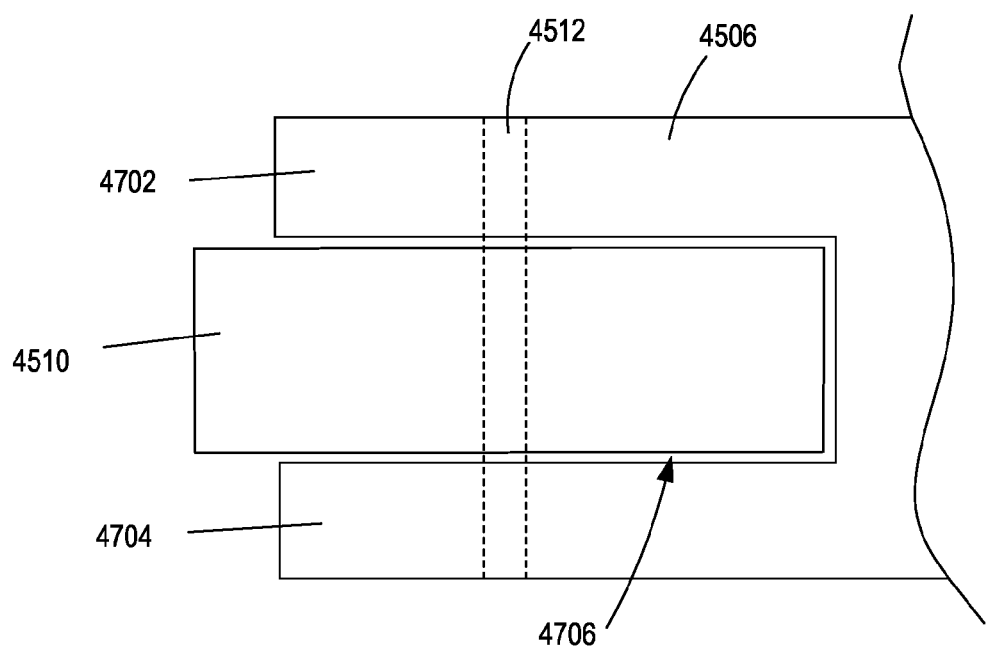
FIG. 48 shows a side view of an example of the end of the fixation arm of the release mechanism where the roller is located.

FIG. 46 shows the releaser sub-module 4500 in the unlocked state and at a point where the rider has pulled upward with the foot while the releaser sub-module 4500 is in the unlocked state to cause the cleat to decouple from the shoe. This is apparent in FIG. 46 because the activation of the solenoid coil 4536 has caused the obstruction rod 4514 to move toward the block 4520, with the wheel 4510 turning while the obstruction rod 4514 is moving so that force by the fixation arm 4506 toward the obstruction rod 4514 does not prevent the rod from moving as desired. The movement of the obstruction rod 4514 toward the block 4520 causes the notch 4516 to move to the position of the wheel 4510 such that the wheel 4510 can move into the notch 4516, thereby allowing the fixation arm 4506 to move toward the obstruction rod 4514. As described above in relation to prior embodiments, this movement of the fixation arm 4506 means the interference member 232 also moves so that the pins 210, 211 holding the cleat 208 to the module 212 are no longer held in place in the module 212 so that the cleat 208 and pins 210, 211 separate from the shoe 200, or separate from the pedal 102, 104 in the case where the module 212 is present in the pedal 102, 104 rather than the shoe 200, to decouple the shoe 200 from the pedal 102, 104. Symbol 4550 shows that in this unlocked state the obstruction rod 4514 moves, symbol 4546 shows that the wheel 4510 rotates, and symbol 4548 shows that the fixation arm 4506 moves. Movement of the obstruction rod 4514 compresses the biasing member 4534 while movement of the fixation arm 4506 compresses the biasing member 4508.

Once the cleat and pins have been decoupled from the module 212 so that there is no longer a pull force on the pins and thus no longer a force pushing the interference member 232 and fixation arm 4506 toward the obstruction rod 4514, the biasing member 4508 returns the fixation arm 4506 and interference member 232 to the position that would engage the pins had they still been present within the module 212. Additionally, once the tilt has been reduced to no longer exceed the threshold, or a time with the tilt beyond the threshold exceeds a timeout period for embodiments where the control circuit 4538 implements a timeout period, the control circuit 4538 may then deactivate the solenoid coil 4536. The biasing member 4534 then moves the obstruction rod 4514 toward the block 4522 to thereby move the notch 4516 away from the wheel 4510, so that the movable aspects of the release mechanism 256 are in the positions shown in FIG. 45 such that the release mechanism 256 that includes the releaser sub-module 4500 and fixation arm 4506 is in the locked state once again.

Figure 49:
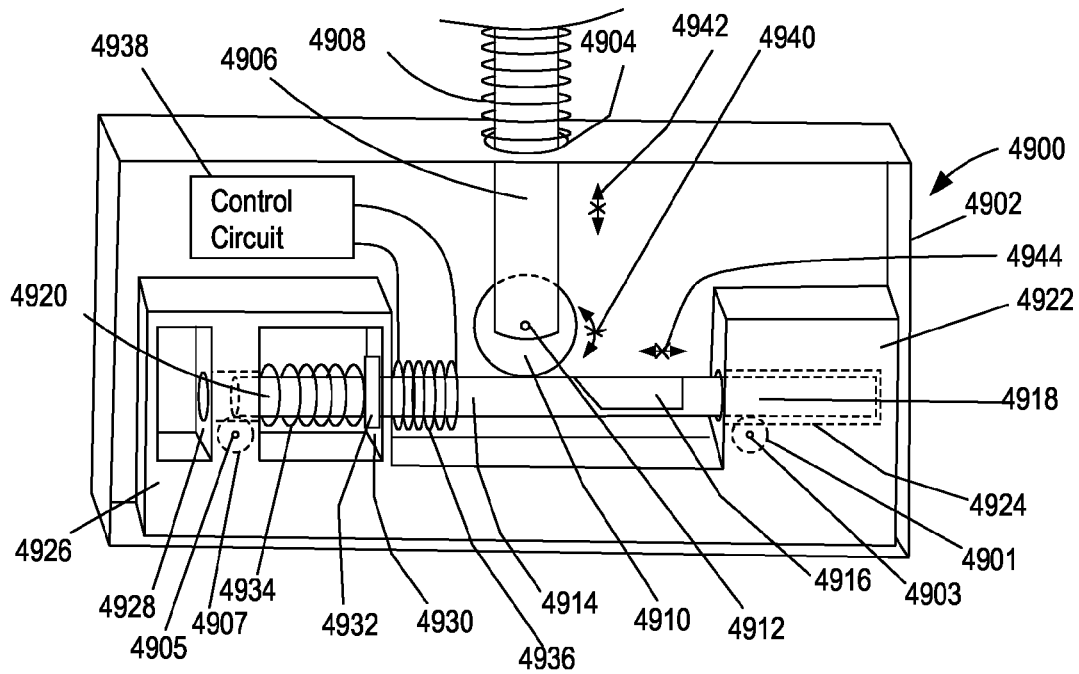
FIG. 49 shows another example of a locking mechanism of the release mechanism for the module that is shown in a locked state that allows a decoupling of the cleat based on tilt of the coupling and that utilizes an electrically controllable mechanical obstruction to a fixation arm.
Figure 50:
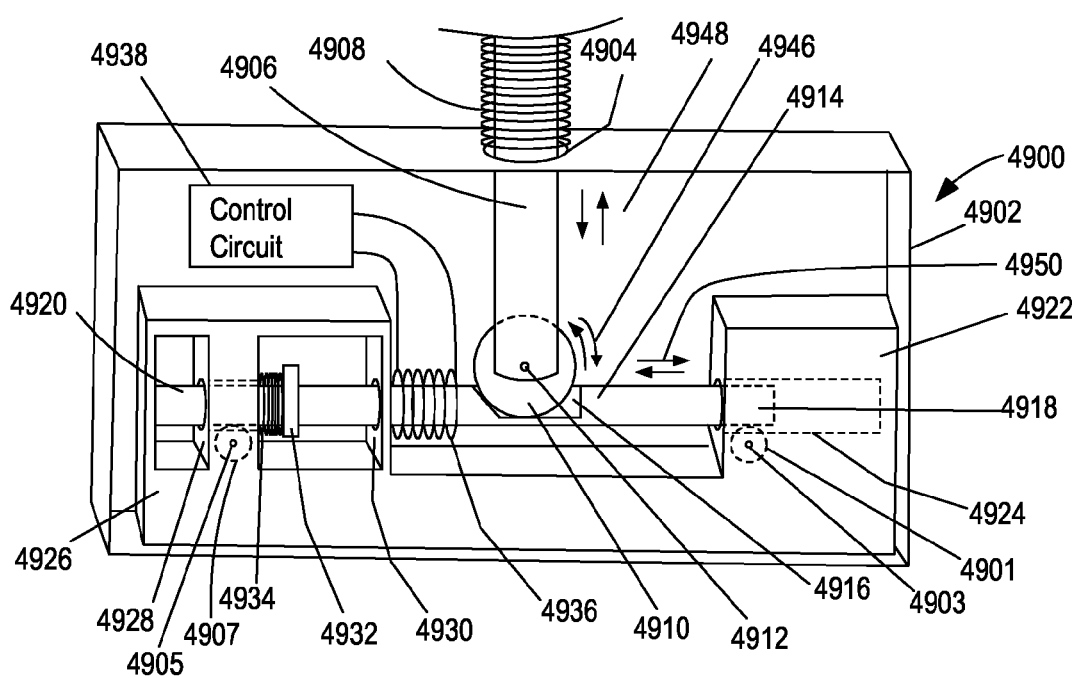
FIG. 50 shows the example of the locking mechanism of FIG. 49 but in an unlocked state where the rider has then applied force to attempt to remove the shoe from the pedal.

FIGS. 49 and 50 show an alternative manner of using a configuration like that discussed above for FIGS. 45-48. This configuration of a releaser sub-module 4900 for the release mechanism 256 of the module 212 discussed above may also be included either in the shoe or in the pedal. In this example, the releaser sub-module 4900 includes a rigid housing 4902 that includes support block 4922 and support block 4926. The housing 4902 and support blocks 4922, 4926 may be constructed of a metal or similarly rigid material. As shown, these blocks 4922, 4926 may converge into a single unified block, or they may be distinct but both are held in a fixed position relative to one another by the housing 4902. Passageways like the passageway 4924 containing an end 4918 of an obstruction rod 4914 may be formed in the blocks 4922, 4926 to accommodate the passage and movement of the obstruction rod 4914. These passageways may be lined with a low friction material, such as the Nylatron® nylon plastic mentioned above, such as the MD, GF30, or NSM type, that is self-lubricating. In the position shown, the obstruction rod 4914 serves as the obstruction to a fixation arm 4906 that passes into the housing 4902 through a hole 4904 so that the releaser sub-module 4900 is in a locked state. The release mechanism 256, that includes the sub-module 4900 together with the fixation arm 4906 and interference member 232 discussed above, is therefore also in a locked state by the presence of the obstruction rod 4914 in the position shown in FIG. 49. It will be appreciated that the fixation arm 4906 is the fixation arm 238 described in prior embodiments above, and the fixation arm 4906 is biased in a direction away from the obstruction rod 4914 by a biasing member 4908, which again is the biasing member 240 discussed in prior embodiments above. The biasing member 4908 contacts the housing 4902 on one end and the interference member 232 on the other end out of view of FIG. 49.

The fixation arm 4906 of this example differs from prior examples of the fixation arm 238 in that the fixation arm 4906 includes an axle 4912 supporting a wheel 4910. The example of the distal end of the fixation arm 4906 where the axle 4912 and wheel 4910 are located matches that shown in FIGS. 47 and 48 as discussed above. The axle 4912 may be constructed of a rigid, durable material such as steel, while the wheel 4910 may be made of a rigid, durable material as well. The wheel 4910 may take the form of a lubricated ball bearing or may be a solid structure. One example of a durable solid structure for the wheel 4910 is Nylatron® nylon plastic, such as the MD, GF30, or NSM type, that is self-lubricating as previously mentioned.

Returning R to FIG. 49, the locked state is indicated by symbol 4942 showing that the fixation arm 4906 cannot move due to the presence of the obstruction rod 4914 making contact with the wheel 4910. The obstruction rod 4914 is also being held in a static state where symbol 4944 indicates that no movement of the obstruction rod 4914 is possible. This is because a biasing member 4934, such as a coil spring wrapped around an end 4920 of the obstruction rod 4914 as shown, contacts a wall 4928 of the block 4926 to force a flange 4932 of the obstruction rod 4914 against a wall 4930 of the block 4926. Because the obstruction rod 4914 is blocking the fixation arm 4906, any force applied by the rider of the bicycle in a direction that attempts to pull the cleat that is held in the pedal away from the shoe, the fixation arm 4906 is being forced toward the obstruction rod 4914 but cannot move due to the presence of the obstruction rod 4914 so that the cleat 208 remains securely coupled to the shoe 200. This allows the rider to pull upward on the pedal 102, 104 if desired, as previously discussed.

Furthermore, as indicated by symbol 4940, the static nature of the obstruction rod 4914 means that the wheel 4910 cannot turn when in contact with the static rod 4914. While the obstruction rod 4914 contains a notch 4916 that can accept the wheel 4910, the static nature of the obstruction rod 4914 prevents the wheel 4910 from being able to drop into the notch 4916.

A control circuit 4938, which may be any of the control circuits previously discussed above, is included and monitors for an amount of tilt relative to one or more thresholds. Upon detecting that the amount of tilt exceeds a threshold, the control circuit 4938 may then activate an actuator of the obstruction rod 4914. For instance, like in the example of FIG. 45, the actuator of the obstruction rod 4914 in FIG. 49 may be a solenoid coil 4936 while the obstruction rod 4914 is ferrous in order to serve as a solenoid rod that such that the solenoid coil 4936 causes the obstruction rod 4914 to move in the direction toward the block 4926, in opposition to the biasing member 4934. As another example, the actuator may be an electric motor that controls the position of the obstruction rod 4914. For instance, the electric motor may be implemented with a pinion gear while the obstruction rod 4914 may be implemented as a rack gear so as to provide a rack and pinion configuration to move the obstruction rod 4914.

Figure 45:
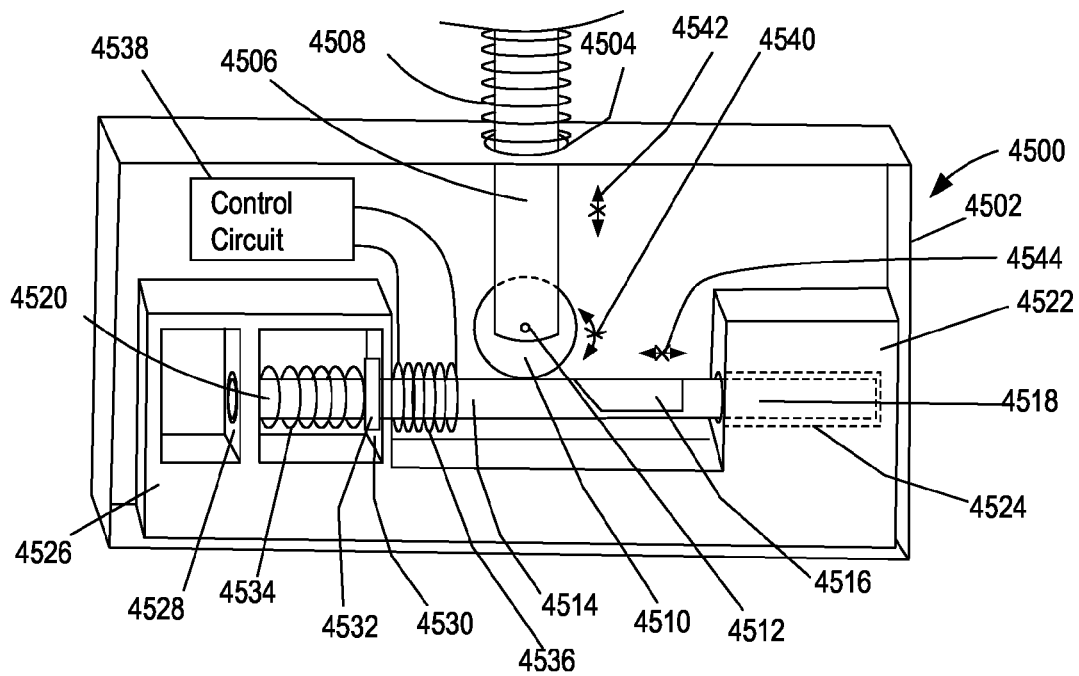
FIG. 45 shows another example of a locking mechanism of the release mechanism for the module that is shown in a locked state that allows a decoupling of the cleat based on tilt of the coupling and that utilizes an electrically controllable mechanical obstruction to a fixation arm.

Thus, one distinction of the releaser sub-module 4900 of FIG. 49 relative to the releaser sub-module of FIG. 45 is that the releaser sub-module 4900 in one example includes rotatable elements 4901 and 4907. Rotatable element 4901 is positioned within a notch of the passageway 4924 that allows the rotatable element 4901 to rotate without restriction by the block 4922, while being supported by an axle 4903 that may be supported by the block 4922. Likewise, rotatable element 4907 is positioned within a notch of the passageway within block 4926 that allows the rotatable element 4907 to rotate without restriction, while being supported by an axle 4905 that may be affixed to the block 4926.

In the example where the actuator of the obstruction rod 4914 is the solenoid coil 4936 and the obstruction rod 4914 serves as a solenoid rod, the rotatable elements 4901 and 4907 may be wheels supported by the axles 4903, 4905 that are in turn supported by the blocks 4922, 4926. The axles 4903, 4905 may be made of a durable rigid material such as steel, and the wheels 4901, 4907 may be constructed of durable materials such as lubricated ball bearings or Nylatron® nylon that self-lubricates. The wheels 4901, 4906 facilitates the ability of the obstruction rod 4914 to be moved by the solenoid coil 4936.

In the example where the actuator of the obstruction rod 4914 is an electric motor, at least one of the rotatable elements 4901 or 4907 represents the pinion gear that is locked to the motor shaft that is the axle 4903 or 4905. As noted, the pinion gear engages rack gearing present on the obstruction rod 4914 to move the obstruction rod 4914 when the electric motor rotates the pinion. Furthermore, an example may include both the solenoid coil 4936 and the one or more electric motors tied to the rotatable element 4901 and/or 4907 to provide multiple actuators of the obstruction rod 4914 that are controlled by the control circuit 4938.

FIG. 50 shows the releaser sub-module 4900 in the unlocked state and at a point where the rider has pulled upward with the foot while the releaser sub-module 4900 is in the unlocked state to cause the cleat to decouple from the shoe. This is apparent in FIG. 50 because the activation of the solenoid coil 4936 and/or electric motor associated with a pinion has caused the obstruction rod 4914 to move toward the block 4920, with the wheel 4910 turning while the obstruction rod 4914 is moving so that force by the fixation arm 4906 toward the obstruction rod 4914 does not prevent the obstruction rod 4914 from moving as desired. The movement of the obstruction rod 4914 toward the block 4920 causes the notch 4916 to move to the position of the wheel 4910 such that the wheel 4910 can move into the notch 4916, thereby allowing the fixation arm 4906 to move toward the obstruction rod 4914. As described above in relation to prior embodiments, this movement of the fixation arm 4906 means the interference member 232 also moves so that the pins 210, 211 holding the cleat 208 to the module 212 are no longer held in place in the module 212 so that the cleat 208 and pins 210, 211 separate from the shoe 200, or separate from the pedal 102, 104 in the case where the module 212 is present in the pedal 102, 104 rather than the shoe 200, to decouple the shoe 200 from the pedal 102, 104. Symbol 4950 shows that in this unlocked state the obstruction rod 4914 moves, symbol 4946 shows that the wheel 4910 rotates, and symbol 4948 shows that the fixation arm 4906 moves. Movement of the obstruction rod 4914 compresses the biasing member 4934 while movement of the fixation arm 4906 compresses the biasing member 4908.

Once the cleat 208 and pins 210, 211 have been decoupled from the module 212 so that there is no longer a pull force on the pins 210, 211 and thus no longer a force pushing the interference member 232 and fixation arm 4906 toward the obstruction rod 4914, the biasing member 4908 returns the fixation arm 4906 and interference member 232 to the position that would engage the pins 210, 211 had they still been present within the module 212. Additionally, once the tilt has been reduced to no longer exceed the threshold, or a time with the tilt beyond the threshold exceeds a timeout period for embodiments where the control circuit 4938 implements a timeout period, the control circuit 4938 may then deactivate the solenoid coil 4936 and/or electric motor associated with the pinion. The biasing member 4934 then moves the obstruction rod 4914 toward the block 4922 to thereby move the notch 4916 away from the wheel 4910, so that the movable aspects of the release mechanism 256 are in the positions shown in FIG. 49 such that the release mechanism 256 that includes the releaser sub-module 4900 and fixation arm 4906 is in the locked state once again.

While embodiments have been particularly shown and described, it will be understood by those skilled in the art that various other changes in the form and details may be made therein without departing from the spirit and scope of the invention.

What is claimed is:

1. A method of allowing a decoupling of a shoe from a pedal of a bicycle, wherein a module having a coupling mechanism is present to couple the shoe to the pedal, comprising:
   detecting a tilt at the module;
   comparing the detected tilt to a threshold; and
   while the detected tilt exceeds the threshold, unlocking a release mechanism of the module so that the unlocked release mechanism allows decoupling of the shoe from the pedal,
   wherein unlocking the release mechanism to allow the decoupling of the shoe from the pedal comprises unlocking a fixation arm from a coupling position that maintains the coupling of the shoe to the pedal to allow the fixation arm to move away from the coupling position,
   wherein the module is attached to the shoe, wherein a cleat is attached to the shoe via the coupling mechanism, and wherein the cleat is separately coupled to the pedal and wherein the unlocked release mechanism allows the decoupling of the coupling mechanism from the cleat to allow decoupling of the shoe from the pedal, and
   wherein prior to the shoe being decoupled from the pedal by the unlocked release mechanism, a rotation of the cleat relative to the pedal decouples the cleat from the pedal to decouple the shoe from the pedal.

2. The method of claim 1, wherein detecting the tilt at the module comprises measuring the tilt to produce a tilt signal representative of the tilt at the module.

3. The method of claim 2, wherein detecting the tilt at the module comprises measuring the tilt with an accelerometer.

4. The method of claim 2, wherein detecting the tilt at the module comprises measuring the tilt with an inertial measuring unit that comprises an accelerometer and a gyroscope.

5. The method of claim 2, wherein the tilt signal comprises a numeric representation of the tilt and wherein comparing the detected tilt to the threshold comprises electronically comparing the numeric representation of the tilt signal to a numeric threshold.

6. The method of claim 1, wherein detecting a tilt at the module comprises retaining a ball within a detent of a body.

7. The method of claim 6, wherein the threshold comprises a physical amount of tilt necessary for the ball to escape the detent and wherein comparing the detected tilt to the threshold comprises the ball escaping over an edge of the detent upon the tilt at the coupling exceeding the threshold.

8. The method of claim 1, wherein the fixation arm is locked into the coupling position by a ball being present within a detent of a body to block movement of the fixation arm, and wherein unlocking the fixation arm comprises movement of the ball out of the detent to no longer block movement of the fixation arm.

9. The method of claim 1, wherein the module includes a comparison mechanism that compares the detected tilt to the threshold, wherein the comparison mechanism comprises a microcontroller, wherein a pair of open terminals are present between a battery and the microcontroller, wherein the cleat comprises two sections electrically isolated with each being electrically connected to one of the open terminals, and wherein upon placing the cleat in the pedal, the pedal contacts both sections of the cleat to provide an electrical connection from the battery to the microcontroller.

10. A method of allowing a decoupling of a shoe from a pedal of a bicycle, wherein a module having a coupling mechanism is present to couple the shoe to the pedal, comprising:
detecting a tilt at the module;
comparing the detected tilt to a threshold; and
while the detected tilt exceeds the threshold, unlocking a release mechanism of the module so that the unlocked release mechanism allows decoupling of the shoe from the pedal,
wherein unlocking the release mechanism to allow the decoupling of the shoe from the pedal comprises unlocking a fixation arm from a coupling position that maintains the coupling of the shoe to the pedal to allow the fixation arm to move away from the coupling position,
wherein the module having the coupling mechanism is attached to the pedal, wherein a cleat is attached to the shoe, wherein the cleat is separately coupled to the pedal via the coupling mechanism, and wherein the unlocked release mechanism allows the decoupling of the coupling mechanism from the pedal to allow decoupling of the shoe from the pedal.

11. The method of claim 10, wherein prior to the shoe being decoupled from the pedal by the unlocked release mechanism, a rotation of the cleat relative to the pedal decouples the cleat from the pedal to decouple the shoe from the pedal.

12. A method of allowing a decoupling of a shoe from a pedal of a bicycle, wherein a module having a coupling mechanism is present to couple the shoe to the pedal, comprising:
detecting a tilt at the module;
comparing the detected tilt to a threshold; and
while the detected tilt exceeds the threshold, unlocking a release mechanism of the module so that the unlocked release mechanism allows decoupling of the shoe from the pedal,
wherein unlocking the release mechanism to allow the decoupling of the shoe from the pedal comprises unlocking a fixation arm from a coupling position that maintains the coupling of the shoe to the pedal to allow the fixation arm to move away from the coupling position,
wherein the fixation arm is locked into the coupling position by a fluid held in a static state to block movement of the fixation arm, and wherein unlocking the fixation arm comprises opening a valve to allow the fluid to flow to allow the fixation arm to move away from the coupling position.

13. The method of claim 12, wherein the valve is an electrically controlled valve.

14. The method of claim 13, wherein a manual button when pressed causes the electrically controlled valve to open without regard to tilt at the coupling, the method further comprising opening the valve without regard to the tilt at the coupling when the manual button is pressed to allow the fixation arm to move away from the coupling position.

15. A method of allowing a decoupling of a shoe from a pedal of a bicycle, wherein a module having a coupling mechanism is present to couple the shoe to the pedal, comprising:
detecting a tilt at the module;
comparing the detected tilt to a threshold; and
while the detected tilt exceeds the threshold, unlocking a release mechanism of the module so that the unlocked release mechanism allows decoupling of the shoe from the pedal,
wherein unlocking the release mechanism to allow the decoupling of the shoe from the pedal comprises unlocking a fixation arm from a coupling position that maintains the coupling of the shoe to the pedal to allow the fixation arm to move away from the coupling position,
wherein a biasing member is present on the fixation arm to bias the fixation arm into the coupling position to maintain the coupling of the shoe to the pedal when the fixation arm is unlocked until a rider pulls the shoe away from the pedal to overcome the bias and cause the fixation arm to move while the fixation arm is unlocked.

16. The method of claim 15, wherein the biasing member moves the fixation arm to the coupling position once the shoe is decoupled from the pedal.

17. A method of allowing a decoupling of a shoe from a pedal of a bicycle, wherein a module having a coupling mechanism is present to couple the shoe to the pedal, comprising:
detecting a tilt at the module;
comparing the detected tilt to a threshold; and
while the detected tilt exceeds the threshold, unlocking a release mechanism of the module so that the unlocked release mechanism allows decoupling of the shoe from the pedal,
wherein unlocking the release mechanism to allow the decoupling of the shoe from the pedal comprises unlocking a fixation arm from a coupling position that maintains the coupling of the shoe to the pedal to allow the fixation arm to move away from the coupling position,
wherein the module includes a detection mechanism that detects the tilt at the module, wherein the detection mechanism comprises an accelerometer, the method further comprising detecting acceleration events from the accelerometer, determining pedaling cadence from the acceleration events, and displaying the cadence.

18. A method of allowing a decoupling of a shoe from a pedal of a bicycle, wherein a module having a coupling mechanism is present to couple the shoe to the pedal, comprising:
detecting a tilt at the module;
comparing the detected tilt to a threshold; and while the detected tilt exceeds the threshold, unlocking a release mechanism of the module so that the unlocked release mechanism allows decoupling of the shoe from the pedal, wherein unlocking the release mechanism to allow the decoupling of the shoe from the pedal comprises unlocking a fixation arm from a coupling position that maintains the coupling of the shoe to the pedal to allow the fixation arm to move away from the coupling position, wherein the module is present in a body mounted to an outer side of the outsole of the shoe.

19. A method of allowing a decoupling of a shoe from a pedal of a bicycle, wherein a module having a coupling mechanism is present to couple the shoe to the pedal, comprising:

detecting a tilt at the module;

comparing the detected tilt to a threshold; and while the detected tilt exceeds the threshold, unlocking a release mechanism of the module so that the unlocked release mechanism allows decoupling of the shoe from the pedal, wherein unlocking the release mechanism to allow the decoupling of the shoe from the pedal comprises unlocking a fixation arm from a coupling position that maintains the coupling of the shoe to the pedal to allow the fixation arm to move away from the coupling position, wherein the fixation arm is locked into the coupling position by an obstruction rod positioned to block movement of the fixation arm, and wherein unlocking the fixation arm comprises moving the obstruction rod to allow the fixation arm to move away from the coupling position.

20. A method of allowing a decoupling of a shoe from a pedal of a bicycle, wherein a module having a coupling mechanism is present to couple the shoe to the pedal, comprising:

detecting a tilt at the module;

comparing the detected tilt to a threshold; and while the detected tilt exceeds the threshold, unlocking a release mechanism of the module so that the unlocked release mechanism allows decoupling of the shoe from the pedal, wherein the module having the coupling mechanism is attached to the pedal, wherein a cleat is attached to the shoe, wherein the cleat is separately coupled to the pedal via the coupling mechanism, and wherein the unlocked release mechanism allows the decoupling of the coupling mechanism from the pedal to allow decoupling of the shoe from the pedal, wherein prior to the shoe being decoupled from the pedal by the unlocked release mechanism, a rotation of the cleat relative to the pedal decouples the cleat from the pedal to decouple the shoe from the pedal.

21. A method of allowing a decoupling of a shoe from a pedal of a bicycle, wherein a module having a coupling mechanism is present to couple the shoe to the pedal, comprising:

detecting a tilt at the module;

comparing the detected tilt to a threshold; and while the detected tilt exceeds the threshold, unlocking a release mechanism of the module so that the unlocked release mechanism allows decoupling of the shoe from the pedal, wherein detecting a tilt at the module comprises retaining a ball within a detent of a body.

22. The method of claim 21, wherein the threshold comprises a physical amount of tilt necessary for the ball to escape the detent and wherein comparing the detected tilt to the threshold comprises the ball escaping over an edge of the detent upon the tilt at the coupling exceeding the threshold.

23. A method of allowing a decoupling of a shoe from a pedal of a bicycle, wherein a module having a coupling mechanism is present to couple the shoe to the pedal, the module further including a comparison mechanism, comprising:

detecting a tilt at the module;

comparing the detected tilt to a threshold with the comparison mechanism; and while the detected tilt exceeds the threshold, unlocking a release mechanism of the module so that the unlocked release mechanism allows decoupling of the shoe from the pedal, wherein the comparison mechanism comprises a microcontroller, wherein a pair of open terminals are present between a battery and the microcontroller, wherein a cleat comprises two sections electrically isolated with each being electrically connected to one of the open terminals, and wherein upon placing the cleat in the pedal, the pedal contacts both sections of the cleat to provide an electrical connection from the battery to the microcontroller.

* * * * *